US008832675B1

(12) United States Patent
Abderrazzaq et al.

(10) Patent No.: US 8,832,675 B1
(45) Date of Patent: Sep. 9, 2014

(54) DYNAMIC USER-INTERFACE GENERATION AND ADMINISTRATION METHOD AND APPARATUS

(75) Inventors: Saad Abderrazzaq, Arlington, MA (US); Laura E. Essmaker, Lafayette, CO (US); Matthew Green, Westminster, CO (US); Carla A. McNearny, Arvada, CO (US)

(73) Assignee: Avaya Inc., Basking Ridge, NJ (US)

( * ) Notice: Subject to any disclaimer, the term of this patent is extended or adjusted under 35 U.S.C. 154(b) by 1639 days.

(21) Appl. No.: 11/861,485

(22) Filed: Sep. 26, 2007

(51) Int. Cl.
*G06F 9/44* (2006.01)

(52) U.S. Cl.
USPC .......................................... 717/170; 717/169

(58) Field of Classification Search
USPC ................................................. 717/169–170
See application file for complete search history.

(56) References Cited

U.S. PATENT DOCUMENTS

| 7,418,696 | B2* | 8/2008 | Hawley et al. | 717/109 |
| 7,937,698 | B2* | 5/2011 | Belisario et al. | 717/169 |
| 2001/0029605 | A1* | 10/2001 | Forbes et al. | 717/11 |
| 2007/0108281 | A1* | 5/2007 | Kumar et al. | 235/451 |
| 2009/0012981 | A1* | 1/2009 | Kogoh | 707/101 |

* cited by examiner

*Primary Examiner* — Li B. Zhen
*Assistant Examiner* — Ryan Coyer
(74) *Attorney, Agent, or Firm* — Sheridan Ross P.C.

(57) ABSTRACT

A system and method for configuring software components are provided. A number of elements comprising configuration data are defined. For a software component that is to be configured, a file containing a subset of the elements defining the software component, the properties that must be administered to configure the software component, and the run-time parameters for the software component is created. The file is parsed by a management service. The management service uses the data contained in the file to generate the content of a user interface for collecting configuration data from a user. Collected configuration data is validated and persisted to the data model to complete the integration of the software component into the larger system.

20 Claims, 91 Drawing Sheets

```xml
<?xml version="1.0" encoding="UTF-8"?>
<flavor
    xmlns="http://www.rnd.avaya.com"
    xmlns:xsi="http://www.w3.org/2001/XMLSchema-instance"
    xsi:schemaLocation="http://www.rnd.avaya.com flavor.xsd"

type="AllFunctions"
    resourceBundle="CCRSubsys"
    typeKey="AllFunctions.typeKey"
    minInstances="0"
    maxInstances="1">

<description key="AllFunctions.firstKey"/>

<subsystems>
        <refSubsystemType ref="SystemManagement"/>
        <refSubsystemType ref="Foundation"/>
        <refSubsystemType ref="ReportGateway"/>
        <refSubsystemType ref="ReportManagement"/>
        <refSubsystemType ref="RealTimeReportExecution"/>
        <refSubsystemType ref="HistoricalDataConsolidation"/>
        <refSubsystemType ref="RealTimeDataConsolidation"/>
        <refSubsystemType ref="DataCollection"/>
    </subsystems>

<processContainers>
        <refProcessContainerType ref="MessageBrokerService"
createUnconditionally="true"/>
        <refProcessContainerType ref="CSTomcat"
createUnconditionally="true"/>
        <refProcessContainerType ref="AdminJBoss"
createUnconditionally="true"/>
        <refProcessContainerType ref="DataProcessingJBoss"
createUnconditionally="false"/>
        <refProcessContainerType ref="ReportingJBoss"
createUnconditionally="true"/>
        <refProcessContainerType ref="ReportingApplicationService"
createUnconditionally="true"/>
        <refProcessContainerType ref="ReportingWebService"
createUnconditionally="true"/>
    </processContainers>
</flavor>
```

*Fig. 15*

```xml
<?xml version="1.0" encoding="UTF-8"?>
<processcontainer xmlns="http://www.rnd.avaya.com"
xmlns:xsi="http://www.w3.org/2001/XMLSchema-instance"
xsi:schemaLocation="http://www.rnd.avaya.com processContainer.xsd"
    type="DataCollectionJBoss"
    resourceBundle="CCRSubsys"
    typeKey="DataCollectionJBoss"
    containerType="jboss"
    minInstances="0"
    maxInstances="1"
    defaultPort="31002"
    stateManageable="true">

<propertyContainer name="process" categoryName="lifecycle">
     <properties>
        <!-- -D options for starting the process container -->
        <stringProperty property="arguments" default="-
Ddss.thread_pool_size=24 -XX:MaxPermSize=128m -Xss128k -Xmx999m -server
-DUSE_DELAY1=60000 -DUSE_DELAY2=60000 -
Dlog4j.configuration=file:$CCR_HOME/appserver/jboss-
boot.log4j.properties -DLOG_FILE_PREFIX=DC_ -Djava.awt.headless=true -
Dorg.jboss.logging.Log4jService.catchSystemErr=false" required="false">
        </stringProperty>
        <stringProperty property="groupId" default="$CCR_USER"
required="false">
        </stringProperty>
        <stringProperty property="userId" default="$CCR_USER"
required="false">
        </stringProperty>
        <stringProperty property="redirect"
default="1>/var/log/Avaya/CCR/DC_${UUID}_console.log 2>&1"
required="false">
        </stringProperty>
        <stringProperty property="jbossInstanceId" default="ccr2"
required="true">
        </stringProperty>
        <integerProperty
            property="shutdownWaitTime"
            default="30"
            required="false">
        </integerProperty>
        <integerProperty
             property="startupPos"
             default="150"
             required="false">
        </integerProperty>

</properties>
  </propertyContainer>

<propertyContainer name="deployment" categoryName="lifecycle">
     <properties>
        <stringProperty
            property="preDeploymentAction"
            default="runuser $CCR_USER -s /bin/bash -c
"$CCR_HOME/bin/deployJBoss.sh data_collection ${UUID}""
            required="true">
```

*Fig. 16A*

```
            </stringProperty>
            <stringProperty property="postUnDeploymentAction"
default="runuser $CCR_USER -s /bin/bash -c
"$CCR_HOME/bin/undeployJBoss.sh"" required="true">
            </stringProperty>
            <longProperty property="execTimeout" default="600000"
required="true">
            </longProperty>
        </properties>
    </propertyContainer>

<processingElements>
        <refProcessingElementType ref="PECMAdapter"
createUnconditionally="false"/>
        <refProcessingElementType ref="PEPDSAdapter"
createUnconditionally="false"/>
    </processingElements>
</processcontainer>
```

Process Container SDL file (DataCollectionJBoss.xml)

Fig. 16B

```
<?xml version="1..0" encoding="UTF-8"?>
<subsystem
    xmlns="http://www.rnd.avaya.com"
    xmlns:xsi="http://www.w3.org/2001/XMLSchema-instance"
    xsi:schemaLocation="http://www.rnd.avaya.com subsystem.xsd"

type="DataCollection"
    resourceBundle="CCRSubsys"
    typeKey="DataCollection"
    minInstances="0"
    maxInstances="1">

<processingElements>
        <refProcessingElementType ref="PECMAdapter"
createUnconditionally="false"/>
        <refProcessingElementType ref="PEPDSAdapter"
                        createUnconditionally="false"/>
    </processingElements>
</subsystem>
```

Fig. 17

```xml
<?xml version="1.0" encoding="UTF-8"?>
<processingElement
   xmlns="http://www.rnd.avaya.com"
   xmlns:xsi="http://www.w3.org/2001/XMLSchema-instance"
   xsi:schemaLocation="http://www.rnd.avaya.com processingElement.xsd"

type="PECMAdapter"
   typeKey="PECMAdapter"
   maxInstances="1"
   minInstances="1"
   stateManageable="true"
   resourceBundle="CCRSubsys"
   mBeanClassName="com.avaya.ccr.common.adapter.PEAdapterLCM"
   startOrder="7">

<!-- PECMAdapter Tab Designation -->
   <UIMetaData>
      <tab tabNameKey="general_key"
         tabNameId="General" >
      </tab>
   </UIMetaData>

<!-- DSS Service Property Container -->
   <propertyContainer
      name="PECMAdapterDSSInterface"
      categoryName="DSSInterface">
         <properties>
            <!-- UUID property value is system generated-->
            <stringProperty
               property="UUID"
               default=""
               required="false">
            </stringProperty>

<!-- Service Type property -->
            <stringProperty
               property="Type"
               default="AdapterManager"
               required="true">
            </stringProperty>

<!-- Major Version property -->
            <stringProperty
               property="Major"
               default="1"
               required="true">
            </stringProperty>

<!-- Minor Version property -->
            <stringProperty
               property="Minor"
               default="0"
               required="true">
            </stringProperty>
```

Fig. 18A

```xml
            <!-- DSS Interface property -->
            <stringProperty
                property="InterfaceClass"
                default="com.avaya.ccr.common.adapter.AdapterManager"
                required="true">
            </stringProperty>

<!-- Protocol property -->
            <stringProperty
                property="DefaultProtocol"
                default="VESP"
                required="true">
            </stringProperty>

<!-- Host property -->
            <stringProperty
                property="Host"
                default=""
                required="false">
            </stringProperty>
        </properties>
</propertyContainer>

<!-- StateManageable DSS Service Property Container -->
<propertyContainer
    name="StateManageableDSSInterface"
    categoryName="DSSInterface">
        <properties>
            <!-- UUID property value is system generated-->
            <stringProperty
                property="UUID"
                default=""
                required="false">
            </stringProperty>

<!-- Service Type property -->
            <stringProperty
                property="Type"
                default="StateManageableDSSInterface"
                required="true">
            </stringProperty>

<!-- Major Version property -->
            <stringProperty
                property="Major"
                default="1"
                required="true">
            </stringProperty>

<!-- Minor Version property -->
            <stringProperty
                property="Minor"
                default="0"
                required="true">
            </stringProperty>

<!-- DSS Interface property -->
```

Fig. 18B

```xml
            <stringProperty
                property="InterfaceClass"
default="com.avaya.coreservice.admin.pe.PEStateManageable"
                required="true">
            </stringProperty>

<!-- Protocol property -->
            <stringProperty
                property="DefaultProtocol"
                default="VESP"
                required="true">
            </stringProperty>

<!-- Host property -->
            <stringProperty
                property="Host"
                default=""
                required="false">
            </stringProperty>
        </properties>
    </propertyContainer>

<!-- heartbeat Property Container -->
    <propertyContainer
      name="heartbeat"
      displayKey="pecmadapter.heartbeat.disp.key"
      descriptionKey="pecmadapter.heartbeat.desc.key"
      categoryName="heartbeat"
      categoryKey="pecmadapter.heartbeat.category.key"
      >
      <properties>

<!-- heartbeatIntervalSeconds property -->
        <longProperty
          property="heartbeatIntervalSeconds"
          default="300"
          required="false"
          restartRequiredOnChange="true"
          >
        </longProperty>

<!-- missingHeartbeatCountsToFailure property -->
        <longProperty
          property="missingHeartbeatCountsToFailure"
          default="4"
          required="false"
          restartRequiredOnChange="true"
          >
        </longProperty>

<!-- missingHeartbeatCountsToUnknown property -->
        <longProperty
          property="missingHeartbeatCountsToUnknown"
          default="2"
          required="false"
          restartRequiredOnChange="true"
```

*Fig. 18C*

```xml
            >
         </longProperty>

<!-- numberRestartsToEscalation property -->
         <longProperty
            property="numberRestartsToEscalation"
            default="5"
            required="false"
            restartRequiredOnChange="true"
            >
         </longProperty>

<!-- restartLimitOnFailure property -->
         <longProperty
            property="restartLimitOnFailure"
            default="10"
            required="false"
            restartRequiredOnChange="true"
            >
         </longProperty>
      </properties>
</propertyContainer>

<!-- inputresource Property Container -->
<propertyContainer
   name="inputresource"
   displayKey="pecmadapter.inputresource.disp.key"
   descriptionKey="pecmadapter.inputresource.desc.key"
   categoryName="inputresource"
   categoryKey="pecmadapter.inputresource.category.key"
   >
   <properties>

<!-- dphostUUID property -->
      <stringProperty
         property="dphostUUID"
         default=""
         required="true"
         restartRequiredOnChange="true"
         >
      </stringProperty>

<!-- inputresourceid property -->
      <stringProperty
         property="inputresourceid"
         default=""
         required="true"
         restartRequiredOnChange="true"
         >
      </stringProperty>

<!-- reportingsourceUUID property -->
      <stringProperty
         property="reportingsourceUUID"
         default=""
         required="true"
         restartRequiredOnChange="true"
```

*Fig. 18D*

```
        >
      </stringProperty>

<!-- sourcelevel property -->
      <integerProperty
        property="sourcelevel"
        default="10"
        minValue="0"
        maxValue="10"
        required="true"
        restartRequiredOnChange="true"
        >
      </integerProperty>

<!-- sourceUUID property -->
      <stringProperty
        property="sourceUUID"
        default=""
        required="true"
        restartRequiredOnChange="true"
        >
      </stringProperty>
    </properties>
  </propertyContainer>

<!-- persistence Property Container -->
  <propertyContainer
    name="persistence"
    displayKey="pecmadapter.persistence.disp.key"
    descriptionKey="pecmadapter.persistence.desc.key"
    categoryName="persistence"
    categoryKey="pecmadapter.persistence.category.key"
    >
    <properties>

<!-- policy property -->
      <stringProperty
        property="policy"
        default="none"
        required="true"
        restartRequiredOnChange="true"
        >
      </stringProperty>
    </properties>
  </propertyContainer>

<resource>
      <refResourceType ref="cm" />
  </resource>

</processingElement>
```

*Fig. 18E*

```xml
<?xml version="1.0" encoding="UTF-8"?>
<resource
    xmlns="http://www.rnd.avaya.com"
    xmlns:xsi="http://www.w3.org/2001/XMLSchema-instance"
    xsi:schemaLocation="http://www.rnd.avaya.com resource.xsd"
    type="cm"
    typeKey="cmKey"
    resourceBundle="CCRSubsys"
    stateManageable="false"
    addEnabled="true"
    deleteEnabled="false"
    childResourceType="pds">
  <description key="CM_DescriptionKey"/>

<UIMetaData>
     <createWizard >
        <page
           pageNumber="1"
           pageTitleKey="CCRSubsys.EventP1Title"
           pageDescKey="CCRSubsys.EventP1Descr"
           pageBundle="CCRSubsys"/>
     </createWizard>
  </UIMetaData>
  <!-- required first class attributes for the resource:   name and
description
   these are well-defined property names, do not change or move these -
->
  <propertyContainer
     name="resourceAttributes"
     categoryName="resourceAttributes">
       <properties>
          <stringProperty
              property="resourceName"
              default=""
              required="true">
          <PropertyUIMetaData
              bundle="CCRSubsys"
              displayKey="CCRSubsys.EventCCRCMName"
              inputType="text"
              wizardProperty="true"
              wizardPageNum="1"
              exposed="false"
              advanced="false"
              tabNameId="General"
              editPageReadOnly="false">
          </PropertyUIMetaData>
       </stringProperty>
          <stringProperty
              property="resourceDescription"
              default=""
              required="true">
          <PropertyUIMetaData
              bundle="CCRSubsys"
              displayKey="CCRSubsys.EventCCRCMDesc"
              inputType="text"
              wizardProperty="true"
              wizardPageNum="1"
```

*Fig. 19A*

```
                exposed="true"
                advanced="false"
                tabNameId="General"
                editPageReadOnly="false">
            </PropertyUIMetaData>
        </stringProperty>
    </properties>
</propertyContainer>

<!-- Generated Properties Start -->

<!-- cmadapter Property Container -->
    <propertyContainer
        name="cmadapter"
        displayKey="adaptermanager.cmadapter.disp.key"
        descriptionKey="adaptermanager.cmadapter.desc.key"
        categoryName="cmadapter"
        categoryKey="adaptermanager.cmadapter.category.key"
        >
        <properties>

<!-- servername property -->
            <stringProperty
                property="servername"
                default=""
                required="true"

validationClass="com.avaya.coreservice.admin.subsystem.metadata.propert
y.validator.IPAddressValidator"
                restartRequiredOnChange="true"
                >
                <PropertyUIMetaData
                    bundle="CCRSubsys"

displayKey="adaptermanager.gui.cmadapter.servername.disp.key"

descriptionKey="adaptermanager.gui.cmadapter.servername.desc.key"
                    inputType="text"
                    wizardProperty="true"
                    wizardPageNum="1"
                    exposed="true"
                    administrable="true"
                    tabNameId="General"

groupKey="adaptermanager.gui.cmadapter.servername.group.key"
                >
                </PropertyUIMetaData>
            </stringProperty>

<!-- portnumber property -->
            <integerProperty
                property="portnumber"
                default="5002"
                minValue="0"
                maxValue="65535"
                required="true"
                restartRequiredOnChange="true"
```

*Fig. 19B*

```
                >
            <PropertyUIMetaData
                bundle="CCRSubsys"
displayKey="adaptermanager.gui.cmadapter.portnumber.disp.key"
descriptionKey="adaptermanager.gui.cmadapter.portnumber.desc.key"
                inputType="text"
                wizardProperty="true"
                wizardPageNum="1"
                exposed="true"
                administrable="true"
                tabNameId="General"
groupKey="adaptermanager.gui.cmadapter.portnumber.group.key"
                >
            </PropertyUIMetaData>
        </integerProperty>

<!-- language property -->
        <stringProperty
            property="language"
            default=""
            required="true"
            restartRequiredOnChange="true"
            >
            <PropertyUIMetaData
                bundle="CCRSubsys"
                displayKey="adaptermanager.gui.cmadapter.language.disp.key"
descriptionKey="adaptermanager.gui.cmadapter.language.desc.key"
                inputType="dropdown"
                wizardProperty="true"
                wizardPageNum="1"
                exposed="true"
                administrable="true"
                tabNameId="General"
                groupKey="adaptermanager.gui.cmadapter.language.group.key"
                >
            <selectOptions
objType="com.avaya.coreservice.admin.struts.host.optionsObj">
                <option
label="adaptermanager.gui.cmadapter.language.option1.key" value="4.0"
selected="true"/>
                <option
label="adaptermanager.gui.cmadapter.language.option2.key" value="3.1"
/>
            </selectOptions>
            </PropertyUIMetaData>
        </stringProperty>

<!-- adminparser property -->
        <stringProperty
            property="adminparser"
            default="${CCR_HOME}/data/eventmgt/XML/adminmsgs.xml"
            required="true"
            restartRequiredOnChange="true"
```

*Fig. 19C*

```xml
            >
            <PropertyUIMetaData
              bundle="CCRSubsys"

displayKey="adaptermanager.gui.cmadapter.adminparser.disp.key"

descriptionKey="adaptermanager.gui.cmadapter.adminparser.desc.key"
              inputType="text"
              exposed="true"
              administrable="true"
              tabNameId="General"

groupKey="adaptermanager.gui.cmadapter.adminparser.group.key"
            >
            </PropertyUIMetaData>
          </stringProperty>

<!-- adminparserjars property -->
          <stringProperty
            property="adminparserjars"
            default="${CCR_HOME}/jars/eeplugins"
            required="true"
            restartRequiredOnChange="true"
          >
          </stringProperty>

<!-- adminpumpumptimeout property -->
          <longProperty
            property="adminpumpumptimeout"
            default="180000"
            required="true"
            restartRequiredOnChange="true"
          >
          </longProperty>

<!-- agentnames property -->
          <integerProperty
            property="agentnames"
            default="1"
            required="true"
            restartRequiredOnChange="true"
          >
          </integerProperty>

<!-- attemptsinterval property -->
          <integerProperty
            property="attemptsinterval"
            default="20000"
            minValue="10000"
            maxValue="30000"
            required="true"
            restartRequiredOnChange="true"
          >
            <PropertyUIMetaData
              bundle="CCRSubsys"

displayKey="adaptermanager.gui.cmadapter.attemptsinterval.disp.key"
```

*Fig. 19D*

```
descriptionKey="adaptermanager.gui.cmadapter.attemptsinterval.desc.key"
          inputType="text"
          exposed="true"
          administrable="true"
          tabNameId="General"

groupKey="adaptermanager.gui.cmadapter.attemptsinterval.group.key"
          >
          </PropertyUIMetaData>
        </integerProperty>

<!-- calledsa property -->
        <integerProperty
          property="calledsa"
          default="1"
          minValue="1"
          maxValue="384"
          required="true"
          restartRequiredOnChange="true"
          >
          <PropertyUIMetaData
            bundle="CCRSubsys"
            displayKey="adaptermanager.gui.cmadapter.calledsa.disp.key"

descriptionKey="adaptermanager.gui.cmadapter.calledsa.desc.key"
          inputType="text"
          exposed="true"
          administrable="true"
          tabNameId="General"
          groupKey="adaptermanager.gui.cmadapter.calledsa.group.key"
          >
          </PropertyUIMetaData>
        </integerProperty>

<!-- callingsa property -->
        <integerProperty
          property="callingsa"
          default="1"
          minValue="1"
          maxValue="384"
          required="true"
          restartRequiredOnChange="true"
          >
          <PropertyUIMetaData
            bundle="CCRSubsys"

displayKey="adaptermanager.gui.cmadapter.callingsa.disp.key"

descriptionKey="adaptermanager.gui.cmadapter.callingsa.desc.key"
          inputType="text"
          exposed="true"
          administrable="true"
          tabNameId="General"
          groupKey="adaptermanager.gui.cmadapter.callingsa.group.key"
          >
          </PropertyUIMetaData>
```

*Fig. 19E*

```xml
        </integerProperty>

<!-- camtimer property -->
        <integerProperty
          property="camtimer"
          default="15000"
          minValue="10000"
          maxValue="30000"
          required="true"
          restartRequiredOnChange="true"
          >
          <PropertyUIMetaData
            bundle="CCRSubsys"
            displayKey="adaptermanager.gui.cmadapter.camtimer.disp.key"
            descriptionKey="adaptermanager.gui.cmadapter.camtimer.desc.key"
            inputType="text"
            exposed="true"
            administrable="true"
            tabNameId="General"
            groupKey="adaptermanager.gui.cmadapter.camtimer.group.key"
            >
          </PropertyUIMetaData>
        </integerProperty>

<!-- cmerroraction property -->
        <stringProperty
          property="cmerroraction"
          default="${CCR_HOME}/data/eventmgt/properties/CMErrorAction.properties"
          required="true"
          restartRequiredOnChange="true"
          >
          <PropertyUIMetaData
            bundle="CCRSubsys"
            displayKey="adaptermanager.gui.cmadapter.cmerroraction.disp.key"
            descriptionKey="adaptermanager.gui.cmadapter.cmerroraction.desc.key"
            inputType="text"
            exposed="true"
            administrable="true"
            tabNameId="General"
            groupKey="adaptermanager.gui.cmadapter.cmerroraction.group.key"
            >
          </PropertyUIMetaData>
        </stringProperty>

<!-- cmparser property -->
        <stringProperty
          property="cmparser"
          default="${CCR_HOME}/data/eventmgt/XML/cmmsgs.xml"
          required="true"
          restartRequiredOnChange="true"
          >
          <PropertyUIMetaData
```

*Fig. 19F*

```xml
            bundle="CCRSubsys"
            displayKey="adaptermanager.gui.cmadapter.cmparser.disp.key"
descriptionKey="adaptermanager.gui.cmadapter.cmparser.desc.key"
            inputType="text"
            exposed="true"
            administrable="true"
            tabNameId="General"
            groupKey="adaptermanager.gui.cmadapter.cmparser.group.key"
        >
        </PropertyUIMetaData>
    </stringProperty>

<!-- cmparserjars property -->
    <stringProperty
        property="cmparserjars"
        default="${CCR_HOME}/jars/eeplugins"
        required="true"
        restartRequiredOnChange="true"
    >
    </stringProperty>

<!-- flowcontrolflag property -->
    <integerProperty
        property="flowcontrolflag"
        default="0"
        required="true"
        restartRequiredOnChange="true"
    >
    </integerProperty>

<!-- huntgroupnames property -->
    <integerProperty
        property="huntgroupnames"
        default="1"
        required="true"
        restartRequiredOnChange="true"
    >
    </integerProperty>

<!-- keepaliveflag property -->
    <integerProperty
        property="keepaliveflag"
        default="1"
        required="true"
        restartRequiredOnChange="true"
    >
    </integerProperty>

<!-- L20max.agentgrps property -->
    <integerProperty
        property="L20max.agentgrps"
        default="60000"
        required="true"
        restartRequiredOnChange="true"
    >
    </integerProperty>
```

*Fig. 19G*

```xml
<!-- L20max.skills property -->
<integerProperty
  property="L20max.skills"
  default="2000"
  required="true"
  restartRequiredOnChange="true"
  >
</integerProperty>

<!-- L20max.trunkgrps property -->
<integerProperty
  property="L20max.trunkgrps"
  default="2000"
  required="true"
  restartRequiredOnChange="true"
  >
</integerProperty>

<!-- L20max.trunks property -->
<integerProperty
  property="L20max.trunks"
  default="8000"
  required="true"
  restartRequiredOnChange="true"
  >
</integerProperty>

<!-- L20max.vdns property -->
<integerProperty
  property="L20max.vdns"
  default="20000"
  required="true"
  restartRequiredOnChange="true"
  >
</integerProperty>

<!-- L21max.agentgrps property -->
<integerProperty
  property="L21max.agentgrps"
  default="100000"
  required="true"
  restartRequiredOnChange="true"
  >
</integerProperty>

<!-- L21max.skills property -->
<integerProperty
  property="L21max.skills"
  default="2000"
  required="true"
  restartRequiredOnChange="true"
  >
</integerProperty>

<!-- L21max.trunkgrps property -->
<integerProperty
```

*Fig. 19H*

```xml
        property="L21max.trunkgrps"
        default="2000"
        required="true"
        restartRequiredOnChange="true"
        >
</integerProperty>

<!-- L21max.trunks property -->
<integerProperty
        property="L21max.trunks"
        default="12000"
        required="true"
        restartRequiredOnChange="true"
        >
</integerProperty>

<!-- L21max.vdns property -->
<integerProperty
        property="L21max.vdns"
        default="20000"
        required="true"
        restartRequiredOnChange="true"
        >
</integerProperty>

<!-- licenseRetryWait property -->
<longProperty
        property="licenseRetryWait"
        default="60"
        minValue="0"
        maxValue="2592000"
        required="true"
        restartRequiredOnChange="true"
        >
        <PropertyUIMetaData
          bundle="CCRSubsys"
displayKey="adaptermanager.gui.cmadapter.licenseretrywait.disp.key"

descriptionKey="adaptermanager.gui.cmadapter.licenseretrywait.desc.key"
          inputType="text"
          exposed="true"
          administrable="true"
          tabNameId="General"

groupKey="adaptermanager.gui.cmadapter.licenseretrywait.group.key"
          >
        </PropertyUIMetaData>
</longProperty>

<!-- maxrestarts property -->
<integerProperty
        property="maxrestarts"
        default="0"
        minValue="0"
        maxValue="1000"
        required="true"
```

*Fig. 19I*

```xml
            restartRequiredOnChange="true"
          >
          <PropertyUIMetaData
            bundle="CCRSubsys"
            displayKey="adaptermanager.gui.cmadapter.maxrestarts.disp.key"
            descriptionKey="adaptermanager.gui.cmadapter.maxrestarts.desc.key"
            inputType="text"
            exposed="true"
            administrable="true"
            tabNameId="General"
            groupKey="adaptermanager.gui.cmadapter.maxrestarts.group.key"
          >
          </PropertyUIMetaData>
        </integerProperty>

<!-- messageretries property -->
        <integerProperty
          property="messageretries"
          default="3"
          minValue="1"
          maxValue="10"
          required="true"
          restartRequiredOnChange="true"
          >
          <PropertyUIMetaData
            bundle="CCRSubsys"
            displayKey="adaptermanager.gui.cmadapter.messageretries.disp.key"
            descriptionKey="adaptermanager.gui.cmadapter.messageretries.desc.key"
            inputType="text"
            exposed="true"
            administrable="true"
            tabNameId="General"
            groupKey="adaptermanager.gui.cmadapter.messageretries.group.key"
          >
          </PropertyUIMetaData>
        </integerProperty>

<!-- playbackname property -->
        <stringProperty
          property="playbackname"
          default="AdapterRecord"
          required="true"
          restartRequiredOnChange="true"
          >
          <PropertyUIMetaData
            bundle="CCRSubsys"
            displayKey="adaptermanager.gui.cmadapter.playbackname.disp.key"
            descriptionKey="adaptermanager.gui.cmadapter.playbackname.desc.key"
            inputType="text"
```

*Fig. 19J*

```xml
                exposed="true"
                administrable="true"
                tabNameId="General"
groupKey="adaptermanager.gui.cmadapter.playbackname.group.key"
            >
            </PropertyUIMetaData>
        </stringProperty>

<!-- recordername property -->
        <stringProperty
            property="recordername"
            default="AdapterRecord"
            required="true"
            restartRequiredOnChange="true"
            >
            <PropertyUIMetaData
                bundle="CCRSubsys"
displayKey="adaptermanager.gui.cmadapter.recordername.disp.key"
descriptionKey="adaptermanager.gui.cmadapter.recordername.desc.key"
                inputType="text"
                exposed="true"
                administrable="true"
                tabNameId="General"
groupKey="adaptermanager.gui.cmadapter.recordername.group.key"
            >
            </PropertyUIMetaData>
        </stringProperty>

<!-- recoveryflag property -->
        <integerProperty
            property="recoveryflag"
            default="0"
            required="true"
            restartRequiredOnChange="true"
            >
        </integerProperty>

<!-- reqnamemode property -->
        <integerProperty
            property="reqnamemode"
            default="0"
            required="true"
            restartRequiredOnChange="true"
            >
        </integerProperty>

<!-- resyncflag property -->
        <integerProperty
            property="resyncflag"
            default="0"
            required="true"
            restartRequiredOnChange="true"
            >
```

*Fig. 19K*

```
            </integerProperty>

<!-- rtcs7timeout property -->
            <integerProperty
              property="rtcs7timeout"
              default="20000"
              minValue="10000"
              maxValue="60000"
              required="true"
              restartRequiredOnChange="true"
            >
              <PropertyUIMetaData
                bundle="CCRSubsys"

displayKey="adaptermanager.gui.cmadapter.rtcs7timeout.disp.key"

descriptionKey="adaptermanager.gui.cmadapter.rtcs7timeout.desc.key"
                inputType="text"
                exposed="true"
                administrable="true"
                tabNameId="General"

groupKey="adaptermanager.gui.cmadapter.rtcs7timeout.group.key"
              >
              </PropertyUIMetaData>
            </integerProperty>

<!-- sockettimeout property -->
            <integerProperty
              property="sockettimeout"
              default="0"
              minValue="0"
              maxValue="300000"
              required="true"
              restartRequiredOnChange="true"
            >
              <PropertyUIMetaData
                bundle="CCRSubsys"

displayKey="adaptermanager.gui.cmadapter.sockettimeout.disp.key"

descriptionKey="adaptermanager.gui.cmadapter.sockettimeout.desc.key"
                inputType="text"
                exposed="true"
                administrable="true"
                tabNameId="General"

groupKey="adaptermanager.gui.cmadapter.sockettimeout.group.key"
              >
              </PropertyUIMetaData>
            </integerProperty>

<!-- spduackflag property -->
            <integerProperty
              property="spduackflag"
              default="1"
              required="true"
```

*Fig. 19L*

```xml
                    restartRequiredOnChange="true"
                >
            </integerProperty>

<!-- timediff.countbeforedropping property -->
            <integerProperty
                property="timediff.countbeforedropping"
                default="5"
                minValue="2"
                maxValue="1450"
                required="true"
                restartRequiredOnChange="true"
            >
                <PropertyUIMetaData
                    bundle="CCRSubsys"
displayKey="adaptermanager.gui.cmadapter.timediff.countbeforedropping.d
isp.key"
descriptionKey="adaptermanager.gui.cmadapter.timediff.countbeforedroppi
ng.desc.key"
                    inputType="text"
                    exposed="true"
                    administrable="true"
                    tabNameId="General"
groupKey="adaptermanager.gui.cmadapter.timediff.countbeforedropping.gro
up.key"
                >
                </PropertyUIMetaData>
            </integerProperty>

<!-- timediff.criticalcountbetweenalarms property -->
            <integerProperty
                property="timediff.criticalcountbetweenalarms"
                default="5"
                minValue="2"
                maxValue="1450"
                required="true"
                restartRequiredOnChange="true"
            >
                <PropertyUIMetaData
                    bundle="CCRSubsys"
displayKey="adaptermanager.gui.cmadapter.timediff.criticalcountbetweena
larms.disp.key"
descriptionKey="adaptermanager.gui.cmadapter.timediff.criticalcountbetw
eenalarms.desc.key"
                    inputType="text"
                    exposed="true"
                    administrable="true"
                    tabNameId="General"
groupKey="adaptermanager.gui.cmadapter.timediff.criticalcountbetweenala
rms.group.key"
                >
```

*Fig. 19M*

```xml
            </PropertyUIMetaData>
        </integerProperty>

<!-- timediff.criticalmaxsecsdiff property -->
        <integerProperty
            property="timediff.criticalmaxsecsdiff"
            default="20"
            minValue="11"
            maxValue="4200"
            required="true"
            restartRequiredOnChange="true"
        >
            <PropertyUIMetaData
                bundle="CCRSubsys"

displayKey="adaptermanager.gui.cmadapter.timediff.criticalmaxsecsdiff.d
isp.key"

descriptionKey="adaptermanager.gui.cmadapter.timediff.criticalmaxsecsdi
ff.desc.key"
                inputType="text"
                exposed="true"
                administrable="true"
                tabNameId="General"

groupKey="adaptermanager.gui.cmadapter.timediff.criticalmaxsecsdiff.gro
up.key"
            >
            </PropertyUIMetaData>
        </integerProperty>

<!-- timediff.droplink property -->
        <stringProperty
            property="timediff.droplink"
            default="true"
            required="true"
            restartRequiredOnChange="true"
        >
            <PropertyUIMetaData
                bundle="CCRSubsys"

displayKey="adaptermanager.gui.cmadapter.timediff.droplink.disp.key"

descriptionKey="adaptermanager.gui.cmadapter.timediff.droplink.desc.key
"
                inputType="dropdown"
                exposed="true"
                administrable="true"
                tabNameId="General"

groupKey="adaptermanager.gui.cmadapter.timediff.droplink.group.key"
            >
                <selectOptions
objType="com.avaya.coreservice.admin.struts.host.optionsObj">
                    <option
label="adaptermanager.gui.cmadapter.timediff.droplink.option1.key"
value="true" selected="true"/>
```

*Fig. 19N*

```xml
            <option
label="adaptermanager.gui.cmadapter.timediff.droplink.option2.key"
value="false" />
            </selectOptions>
          </PropertyUIMetaData>
       </stringProperty>

<!-- timediff.infocountbetweenalarms property -->
       <integerProperty
         property="timediff.infocountbetweenalarms"
         default="20"
         minValue="15"
         maxValue="1450"
         required="true"
         restartRequiredOnChange="true"
         >
         <PropertyUIMetaData
           bundle="CCRSubsys"

displayKey="adaptermanager.gui.cmadapter.timediff.infocountbetweenalarms.disp.key"

descriptionKey="adaptermanager.gui.cmadapter.timediff.infocountbetweenalarms.desc.key"
           inputType="text"
           exposed="true"
           administrable="true"
           tabNameId="General"

groupKey="adaptermanager.gui.cmadapter.timediff.infocountbetweenalarms.group.key"
           >
         </PropertyUIMetaData>
       </integerProperty>

<!-- timediff.infomaxsecsdiff property -->
       <integerProperty
         property="timediff.infomaxsecsdiff"
         default="5"
         minValue="1"
         maxValue="4200"
         required="true"
         restartRequiredOnChange="true"
         >
         <PropertyUIMetaData
           bundle="CCRSubsys"

displayKey="adaptermanager.gui.cmadapter.timediff.infomaxsecsdiff.disp.key"

descriptionKey="adaptermanager.gui.cmadapter.timediff.infomaxsecsdiff.desc.key"
           inputType="text"
           exposed="true"
           administrable="true"
           tabNameId="General"
```

*Fig. 19O*

```xml
groupKey="adaptermanager.gui.cmadapter.timediff.infomaxsecsdiff.group.k
ey"
            >
          </PropertyUIMetaData>
        </integerProperty>

<!-- timediff.majorcountbetweenalarms property -->
        <integerProperty
          property="timediff.majorcountbetweenalarms"
          default="10"
          minValue="5"
          maxValue="1450"
          required="true"
          restartRequiredOnChange="true"
          >
          <PropertyUIMetaData
            bundle="CCRSubsys"

displayKey="adaptermanager.gui.cmadapter.timediff.majorcountbetweenalar
ms.disp.key"

descriptionKey="adaptermanager.gui.cmadapter.timediff.majorcountbetween
alarms.desc.key"
            inputType="text"
            exposed="true"
            administrable="true"
            tabNameId="General"

groupKey="adaptermanager.gui.cmadapter.timediff.majorcountbetweenalarms
.group.key"
            >
          </PropertyUIMetaData>
        </integerProperty>

<!-- timediff.majormaxsecsdiff property -->
        <integerProperty
          property="timediff.majormaxsecsdiff"
          default="15"
          minValue="10"
          maxValue="4200"
          required="true"
          restartRequiredOnChange="true"
          >
          <PropertyUIMetaData
            bundle="CCRSubsys"

displayKey="adaptermanager.gui.cmadapter.timediff.majormaxsecsdiff.disp
.key"

descriptionKey="adaptermanager.gui.cmadapter.timediff.majormaxsecsdiff.
desc.key"
            inputType="text"
            exposed="true"
            administrable="true"
            tabNameId="General"
```

*Fig. 19P*

```
groupKey="adaptermanager.gui.cmadapter.timediff.majormaxsecsdiff.group.
key"
            >
          </PropertyUIMetaData>
        </integerProperty>

<!-- timediff.minorcountbetweenalarms property -->
        <integerProperty
          property="timediff.minorcountbetweenalarms"
          default="15"
          minValue="10"
          maxValue="1450"
          required="true"
          restartRequiredOnChange="true"
          >
          <PropertyUIMetaData
            bundle="CCRSubsys"

displayKey="adaptermanager.gui.cmadapter.timediff.minorcountbetweenalar
ms.disp.key"

descriptionKey="adaptermanager.gui.cmadapter.timediff.minorcountbetween
alarms.desc.key"
            inputType="text"
            exposed="true"
            administrable="true"
            tabNameId="General"

groupKey="adaptermanager.gui.cmadapter.timediff.minorcountbetweenalarms
.group.key"
            >
          </PropertyUIMetaData>
        </integerProperty>

<!-- timediff.minormaxsecsdiff property -->
        <integerProperty
          property="timediff.minormaxsecsdiff"
          default="10"
          minValue="2"
          maxValue="4200"
          required="true"
          restartRequiredOnChange="true"
          >
          <PropertyUIMetaData
            bundle="CCRSubsys"

displayKey="adaptermanager.gui.cmadapter.timediff.minormaxsecsdiff.disp
.key"

descriptionKey="adaptermanager.gui.cmadapter.timediff.minormaxsecsdiff.
desc.key"
            inputType="text"
            exposed="true"
            administrable="true"
            tabNameId="General"
```

Fig. 19Q

```
groupKey="adaptermanager.gui.cmadapter.timediff.minormaxsecsdiff.group.
key"
          >
        </PropertyUIMetaData>
      </integerProperty>

<!-- timediff.threshold property -->
      <integerProperty
        property="timediff.threshold"
        default="300"
        minValue="5"
        maxValue="30000000"
        required="true"
        restartRequiredOnChange="true"
        >
        <PropertyUIMetaData
          bundle="CCRSubsys"

displayKey="adaptermanager.gui.cmadapter.timediff.threshold.disp.key"

descriptionKey="adaptermanager.gui.cmadapter.timediff.threshold.desc.ke
y"
          inputType="text"
          exposed="true"
          administrable="true"
          tabNameId="General"

groupKey="adaptermanager.gui.cmadapter.timediff.threshold.group.key"
          >
        </PropertyUIMetaData>
      </integerProperty>

<!-- trunkgroupnames property -->
      <integerProperty
        property="trunkgroupnames"
        default="1"
        minValue="0"
        maxValue="1"
        required="true"
        restartRequiredOnChange="true"
        >
        <PropertyUIMetaData
          bundle="CCRSubsys"

displayKey="adaptermanager.gui.cmadapter.trunkgroupnames.disp.key"

descriptionKey="adaptermanager.gui.cmadapter.trunkgroupnames.desc.key"
          inputType="text"
          exposed="true"
          administrable="true"
          tabNameId="General"

groupKey="adaptermanager.gui.cmadapter.trunkgroupnames.group.key"
          >
        </PropertyUIMetaData>
      </integerProperty>
```

*Fig. 19R*

```xml
        <!-- vdnnames property -->
        <integerProperty
          property="vdnnames"
          default="1"
          minValue="0"
          maxValue="1"
          required="true"
          restartRequiredOnChange="true"
        >
        <PropertyUIMetaData
           bundle="CCRSubsys"
           displayKey="adaptermanager.gui.cmadapter.vdnnames.disp.key"
descriptionKey="adaptermanager.gui.cmadapter.vdnnames.desc.key"
           inputType="text"
           exposed="true"
           administrable="true"
           tabNameId="General"
           groupKey="adaptermanager.gui.cmadapter.vdnnames.group.key"
           >
        </PropertyUIMetaData>
        </integerProperty>

<!-- vectornames property -->
        <integerProperty
          property="vectornames"
          default="1"
          minValue="0"
          maxValue="1"
          required="true"
          restartRequiredOnChange="true"
        >
        <PropertyUIMetaData
           bundle="CCRSubsys"
displayKey="adaptermanager.gui.cmadapter.vectornames.disp.key"
descriptionKey="adaptermanager.gui.cmadapter.vectornames.desc.key"
           inputType="text"
           exposed="true"
           administrable="true"
           tabNameId="General"
groupKey="adaptermanager.gui.cmadapter.vectornames.group.key"
           >
        </PropertyUIMetaData>
        </integerProperty>

<!-- wsatimer property -->
        <integerProperty
          property="wsatimer"
          default="25000"
          minValue="10000"
          maxValue="30000"
          required="true"
          restartRequiredOnChange="true"
```

*Fig. 19S*

```xml
          >
          <PropertyUIMetaData
            bundle="CCRSubsys"
            displayKey="adaptermanager.gui.cmadapter.wsatimer.disp.key"
descriptionKey="adaptermanager.gui.cmadapter.wsatimer.desc.key"
            inputType="text"
            exposed="true"
            administrable="true"
            tabNameId="General"
            groupKey="adaptermanager.gui.cmadapter.wsatimer.group.key"
            >
          </PropertyUIMetaData>
        </integerProperty>
      </properties>
    </propertyContainer>

<!-- adapter_plugin Property Container -->
    <propertyContainer
      name="adapter_plugin"
      displayKey="adaptermanager.adapter_plugin.disp.key"
      descriptionKey="adaptermanager.adapter_plugin.desc.key"
      categoryName="adapter_plugin"
      categoryKey="adaptermanager.adapter_plugin.category.key"
      >
      <properties>

<!-- SourceId property -->
        <stringProperty
          property="SourceId"
          default=""
          required="true"
          restartRequiredOnChange="true"
          >
          <PropertyUIMetaData
            bundle="CCRSubsys"
displayKey="adaptermanager.gui.adapter_plugin.sourceid.disp.key"
descriptionKey="adaptermanager.gui.adapter_plugin.sourceid.desc.key"
            inputType="text"
            wizardProperty="true"
            wizardPageNum="1"
            exposed="true"
            administrable="true"
            tabNameId="General"
groupKey="adaptermanager.gui.adapter_plugin.sourceid.group.key"
            >
          </PropertyUIMetaData>
        </stringProperty>

<!-- InputId property -->
        <stringProperty
          property="InputId"
          default=""
          required="true"
```

Fig. 19T

```xml
                    restartRequiredOnChange="true"
                >
                <PropertyUIMetaData
                    bundle="CCRSubsys"

displayKey="adaptermanager.gui.adapter_plugin.inputid.disp.key"

descriptionKey="adaptermanager.gui.adapter_plugin.inputid.desc.key"
                    inputType="text"
                    wizardProperty="true"
                    wizardPageNum="1"
                    exposed="true"
                    administrable="true"
                    tabNameId="General"

groupKey="adaptermanager.gui.adapter_plugin.inputid.group.key"
                >
                </PropertyUIMetaData>
            </stringProperty>

<!-- classname property -->
            <stringProperty
                property="classname"
                default="com.avaya.ccr.eventmgt.cmadapter.CMAdapterFacade"
                required="true"
                restartRequiredOnChange="true"
            >
                <PropertyUIMetaData
                    bundle="CCRSubsys"

displayKey="adaptermanager.gui.adapter_plugin.classname.disp.key"

descriptionKey="adaptermanager.gui.adapter_plugin.classname.desc.key"
                    inputType="text"
                    exposed="true"
                    administrable="true"
                    tabNameId="General"

groupKey="adaptermanager.gui.adapter_plugin.classname.group.key"
                >
                </PropertyUIMetaData>
            </stringProperty>

<!-- itname property -->
            <stringProperty
                property="itname"
                default="cmit"
                required="true"
                restartRequiredOnChange="true"
            >
            </stringProperty>

<!-- playback_classname property -->
            <stringProperty
                property="playback_classname"
                default="com.avaya.ccr.eventmgt.cmadapter.CMAdapterFacade"
                required="true"
```

*Fig. 19U*

```
                    restartRequiredOnChange="true"
                >
                <PropertyUIMetaData
                    bundle="CCRSubsys"
displayKey="adaptermanager.gui.adapter_plugin.playback_classname.disp.k
ey"
descriptionKey="adaptermanager.gui.adapter_plugin.playback_classname.de
sc.key"
                    inputType="text"
                    exposed="true"
                    administrable="true"
                    tabNameId="General"
groupKey="adaptermanager.gui.adapter_plugin.playback_classname.group.ke
y"
                    >
                </PropertyUIMetaData>
            </stringProperty>

<!-- playback_enable property -->
            <booleanProperty
                property="playback_enable"
                default="false"
                required="true"
                restartRequiredOnChange="true"
                >
                <PropertyUIMetaData
                    bundle="CCRSubsys"
displayKey="adaptermanager.gui.adapter_plugin.playback_enable.disp.key"
descriptionKey="adaptermanager.gui.adapter_plugin.playback_enable.desc.
key"
                    inputType="dropdown"
                    exposed="true"
                    administrable="true"
                    tabNameId="General"
groupKey="adaptermanager.gui.adapter_plugin.playback_enable.group.key"
                    >
                    <selectOptions
objType="com.avaya.coreservice.admin.struts.host.optionsObj">
                        <option
label="adaptermanager.gui.adapter_plugin.playback_enable.option1.key"
value="false" selected="true"/>
                        <option
label="adaptermanager.gui.adapter_plugin.playback_enable.option2.key"
value="true" />
                    </selectOptions>
                </PropertyUIMetaData>
            </booleanProperty>

<!-- SourceType property -->
            <stringProperty
                property="SourceType"
```

*Fig. 19V*

```
            default="cm"
            required="true"
            restartRequiredOnChange="true"
            >
        </stringProperty>
    </properties>
</propertyContainer>

<!-- clientbulksession.persistence Property Container -->
<propertyContainer
    name="clientbulksession.persistence"
displayKey="adaptermanager.clientbulksession.persistence.disp.key"
descriptionKey="adaptermanager.clientbulksession.persistence.desc.key"
        categoryName="clientbulksession.persistence"
categoryKey="adaptermanager.clientbulksession.persistence.category.key"
    >
        <properties>

<!-- policy property -->
        <stringProperty
            property="policy"
            default="memory"
            required="true"
            restartRequiredOnChange="true"
            >
            <PropertyUIMetaData
                bundle="CCRSubsys"
displayKey="adaptermanager.gui.clientbulksession.persistence.policy.disp.key"
descriptionKey="adaptermanager.gui.clientbulksession.persistence.policy.desc.key"
            inputType="dropdown"
            wizardProperty="true"
            wizardPageNum="1"
            exposed="true"
            administrable="true"
            tabNameId="General"
groupKey="adaptermanager.gui.clientbulksession.persistence.policy.group.key"
            >
            <selectOptions
objType="com.avaya.coreservice.admin.struts.host.optionsObj">
                <option
label="adaptermanager.gui.clientbulksession.persistence.policy.option1.key" value="memory" selected="true"/>
                <option
label="adaptermanager.gui.clientbulksession.persistence.policy.option2.key" value="disk" />
                <option
label="adaptermanager.gui.clientbulksession.persistence.policy.option3.key" value="none" />
```

*Fig. 19W*

```xml
        </selectOptions>
      </PropertyUIMetaData>
    </stringProperty>
  </properties>
</propertyContainer>

<!-- acp Property Container -->
<propertyContainer
  name="acp"
  displayKey="adaptermanager.acp.disp.key"
  descriptionKey="adaptermanager.acp.desc.key"
  categoryName="acp"
  categoryKey="adaptermanager.acp.category.key"
  >
  <properties>

<!-- list property -->
    <stringProperty
      property="list"
      default="acpadmin"
      required="true"
      restartRequiredOnChange="true"
      >
      <PropertyUIMetaData
        bundle="CCRSubsys"
        displayKey="adaptermanager.gui.acp.list.disp.key"
        descriptionKey="adaptermanager.gui.acp.list.desc.key"
        inputType="text"
        exposed="true"
        administrable="true"
        tabNameId="General"
        groupKey="adaptermanager.gui.acp.list.group.key"
        >
      </PropertyUIMetaData>
    </stringProperty>
  </properties>
</propertyContainer>

<!-- acpadmin Property Container -->
<propertyContainer
  name="acpadmin"
  displayKey="adaptermanager.acpadmin.disp.key"
  descriptionKey="adaptermanager.acpadmin.desc.key"
  categoryName="acpadmin"
  categoryKey="adaptermanager.acpadmin.category.key"
  >
  <properties>

<!-- sender property -->
    <stringProperty
      property="sender"
      default="com.avaya.ccr.common.servicecomponent.jms.JMSSender"
      required="true"
      restartRequiredOnChange="true"
      >
    </stringProperty>
```

*Fig. 19X*

```xml
        <!-- type property -->
        <stringProperty
          property="type"
          default="ADMIN"
          required="true"
          restartRequiredOnChange="true"
          >
          <PropertyUIMetaData
            bundle="CCRSubsys"
            displayKey="adaptermanager.gui.acpadmin.type.disp.key"
            descriptionKey="adaptermanager.gui.acpadmin.type.desc.key"
            inputType="text"
            exposed="true"
            administrable="true"
            tabNameId="General"
            groupKey="adaptermanager.gui.acpadmin.type.group.key"
            >
          </PropertyUIMetaData>
        </stringProperty>
      </properties>
   </propertyContainer>

<!-- acpadmin.JMSSender Property Container -->
   <propertyContainer
      name="acpadmin.JMSSender"
      displayKey="adaptermanager.acpadmin.jmssender.disp.key"
      descriptionKey="adaptermanager.acpadmin.jmssender.desc.key"
      categoryName="acpadmin.JMSSender"
      categoryKey="adaptermanager.acpadmin.jmssender.category.key"
      >
      <properties>

<!-- brokerurl property -->
        <stringProperty
          property="brokerurl"
          default="failover:(tcp://localhost:61616)"
          required="true"
          restartRequiredOnChange="true"
          >
          <PropertyUIMetaData
            bundle="CCRSubsys"
displayKey="adaptermanager.gui.acpadmin.jmssender.brokerurl.disp.key"
descriptionKey="adaptermanager.gui.acpadmin.jmssender.brokerurl.desc.key"
            inputType="text"
            exposed="true"
            administrable="true"
            tabNameId="General"
groupKey="adaptermanager.gui.acpadmin.jmssender.brokerurl.group.key"
            >
          </PropertyUIMetaData>
        </stringProperty>

<!-- connectionretry property -->
```

*Fig. 19Y*

```xml
<integerProperty
   property="connectionretry"
   default="5"
   minValue="1"
   maxValue="10"
   required="true"
   restartRequiredOnChange="true"
>
<PropertyUIMetaData
   bundle="CCRSubsys"
displayKey="adaptermanager.gui.acpadmin.jmssender.connectionretry.disp.key"
descriptionKey="adaptermanager.gui.acpadmin.jmssender.connectionretry.desc.key"
   inputType="text"
   exposed="true"
   administrable="true"
   tabNameId="General"
groupKey="adaptermanager.gui.acpadmin.jmssender.connectionretry.group.key"
>
</PropertyUIMetaData>
</integerProperty>

<!-- connectionretrywait property -->
<integerProperty
   property="connectionretrywait"
   default="3000"
   minValue="1000"
   maxValue="5000"
   required="true"
   restartRequiredOnChange="true"
>
<PropertyUIMetaData
   bundle="CCRSubsys"
displayKey="adaptermanager.gui.acpadmin.jmssender.connectionretrywait.disp.key"
descriptionKey="adaptermanager.gui.acpadmin.jmssender.connectionretrywait.desc.key"
   inputType="text"
   exposed="true"
   administrable="true"
   tabNameId="General"
groupKey="adaptermanager.gui.acpadmin.jmssender.connectionretrywait.group.key"
>
</PropertyUIMetaData>
</integerProperty>

<!-- destination property -->
<stringProperty
```

*Fig. 19Z*

```xml
            property="destination"
            default="topic,com.avaya.ccr.adminrecorder.sourcedatasync"
            required="true"
            restartRequiredOnChange="true"
        >
        <PropertyUIMetaData
            bundle="CCRSubsys"
            displayKey="adaptermanager.gui.acpadmin.jmssender.destination.disp.key"
            descriptionKey="adaptermanager.gui.acpadmin.jmssender.destination.desc.key"
            inputType="text"
            exposed="true"
            administrable="true"
            tabNameId="General"
            groupKey="adaptermanager.gui.acpadmin.jmssender.destination.group.key"
        >
        </PropertyUIMetaData>
      </stringProperty>
    </properties>
  </propertyContainer>

<!-- adaptermanager.adaptercontrol_cmadapter Property Container -->
  <propertyContainer
    name="adaptermanager.adaptercontrol_cmadapter"
    displayKey="adaptermanager.adaptermanager.adaptercontrol_cmadapter.disp.key"
    descriptionKey="adaptermanager.adaptermanager.adaptercontrol_cmadapter.desc.key"
    categoryName="adaptermanager.adaptercontrol_cmadapter"
    categoryKey="adaptermanager.adaptermanager.adaptercontrol_cmadapter.category.key"
  >
    <properties>

<!-- input property -->
      <stringProperty
        property="input"
        default="${CCR_HOME}/data/eventmgt/test/holdsandreconnects.hex"
        required="true"
        restartRequiredOnChange="true"
      >
      </stringProperty>
    </properties>
  </propertyContainer>

<!-- ccp Property Container -->
  <propertyContainer
    name="ccp"
    displayKey="adaptermanager.ccp.disp.key"
    descriptionKey="adaptermanager.ccp.desc.key"
```

*Fig. 19AA*

```xml
        categoryName="ccp"
        categoryKey="adaptermanager.ccp.category.key"
        >
        <properties>

<!-- receiver property -->
          <stringProperty
            property="receiver"
default="com.avaya.ccr.common.servicecomponent.jms.JMSReceiver"
            required="true"
            restartRequiredOnChange="true"
            >
            <PropertyUIMetaData
              bundle="CCRSubsys"
              displayKey="adaptermanager.gui.ccp.receiver.disp.key"
              descriptionKey="adaptermanager.gui.ccp.receiver.desc.key"
              inputType="text"
              exposed="true"
              administrable="true"
              tabNameId="General"
              groupKey="adaptermanager.gui.ccp.receiver.group.key"
              >
            </PropertyUIMetaData>
          </stringProperty>

<!-- sender property -->
          <stringProperty
            property="sender"
            default="com.avaya.ccr.common.servicecomponent.jms.JMSSender"
            required="true"
            restartRequiredOnChange="true"
            >
            <PropertyUIMetaData
              bundle="CCRSubsys"
              displayKey="adaptermanager.gui.ccp.sender.disp.key"
              descriptionKey="adaptermanager.gui.ccp.sender.desc.key"
              inputType="text"
              exposed="true"
              administrable="true"
              tabNameId="General"
              groupKey="adaptermanager.gui.ccp.sender.group.key"
              >
            </PropertyUIMetaData>
          </stringProperty>

<!-- type property -->
          <stringProperty
            property="type"
            default="COMMAND"
            required="true"
            restartRequiredOnChange="true"
            >
            <PropertyUIMetaData
              bundle="CCRSubsys"
              displayKey="adaptermanager.gui.ccp.type.disp.key"
              descriptionKey="adaptermanager.gui.ccp.type.desc.key"
```

*Fig. 19BB*

```
              inputType="text"
              exposed="true"
              administrable="true"
              tabNameId="General"
              groupKey="adaptermanager.gui.ccp.type.group.key"
            >
        </PropertyUIMetaData>
      </stringProperty>
    </properties>
  </propertyContainer>

<!-- ccp.receiver Property Container -->
  <propertyContainer
    name="ccp.receiver"
    displayKey="adaptermanager.ccp.receiver.disp.key"
    descriptionKey="adaptermanager.ccp.receiver.desc.key"
    categoryName="ccp.receiver"
    categoryKey="adaptermanager.ccp.receiver.category.key"
    >
    <properties>

<!-- brokerurl property -->
      <stringProperty
         property="brokerurl"
         default="failover:(tcp://localhost:61616)"
         required="true"
         restartRequiredOnChange="true"
         >
         <PropertyUIMetaData
            bundle="CCRSubsys"
displayKey="adaptermanager.gui.ccp.receiver.brokerurl.disp.key"
descriptionKey="adaptermanager.gui.ccp.receiver.brokerurl.desc.key"
            inputType="text"
            exposed="true"
            administrable="true"
            tabNameId="General"
groupKey="adaptermanager.gui.ccp.receiver.brokerurl.group.key"
            >
        </PropertyUIMetaData>
      </stringProperty>

<!-- consumer property -->
      <stringProperty
         property="consumer"
default="queue,com.avaya.ccr.admin.adminproxy.RequestQueue:null"
         required="true"
         restartRequiredOnChange="true"
         >
         <PropertyUIMetaData
            bundle="CCRSubsys"
displayKey="adaptermanager.gui.ccp.receiver.consumer.disp.key"
```

Fig. 19CC

```
descriptionKey="adaptermanager.gui.ccp.receiver.consumer.desc.key"
            inputType="text"
            exposed="true"
            administrable="true"
            tabNameId="General"

groupKey="adaptermanager.gui.ccp.receiver.consumer.group.key"
            >
            </PropertyUIMetaData>
        </stringProperty>
    </properties>
</propertyContainer>

<!-- ccp.sender Property Container -->
<propertyContainer
    name="ccp.sender"
    displayKey="adaptermanager.ccp.sender.disp.key"
    descriptionKey="adaptermanager.ccp.sender.desc.key"
    categoryName="ccp.sender"
    categoryKey="adaptermanager.ccp.sender.category.key"
    >
    <properties>

<!-- brokerurl property -->
        <stringProperty
            property="brokerurl"
            default="failover:(tcp://localhost:61616)"
            required="true"
            restartRequiredOnChange="true"
            >
            <PropertyUIMetaData
                bundle="CCRSubsys"

displayKey="adaptermanager.gui.ccp.sender.brokerurl.disp.key"

descriptionKey="adaptermanager.gui.ccp.sender.brokerurl.desc.key"
            inputType="text"
            exposed="true"
            administrable="true"
            tabNameId="General"

groupKey="adaptermanager.gui.ccp.sender.brokerurl.group.key"
            >
            </PropertyUIMetaData>
        </stringProperty>

<!-- connectionretry property -->
        <integerProperty
            property="connectionretry"
            default="5"
            minValue="1"
            maxValue="10"
            required="true"
            restartRequiredOnChange="true"
            >
            <PropertyUIMetaData
```

*Fig. 19DD*

```
                    bundle="CCRSubsys"
displayKey="adaptermanager.gui.ccp.sender.connectionretry.disp.key"
descriptionKey="adaptermanager.gui.ccp.sender.connectionretry.desc.key"
            inputType="text"
            exposed="true"
            administrable="true"
            tabNameId="General"
groupKey="adaptermanager.gui.ccp.sender.connectionretry.group.key"
          >
          </PropertyUIMetaData>
        </integerProperty>

<!-- connectionretrywait property -->
        <integerProperty
          property="connectionretrywait"
          default="3000"
          minValue="1000"
          maxValue="5000"
          required="true"
          restartRequiredOnChange="true"
          >
          <PropertyUIMetaData
            bundle="CCRSubsys"
displayKey="adaptermanager.gui.ccp.sender.connectionretrywait.disp.key"
descriptionKey="adaptermanager.gui.ccp.sender.connectionretrywait.desc.key"
            inputType="text"
            exposed="true"
            administrable="true"
            tabNameId="General"
groupKey="adaptermanager.gui.ccp.sender.connectionretrywait.group.key"
          >
          </PropertyUIMetaData>
        </integerProperty>

<!-- destination property -->
        <stringProperty
          property="destination"
          default="queue,com.avaya.ccr.admin.adminproxy.ResponseQueue"
          required="true"
          restartRequiredOnChange="true"
          >
          <PropertyUIMetaData
            bundle="CCRSubsys"
displayKey="adaptermanager.gui.ccp.sender.destination.disp.key"
descriptionKey="adaptermanager.gui.ccp.sender.destination.desc.key"
            inputType="text"
            exposed="true"
            administrable="true"
```

*Fig. 19EE*

```xml
            tabNameId="General"
groupKey="adaptermanager.gui.ccp.sender.destination.group.key"
            >
          </PropertyUIMetaData>
        </stringProperty>
      </properties>
    </propertyContainer>

<!-- clientbulksender Property Container -->
    <propertyContainer
      name="clientbulksender"
      displayKey="adaptermanager.clientbulksender.disp.key"
      descriptionKey="adaptermanager.clientbulksender.desc.key"
      categoryName="clientbulksender"
      categoryKey="adaptermanager.clientbulksender.category.key"
      >
      <properties>

<!-- queue_size property -->
        <integerProperty
          property="queue_size"
          default="1000"
          minValue="100"
          maxValue="5000"
          required="true"
          restartRequiredOnChange="true"
          >
          <PropertyUIMetaData
            bundle="CCRSubsys"
displayKey="adaptermanager.gui.clientbulksender.queue_size.disp.key"
descriptionKey="adaptermanager.gui.clientbulksender.queue_size.desc.key"
            inputType="text"
            exposed="true"
            administrable="true"
            tabNameId="General"
groupKey="adaptermanager.gui.clientbulksender.queue_size.group.key"
            >
          </PropertyUIMetaData>
        </integerProperty>

<!-- queue_timeout property -->
        <integerProperty
          property="queue_timeout"
          default="2000"
          minValue="0"
          maxValue="60000"
          required="true"
          restartRequiredOnChange="true"
          >
          <PropertyUIMetaData
            bundle="CCRSubsys"
```

Fig. 19FF

```
displayKey="adaptermanager.gui.clientbulksender.queue_timeout.disp.key"

descriptionKey="adaptermanager.gui.clientbulksender.queue_timeout.desc.
key"
            inputType="text"
            exposed="true"
            administrable="true"
            tabNameId="General"

groupKey="adaptermanager.gui.clientbulksender.queue_timeout.group.key"
            >
            </PropertyUIMetaData>
        </integerProperty>

<!-- retry_interval property -->
        <integerProperty
          property="retry_interval"
          default="1000"
          minValue="1000"
          maxValue="60000"
          required="true"
          restartRequiredOnChange="true"
          >
          <PropertyUIMetaData
            bundle="CCRSubsys"

displayKey="adaptermanager.gui.clientbulksender.retry_interval.disp.key
"

descriptionKey="adaptermanager.gui.clientbulksender.retry_interval.desc
.key"
            inputType="text"
            exposed="true"
            administrable="true"
            tabNameId="General"

groupKey="adaptermanager.gui.clientbulksender.retry_interval.group.key"
            >
            </PropertyUIMetaData>
        </integerProperty>
      </properties>
    </propertyContainer>

<!-- clientbulksession.persistence.disk Property Container -->
    <propertyContainer
      name="clientbulksession.persistence.disk"

displayKey="adaptermanager.clientbulksession.persistence.disk.disp.key"

descriptionKey="adaptermanager.clientbulksession.persistence.disk.desc.
key"
      categoryName="clientbulksession.persistence.disk"

categoryKey="adaptermanager.clientbulksession.persistence.disk.category
.key"
        >
```

Fig. 19GG

```xml
<properties>

<!-- count property -->
   <integerProperty
      property="count"
      default="100"
      minValue="2"
      maxValue="500"
      required="true"
      restartRequiredOnChange="true"
   >
   <PropertyUIMetaData
      bundle="CCRSubsys"
      displayKey="adaptermanager.gui.clientbulksession.persistence.disk.count.disp.key"
      descriptionKey="adaptermanager.gui.clientbulksession.persistence.disk.count.desc.key"
      inputType="text"
      exposed="true"
      administrable="true"
      tabNameId="General"
      groupKey="adaptermanager.gui.clientbulksession.persistence.disk.count.group.key"
   >
   </PropertyUIMetaData>
   </integerProperty>

<!-- directory property -->
   <stringProperty
      property="directory"
      default="${CCR_HOME}/data/buffer/CMAdapter"
      required="true"
      restartRequiredOnChange="true"
   >
   <PropertyUIMetaData
      bundle="CCRSubsys"
      displayKey="adaptermanager.gui.clientbulksession.persistence.disk.directory.disp.key"
      descriptionKey="adaptermanager.gui.clientbulksession.persistence.disk.directory.desc.key"
      inputType="text"
      exposed="true"
      administrable="true"
      tabNameId="General"
      groupKey="adaptermanager.gui.clientbulksession.persistence.disk.directory.group.key"
   >
   </PropertyUIMetaData>
   </stringProperty>

<!-- file property -->
```

*Fig. 19HH*

```
        <stringProperty
           property="file"
           default="adapterbuffer"
           required="true"
           restartRequiredOnChange="true"
        >
           <PropertyUIMetaData
              bundle="CCRSubsys"
displayKey="adaptermanager.gui.clientbulksession.persistence.disk.file.
disp.key"

descriptionKey="adaptermanager.gui.clientbulksession.persistence.disk.f
ile.desc.key"
              inputType="text"
              exposed="true"
              administrable="true"
              tabNameId="General"

groupKey="adaptermanager.gui.clientbulksession.persistence.disk.file.gr
oup.key"
           >
           </PropertyUIMetaData>
        </stringProperty>

<!-- size property -->
        <longProperty
           property="size"
           default="20971520"
           minValue="2097152"
           maxValue="536870912"
           required="true"
           restartRequiredOnChange="true"
        >
           <PropertyUIMetaData
              bundle="CCRSubsys"
displayKey="adaptermanager.gui.clientbulksession.persistence.disk.size.
disp.key"

descriptionKey="adaptermanager.gui.clientbulksession.persistence.disk.s
ize.desc.key"
              inputType="text"
              exposed="true"
              administrable="true"
              tabNameId="General"

groupKey="adaptermanager.gui.clientbulksession.persistence.disk.size.gr
oup.key"
           >
           </PropertyUIMetaData>
        </longProperty>

<!-- threshold property -->
        <integerProperty
           property="threshold"
           default="100"
```

Fig. 19II

```xml
            minValue="0"
            maxValue="100"
            required="true"
            restartRequiredOnChange="true"
        >
        <PropertyUIMetaData
            bundle="CCRSubsys"
displayKey="adaptermanager.gui.clientbulksession.persistence.disk.threshold.disp.key"
descriptionKey="adaptermanager.gui.clientbulksession.persistence.disk.threshold.desc.key"
            inputType="text"
            exposed="true"
            administrable="true"
            tabNameId="General"
groupKey="adaptermanager.gui.clientbulksession.persistence.disk.threshold.group.key"
        >
        </PropertyUIMetaData>
    </integerProperty>
  </properties>
</propertyContainer>

<!-- clientsession.persistence Property Container -->
<propertyContainer
    name="clientsession.persistence"
    displayKey="adaptermanager.clientsession.persistence.disp.key"
descriptionKey="adaptermanager.clientsession.persistence.desc.key"
    categoryName="clientsession.persistence"
categoryKey="adaptermanager.clientsession.persistence.category.key"
    >
    <properties>

<!-- policy property -->
        <stringProperty
            property="policy"
            default="memory"
            required="true"
            restartRequiredOnChange="true"
        >
        </stringProperty>
    </properties>
</propertyContainer>

<!-- clientsession.persistence.memory Property Container -->
<propertyContainer
    name="clientsession.persistence.memory"
displayKey="adaptermanager.clientsession.persistence.memory.disp.key"
descriptionKey="adaptermanager.clientsession.persistence.memory.desc.key"
```

Fig. 19JJ

```xml
        categoryName="clientsession.persistence.memory"
categoryKey="adaptermanager.clientsession.persistence.memory.category.k
ey"
        >
        <properties>

<!-- size property -->
          <integerProperty
            property="size"
            default="80000"
            minValue="10"
            maxValue="80000"
            required="true"
            restartRequiredOnChange="true"
            >
          </integerProperty>

<!-- threshold property -->
          <integerProperty
            property="threshold"
            default="100"
            minValue="0"
            maxValue="100"
            required="true"
            restartRequiredOnChange="true"
            >
          </integerProperty>
        </properties>
    </propertyContainer>

<!-- cmadapter.pumpupresponse Property Container -->
    <propertyContainer
        name="cmadapter.pumpupresponse"
        displayKey="adaptermanager.cmadapter.pumpupresponse.disp.key"
        descriptionKey="adaptermanager.cmadapter.pumpupresponse.desc.key"
        categoryName="cmadapter.pumpupresponse"
categoryKey="adaptermanager.cmadapter.pumpupresponse.category.key"
        >
        <properties>

<!-- timeout property -->
          <longProperty
            property="timeout"
            default="30000"
            minValue="1000"
            maxValue="60000"
            required="true"
            restartRequiredOnChange="true"
            >
            <PropertyUIMetaData
              bundle="CCRSubsys"
displayKey="adaptermanager.gui.cmadapter.pumpupresponse.timeout.disp.ke
y"
```

Fig. 19KK

```
descriptionKey="adaptermanager.gui.cmadapter.pumpupresponse.timeout.des
c.key"
            inputType="text"
            exposed="true"
            administrable="true"
            tabNameId="General"

groupKey="adaptermanager.gui.cmadapter.pumpupresponse.timeout.group.key
"
            >
          </PropertyUIMetaData>
        </longProperty>
      </properties>
    </propertyContainer>

<!-- cmadapter.timemessage Property Container -->
    <propertyContainer
      name="cmadapter.timemessage"
      displayKey="adaptermanager.cmadapter.timemessage.disp.key"
      descriptionKey="adaptermanager.cmadapter.timemessage.desc.key"
      categoryName="cmadapter.timemessage"
      categoryKey="adaptermanager.cmadapter.timemessage.category.key"
      >
      <properties>

<!-- timeout property -->
        <longProperty
          property="timeout"
          default="150000"
          minValue="75000"
          maxValue="240000"
          required="true"
          restartRequiredOnChange="true"
          >
          <PropertyUIMetaData
            bundle="CCRSubsys"
displayKey="adaptermanager.gui.cmadapter.timemessage.timeout.disp.key"

descriptionKey="adaptermanager.gui.cmadapter.timemessage.timeout.desc.k
ey"
            inputType="text"
            exposed="true"
            administrable="true"
            tabNameId="General"

groupKey="adaptermanager.gui.cmadapter.timemessage.timeout.group.key"
            >
          </PropertyUIMetaData>
        </longProperty>
      </properties>
    </propertyContainer>

<!-- cmdriver Property Container -->
    <propertyContainer
      name="cmdriver"
```

*Fig. 19LL*

```
        displayKey="adaptermanager.cmdriver.disp.key"
        descriptionKey="adaptermanager.cmdriver.desc.key"
        categoryName="cmdriver"
        categoryKey="adaptermanager.cmdriver.category.key"
        >
        <properties>

<!-- commandline property -->
          <stringProperty
            property="commandline"

default="driver_files=[driver_files]|modify_timestamps=false|message_de
lay=30|listening_port=5002|playback_listener_count=1|playback_name=[cm_
input_id]|replay_ traffic=AdapterRecord"
            maxLength="256"
            required="true"
            restartRequiredOnChange="true"
            >
            <PropertyUIMetaData
              bundle="CCRSubsys"

displayKey="adaptermanager.gui.cmdriver.commandline.disp.key"

descriptionKey="adaptermanager.gui.cmdriver.commandline.desc.key"
              inputType="text"
              exposed="true"
              administrable="true"
              tabNameId="General"

groupKey="adaptermanager.gui.cmdriver.commandline.group.key"
              >
            </PropertyUIMetaData>
          </stringProperty>

<!-- port property -->
          <integerProperty
            property="port"
            default="5002"
            minValue="0"
            maxValue="65535"
            required="true"
            restartRequiredOnChange="true"
            >
            <PropertyUIMetaData
              bundle="CCRSubsys"
              displayKey="adaptermanager.gui.cmdriver.port.disp.key"
              descriptionKey="adaptermanager.gui.cmdriver.port.desc.key"
              inputType="text"
              exposed="true"
              administrable="true"
              tabNameId="General"
              groupKey="adaptermanager.gui.cmdriver.port.group.key"
              >
            </PropertyUIMetaData>
          </integerProperty>
        </properties>
      </propertyContainer>
```

Fig. 19MM

```
<!-- cmit Property Container -->
<propertyContainer
  name="cmit"
  displayKey="adaptermanager.cmit.disp.key"
  descriptionKey="adaptermanager.cmit.desc.key"
  categoryName="cmit"
  categoryKey="adaptermanager.cmit.category.key"
  >
  <properties>

<!-- SessionAuditAttributeName property -->
    <stringProperty
      property="SessionAuditAttributeName"
      default="SessionMonitorInd"
      required="true"
      restartRequiredOnChange="true"
      >
    </stringProperty>

<!-- SessionAuditIntervalMinutes property -->
    <integerProperty
      property="SessionAuditIntervalMinutes"
      default="60"
      minValue="30"
      maxValue="10080"
      required="true"
      restartRequiredOnChange="true"
      >
      <PropertyUIMetaData
        bundle="CCRSubsys"
        displayKey="adaptermanager.gui.cmit.sessionauditintervalminutes.disp.key"
        descriptionKey="adaptermanager.gui.cmit.sessionauditintervalminutes.desc.key"
        inputType="text"
        exposed="true"
        administrable="true"
        tabNameId="General"
        groupKey="adaptermanager.gui.cmit.sessionauditintervalminutes.group.key"
        >
      </PropertyUIMetaData>
    </integerProperty>

<!-- SessionAuditMessageName property -->
    <stringProperty
      property="SessionAuditMessageName"
      default="SessionMonitor"
      required="true"
      restartRequiredOnChange="true"
      >
    </stringProperty>
  </properties>
```

Fig. 19NN

```xml
</propertyContainer>

<!-- cmit.CMContact Property Container -->
<propertyContainer
  name="cmit.CMContact"
  displayKey="adaptermanager.cmit.cmcontact.disp.key"
  descriptionKey="adaptermanager.cmit.cmcontact.desc.key"
  categoryName="cmit.CMContact"
  categoryKey="adaptermanager.cmit.cmcontact.category.key"
  >
  <properties>

<!-- SessionExpireMinutes property -->
    <integerProperty
      property="SessionExpireMinutes"
      default="360"
      minValue="120"
      maxValue="20160"
      required="true"
      restartRequiredOnChange="true"
    >
    <PropertyUIMetaData
      bundle="CCRSubsys"
displayKey="adaptermanager.gui.cmit.cmcontact.sessionexpireminutes.disp
 key"

descriptionKey="adaptermanager.gui.cmit.cmcontact.sessionexpireminutes.
desc.key"
      inputType="text"
      exposed="true"
      administrable="true"
      tabNameId="General"

groupKey="adaptermanager.gui.cmit.cmcontact.sessionexpireminutes.group.
key"
    >
    </PropertyUIMetaData>
    </integerProperty>
  </properties>
</propertyContainer>

<!-- it Property Container -->
<propertyContainer
  name="it"
  displayKey="adaptermanager.it.disp.key"
  descriptionKey="adaptermanager.it.desc.key"
  categoryName="it"
  categoryKey="adaptermanager.it.category.key"
  >
  <properties>

<!-- erroraction property -->
    <stringProperty
      property="erroraction"
default="${CCR_HOME}/data/eventmgt/properties/itErrorAction.properties"
```

*Fig. 19OO*

```xml
        required="true"
        restartRequiredOnChange="true"
        >
        <PropertyUIMetaData
          bundle="CCRSubsys"
          displayKey="adaptermanager.gui.it.erroraction.disp.key"
          descriptionKey="adaptermanager.gui.it.erroraction.desc.key"
          inputType="text"
          exposed="true"
          administrable="true"
          tabNameId="General"
          groupKey="adaptermanager.gui.it.erroraction.group.key"
          >
        </PropertyUIMetaData>
      </stringProperty>

<!-- jars property -->
      <stringProperty
        property="jars"
        default="${CCR_HOME}/jars/eeplugins"
        required="true"
        restartRequiredOnChange="true"
        >
      </stringProperty>

<!-- messageRetryCount property -->
      <integerProperty
        property="messageRetryCount"
        default="3"
        minValue="1"
        maxValue="5"
        required="true"
        restartRequiredOnChange="true"
        >
        <PropertyUIMetaData
          bundle="CCRSubsys"
          displayKey="adaptermanager.gui.it.messageretrycount.disp.key"
          descriptionKey="adaptermanager.gui.it.messageretrycount.desc.key"
          inputType="text"
          exposed="true"
          administrable="true"
          tabNameId="General"
          groupKey="adaptermanager.gui.it.messageretrycount.group.key"
          >
        </PropertyUIMetaData>
      </integerProperty>

<!-- xml property -->
      <stringProperty
        property="xml"
        default="${CCR_HOME}/data/eventmgt/XML/cmit.xml"
        required="true"
        restartRequiredOnChange="true"
        >
```

Fig. 19PP

```
        <PropertyUIMetaData
            bundle="CCRSubsys"
            displayKey="adaptermanager.gui.it.xml.disp.key"
            descriptionKey="adaptermanager.gui.it.xml.desc.key"
            inputType="text"
            exposed="true"
            administrable="true"
            tabNameId="General"
            groupKey="adaptermanager.gui.it.xml.group.key"
        >
        </PropertyUIMetaData>
      </stringProperty>
    </properties>
  </propertyContainer>
</resource>
```

Resource SDL File (cm.xml)

Fig. 19QQ

```
<?xml version="1.0" encoding="UTF-8"?>
<xsd:schema xmlns:xsd="http://www.w3.org/2001/XMLSchema"
    xmlns="http://www.rnd.avaya.com"
    targetNamespace="http://www.rnd.avaya.com">

<xsd:annotation>
  <xsd:documentation>
  This Schema defines the SDL information for defining a flavor.

A Flavor SDL file can include the following elements:
        description - a set of elements containing resource bundle keys for
localizing the flavor description text
        checklist - a set of elements containing resource bundle keys for
localizing the host function checklist text
        UIMetaData - an optional element containing metadata used to define how
the flavor definition information should be presented to an administration user
via the Subsystem admin GUI (see the UIMetaData schema for more details)
        propertyContainer - an optional element containing 0 or more elements
defining the host-wide property containers and constituent properties
associated with the flavor (see the propertyContainer schema for more details)
        subsystems - an element containing references to the Subsystems that
comprise this flavor
        processContainers - an element containing references to the Process
Containers required by this flavor A Flavor should also be defined using the following attributes in the SDL
file:
        type - the Flavor/host type (required)
        adminClass - not currently used
        checkPrerequisite - a class to be used for checking prerequisites for
this flavor (optional)
        checkLicense - a class to be used for checking licenses for this flavor
(optional)
        resourceBundle - the resource bundle to use for resolving the type key,
description keys, etc. (required)
        typeKey - the resource bundle key used for localizing the flavor type
(required)
        maxInstances - the maximum number of instances of hosts of this flavor
type
        minInstances - the minimum number of instances of hosts of this flavor
type </xsd:documentation>
</xsd:annotation>

<xsd:include schemaLocation="propertyContainer.xsd"/>
<xsd:include schemaLocation="UIMetaData.xsd"/>

<xsd:element name="flavor">
  <xsd:complexType>
    <xsd:sequence>
      <xsd:element ref="description" minOccurs="1" maxOccurs="unbounded"/>
      <xsd:element ref="checklist" minOccurs="0" maxOccurs="unbounded"/>
      <xsd:element ref="UIMetaData" minOccurs="0" maxOccurs="1"/>
      <xsd:element ref="propertyContainer" minOccurs="0"
maxOccurs="unbounded"/>
      <xsd:element ref="subsystems"/>
      <xsd:element ref="processContainers" minOccurs="0"
maxOccurs="unbounded"/>
    </xsd:sequence>
    <xsd:attribute name="type" type="xsd:string" use="required"/>
    <xsd:attribute name="adminClass" type="xsd:string" />
    <xsd:attribute name="checkPrerequisite" type="xsd:string" />
```

Fig. 20A

```
    <xsd:attribute name="checkLicense" type="xsd:string" />
    <xsd:attribute name="resourceBundle" type="xsd:string" use="required"/>
    <xsd:attribute name="typeKey" type="xsd:string" use="required"/>
    <xsd:attribute name="maxInstances" type="xsd:integer"
default="2147483647"/>
    <xsd:attribute name="minInstances" type="xsd:integer" default="0"/>
  </xsd:complexType>
</xsd:element>

<xsd:element name="description">
  <xsd:complexType>
    <xsd:attribute name="key" type="xsd:string"/>
  </xsd:complexType>
</xsd:element>

<xsd:element name="checklist">
  <xsd:complexType>
    <xsd:attribute name="key" type="xsd:string"/>
  </xsd:complexType>
</xsd:element>

<xsd:element name="subsystems">
  <xsd:complexType>
    <xsd:sequence>
      <xsd:element maxOccurs="unbounded" ref="refSubsystemType"/>
    </xsd:sequence>
  </xsd:complexType>
</xsd:element>

<xsd:element name="refSubsystemType">
  <xsd:complexType>
    <xsd:attribute name="ref" type="xsd:string"/>
    <xsd:attribute name="createUnconditionally" type="xsd:boolean"
default="true"/>
  </xsd:complexType>
</xsd:element>

<xsd:element name="processContainers">
  <xsd:complexType>
    <xsd:sequence>
      <xsd:element maxOccurs="unbounded" ref="refProcessContainerType"/>
    </xsd:sequence>
  </xsd:complexType>
</xsd:element>

<xsd:element name="refProcessContainerType">
  <xsd:complexType>
    <xsd:attribute name="ref" type="xsd:string"/>
    <xsd:attribute name="createUnconditionally" type="xsd:boolean"
default="true"/>
  </xsd:complexType>
</xsd:element>

</xsd:schema>
```

*Fig. 20B*

```
<?xml version="1.0" encoding="UTF-8"?>
<flavor
    xmlns="http://www.rnd.avaya.com"
    xmlns:xsi="http://www.w3.org/2001/XMLSchema-instance"
    xsi:schemaLocation="http://www.rnd.avaya.com flavor.xsd"

type="DataCollection"
    resourceBundle="CCRSubsys"
    typeKey="DataCollection.typeKey"
    minInstances="0"
    maxInstances="1">

<description key="DataCollection.firstKey"/>

<subsystems>
        <refSubsystemType ref="Foundation"/>
        <refSubsystemType ref="DataCollection"/>
    </subsystems>
    <processContainers>
        <refProcessContainerType  ref="MessageBrokerService"
createUnconditionally="true"/>
        <refProcessContainerType  ref="CSTomcatBasic"
                                  createUnconditionally="true"/>
        <refProcessContainerType  ref="DataCollectionJBoss"
createUnconditionally="false"/>
        <refProcessContainerType  ref="IRSJBoss"
createUnconditionally="true"/>
    </processContainers>
</flavor>
```

*Fig. 21*

```
<?xml version="1.0" encoding="UTF-8"?>
<xsd:schema xmlns:xsd="http://www.w3.org/2001/XMLSchema"
    xmlns="http://www.rnd.avaya.com"
    targetNamespace="http://www.rnd.avaya.com">

<xsd:annotation>
  <xsd:documentation>
  This Schema defines the SDL information for defining a subsystem.

A Subsystem SDL file can include the following elements:
       description - an element containing a resource bundle key for localizing
the         subsystem description text (maximum of 1 description element)
       UIMetaData - an optional element containing metadata used to define how
the subsystem definition information should be presented to an administration
user via the Subsystem admin GUI (see the UIMetaData schema for more details)
       propertyContainer - an optional element containing 0 or more elements
defining the subsystem-wide property containers and constituent properties
associated with the subsystem (see the propertyContainer schema for more
details)
       processingElements - an element containing references to the Processing
Elements used in this subsystem A Subsystem should also be defined using the following attributes in the SDL
file:
       type - the Subsystem type (required)
       adminClass - not currently used
       checkPrerequisite - a class to be used for checking prerequisites for
this subsystem (optional)
       checkLicense - a class to be used for checking licenses for this
subsystem (optional)
       resourceBundle - the resource bundle to use for resolving the type key,
description keys, etc. (required)
       typeKey - the resource bundle key used for localizing the subsystem type
(required)
       maxInstances - the maximum number of instances of subsystems of this type
       minInstances - the minimum number of instances of subsystems of this type
  </xsd:documentation>
</xsd:annotation>

<xsd:include schemaLocation="propertyContainer.xsd"/>
<xsd:include schemaLocation="UIMetaData.xsd"/>

<xsd:element name="subsystem">
   <xsd:complexType>
     <xsd:sequence>
        <xsd:element ref="description" minOccurs="0" maxOccurs="1"/>
        <xsd:element ref="UIMetaData" minOccurs="0" maxOccurs="1"/>
        <xsd:element ref="propertyContainer" minOccurs="0"
maxOccurs="unbounded"/>
        <xsd:element ref="processingElements"/>
     </xsd:sequence>
     <xsd:attribute name="type" type="xsd:string" use="required"/>
     <xsd:attribute name="adminClass" type="xsd:string" />
     <xsd:attribute name="checkPrerequisite" type="xsd:string" />
     <xsd:attribute name="checkLicense" type="xsd:string" />
     <xsd:attribute name="resourceBundle" type="xsd:string" use="required"/>
     <xsd:attribute name="typeKey" type="xsd:string" use="required"/>
     <xsd:attribute name="maxInstances" type="xsd:integer"
default="2147483647"/>
     <xsd:attribute name="minInstances" type="xsd:integer" default="0"/>
   </xsd:complexType>
</xsd:element>
```

*Fig. 22A*

```
<xsd:element name="description">
   <xsd:complexType>
     <xsd:attribute name="key" type="xsd:string"/>
   </xsd:complexType>
</xsd:element>

<xsd:element name="processingElements">
   <xsd:complexType>
     <xsd:sequence>
       <xsd:element maxOccurs="unbounded" ref="refProcessingElementType"/>
     </xsd:sequence>
   </xsd:complexType>
</xsd:element>

<xsd:element name="refProcessingElementType">
   <xsd:complexType>
     <xsd:attribute name="ref" type="xsd:string"/>
     <xsd:attribute name="createUnconditionally" type="xsd:boolean"
default="true"/>
   </xsd:complexType>
</xsd:element>

</xsd:schema>
```

*Fig. 22B*

```
<?xml version="1.0" encoding="UTF-8"?>
<xsd:schema xmlns:xsd="http://www.w3.org/2001/XMLSchema"
    xmlns="http://www.rnd.avaya.com"
    targetNamespace="http://www.rnd.avaya.com">

<xsd:annotation>
  <xsd:documentation>
  This Schema defines the SDL information for defining a process
container.

A Process Container SDL file can include the following elements:
      description - an element containing a resource bundle key for
localizing the
          process container description text (maximum of 1 description
element)
      UIMetaData - an optional element containing metadata used to
define how the process container definition
          information should be presented to an administration user via
the Subsystem admin GUI (see the
          UIMetaData schema for more details)
      propertyContainer - an optional element containing 0 or more
elements defining the process container
          property containers and constituent properties associated with
the process container (see the
          propertyContainer schema for more details)
      processingElements - an element containing references to the
Processing Elements controlled by
          this process container A Process Container should also be defined using the following
attributes in the SDL file:
      type - the process container type (required)
      adminClass - not currently used
      checkPrerequisite - a class to be used for checking prerequisites
for this process container (optional)
      checkLicense - a class to be used for checking licenses for this
process container (optional)
      checkLicenseType - the way of checking license (optional). Valid
values are:
                          Both, FeatureOnly, CountOnly
      resourceBundle - the resource bundle to use for resolving the
type key, description keys, etc. (required)
      typeKey - the resource bundle key used for localizing the process
container type (required)
      defaultPort - the default port to be used by this process
container
      maxInstances - the maximum number of instances of containers of
this type
      minInstances - the minimum number of instances of containers of
this type
      stateManageable - a boolean indicating whether this container can
be managed via Subsystem Admin (e.g.,
          started, stopped, etc.)
      containerType - type of the container process. Valid values are:
                          Tomcat, Tomcat/JMX, jboss, osgi, application,
Service
```

Fig. 23A

```
       executeOnAdd - a class that should be executed when this type of
process container is added
       executePreUpdate - a class that should be executed when this type
of container is modified, but
         before the updates are saved in the database.
       executePostUpdate - a class that should be executed after this
type of container is modified and
         stored in the database.
       executeOnDelete - a class that should be executed before this
type of container is deleted
       Set value of following attributes in Container SDL files to true
to disable access to perform the operation from the SSA page
       startAllDisabled - a boolean to disable this operation from the
Subsystem Admin Container View page
       stopAllDisabled - a boolean to disable this operation from the
Subsystem Admin Container View page
   </xsd:documentation>
</xsd:annotation>

<xsd:include schemaLocation="propertyContainer.xsd"/>
<xsd:include schemaLocation="UIMetaData.xsd"/>

<xsd:element name="processcontainer">
  <xsd:complexType>
    <xsd:sequence>
      <xsd:element ref="description" minOccurs="0" maxOccurs="1"/>
      <xsd:element ref="UIMetaData" minOccurs="0" maxOccurs="1"/>
      <xsd:element ref="propertyContainer" minOccurs="0"
maxOccurs="unbounded"/>
      <xsd:element ref="processingElements" />
    </xsd:sequence>
    <xsd:attribute name="type" type="xsd:string" use="required"/>
    <xsd:attribute name="adminClass" type="xsd:string"/>
    <xsd:attribute name="checkPrerequisite" type="xsd:string" />
    <xsd:attribute name="checkLicense" type="xsd:string" />
    <xsd:attribute name="checkLicenseType" >
      <xsd:simpleType>
        <xsd:restriction base="xsd:string">
          <xsd:enumeration value="Both"/>
          <xsd:enumeration value="FeatureOnly"/>
          <xsd:enumeration value="CountOnly"/>
        </xsd:restriction>
      </xsd:simpleType>
    </xsd:attribute>
    <xsd:attribute name="resourceBundle" type="xsd:string"
use="required"/>
    <xsd:attribute name="typeKey" type="xsd:string" use="required"/>
    <xsd:attribute name="defaultPort" type="xsd:string"/>
    <xsd:attribute name="maxInstances" type="xsd:integer"
default="2147483647"/>
    <xsd:attribute name="minInstances" type="xsd:integer" default="0"/>
    <xsd:attribute name="stateManageable" type="xsd:boolean"
default="false"/>
    <xsd:attribute name="startAllDisabled" type="xsd:boolean"
default="false"/>
    <xsd:attribute name="stopAllDisabled" type="xsd:boolean"
default="false"/>
```

*Fig. 23B*

```
    <xsd:attribute name="containerType" use="required" >
        <xsd:simpleType>
            <xsd:restriction base="xsd:string">
                <xsd:enumeration value="Tomcat"/>
                <xsd:enumeration value="tomcat"/>
                <xsd:enumeration value="tomcat/jmx"/>
                <xsd:enumeration value="jboss"/>
                <xsd:enumeration value="osgi"/>
                <xsd:enumeration value="application"/>
                <xsd:enumeration value="Service"/>
                <xsd:enumeration value="service"/>
            </xsd:restriction>
        </xsd:simpleType>
    </xsd:attribute>
    <xsd:attribute name="executeOnAdd" type="xsd:string"/>
    <xsd:attribute name="executePreUpdate" type="xsd:string"/>
    <xsd:attribute name="executePostUpdate" type="xsd:string"/>
    <xsd:attribute name="executeOnDelete" type="xsd:string"/>
  </xsd:complexType>
</xsd:element>

<xsd:element name="description">
  <xsd:complexType>
    <xsd:attribute name="key" type="xsd:string"/>
  </xsd:complexType>
</xsd:element>

<xsd:element name="processingElements">
  <xsd:complexType>
    <xsd:sequence>
      <xsd:element maxOccurs="unbounded"
ref="refProcessingElementType"/>
    </xsd:sequence>
  </xsd:complexType>
</xsd:element>

<xsd:element name="refProcessingElementType">
  <xsd:complexType>
    <xsd:attribute name="ref" type="xsd:string"/>
    <xsd:attribute name="createUnconditionally" type="xsd:boolean"
default="true"/>
  </xsd:complexType>
</xsd:element>

</xsd:schema>
```

Process Container SDL Schema (processContainer.xsd)

Fig. 23C

```
<?xml version="1.0" encoding="UTF-8"?>
<xsd:schema xmlns:xsd="http://www.w3.org/2001/XMLSchema"
    xmlns="http://www.rnd.avaya.com"
    targetNamespace="http://www.rnd.avaya.com">

<xsd:annotation>
  <xsd:documentation>
  This Schema defines the SDL information for defining property
containers and their
  constituent properties.

A Property Container SDL file contains a properties element.  This
element contains a set of zero or
  more elements of each of the supported property types (integer,
string, password, boolean, and long.)

The Property Container itself should be defined using the following
attributes in the SDL file:
        name - the property container name (required)
        displayKey - the resource bundle key used for localizing the
property container name
        descriptionKey - the resource bundle key used for localizing the
property container description
        categoryName - the property container category name
        categoryKey - the resource bundle key used for localizing the
property container category name The property type elements can include a PropertyUIMetaData element.
This element contains metadata used to
  define how the property definition information should be presented to
an administration user via the
  Subsystem admin GUI (see the propertyUIMetaData schema for more
details).

The property type elements should also be defined using the following
attributes that are common to
  all the property types:
        adminClass - not currently used
        property - the property name (required)
        required - a boolean indicating whether a value for this property
is required
        default - a default value for this property
        validationClass - a class that implements the PropertyValidator
interface (optional)
        restartRequiredOnChange - a boolean indicating whether the
containing entity must be restarted if
        this property value changes The integerProperty and longProperty types also can include the
following attributes:
        minValue - the minimum valid value for this property
        maxValue - the maximum valid value for this property The stringProperty and passwordProperty types can include also
include the following attribute:
        maxLength - the maximum length of the string value
```

*Fig. 24A*

```
    </xsd:documentation>
</xsd:annotation>

<xsd:include schemaLocation="propertyUIMetaData.xsd"/>

<xsd:element name="propertyContainer">
  <xsd:complexType>
    <xsd:sequence>
      <xsd:element ref="properties"/>
    </xsd:sequence>
    <xsd:attribute name="name" type="xsd:string" use="required"/>
    <xsd:attribute name="displayKey" type="xsd:string"/>
    <xsd:attribute name="descriptionKey" type="xsd:string"/>
    <xsd:attribute name="categoryName" type="xsd:string"
default="default"/>
    <xsd:attribute name="categoryKey" type="xsd:string"/>
  </xsd:complexType>
</xsd:element>

<xsd:element name="properties">
  <xsd:complexType>
    <xsd:choice maxOccurs="unbounded" minOccurs="0">
      <xsd:element ref="integerProperty" maxOccurs="unbounded"
minOccurs="0"/>
      <xsd:element ref="stringProperty" maxOccurs="unbounded"
minOccurs="0"/>
      <xsd:element ref="passwordProperty" maxOccurs="unbounded"
minOccurs="0"/>
      <xsd:element ref="booleanProperty" maxOccurs="unbounded"
minOccurs="0"/>
      <xsd:element ref="longProperty" maxOccurs="unbounded"
minOccurs="0"/>
    </xsd:choice>
  </xsd:complexType>
</xsd:element>

<xsd:element name="integerProperty">
  <xsd:complexType>
    <xsd:sequence>
        <xsd:element ref="PropertyUIMetaData" maxOccurs="1"
minOccurs="0" />
    </xsd:sequence>
    <xsd:attribute name="adminClass" type="xsd:string" />
    <xsd:attribute name="property" type="xsd:string" use="required"/>
    <xsd:attribute name="required" type="xsd:boolean" default="true"/>
    <xsd:attribute name="default" type="xsd:integer"/>
    <xsd:attribute name="validationClass" type="xsd:string" />
    <xsd:attribute name="restartRequiredOnChange" type="xsd:boolean"
default="false"/>
    <xsd:attribute name="minValue" type="xsd:integer" default="-2147483648"/>
    <xsd:attribute name="maxValue" type="xsd:integer"
default="2147483647"/>
  </xsd:complexType>
</xsd:element>

<xsd:element name="stringProperty">
```

*Fig. 24B*

```
    <xsd:complexType>
       <xsd:sequence>
          <xsd:element ref="PropertyUIMetaData" maxOccurs="1"
minOccurs="0" />
       </xsd:sequence>
       <xsd:attribute name="adminClass" type="xsd:string"/>
       <xsd:attribute name="property" type="xsd:string" use="required"/>
       <xsd:attribute name="required" type="xsd:boolean" default="true"/>
       <xsd:attribute name="default" type="xsd:string"/>
       <xsd:attribute name="validationClass" type="xsd:string" />
       <xsd:attribute name="restartRequiredOnChange" type="xsd:boolean"
default="false"/>
       <xsd:attribute name="maxLength" type="xsd:integer" default="256"/>
    </xsd:complexType>
</xsd:element>

<xsd:element name="passwordProperty">
    <xsd:complexType>
       <xsd:sequence>
          <xsd:element ref="PropertyUIMetaData" maxOccurs="1"
minOccurs="0" />
       </xsd:sequence>
       <xsd:attribute name="adminClass" type="xsd:string"/>
       <xsd:attribute name="property" type="xsd:string" use="required"/>
       <xsd:attribute name="required" type="xsd:boolean" default="true"/>
       <xsd:attribute name="default" type="xsd:string"/>
       <xsd:attribute name="validationClass" type="xsd:string" />
       <xsd:attribute name="restartRequiredOnChange" type="xsd:boolean"
default="false"/>
       <xsd:attribute name="maxLength" type="xsd:integer" default="256"/>
    </xsd:complexType>
</xsd:element>

<xsd:element name="booleanProperty">
    <xsd:complexType>
       <xsd:sequence>
          <xsd:element ref="PropertyUIMetaData" maxOccurs="1"
minOccurs="0" />
       </xsd:sequence>
       <xsd:attribute name="adminClass" type="xsd:string"/>
       <xsd:attribute name="property" type="xsd:string" use="required"/>
       <xsd:attribute name="required" type="xsd:boolean" default="true"/>
       <xsd:attribute name="default" type="xsd:boolean"/>
       <xsd:attribute name="validationClass" type="xsd:string" />
       <xsd:attribute name="restartRequiredOnChange" type="xsd:boolean"
default="false"/>
    </xsd:complexType>
</xsd:element>

<xsd:element name="longProperty">
    <xsd:complexType>
       <xsd:sequence>
          <xsd:element ref="PropertyUIMetaData" maxOccurs="1"
minOccurs="0" />
       </xsd:sequence>
       <xsd:attribute name="adminClass" type="xsd:string"/>
       <xsd:attribute name="property" type="xsd:string" use="required"/>
```

*Fig. 24C*

```
    <xsd:attribute name="required" type="xsd:boolean" default="true"/>
    <xsd:attribute name="default" type="xsd:integer"/>
    <xsd:attribute name="validationClass" type="xsd:string" />
    <xsd:attribute name="restartRequiredOnChange" type="xsd:boolean"
default="false"/>
    <xsd:attribute name="minValue" type="xsd:integer" default="-
9223372036854775808"/>
    <xsd:attribute name="maxValue" type="xsd:integer"
default="9223372036854775807"/>
  </xsd:complexType>
</xsd:element>

</xsd:schema>
```

Property Container SDL Schema (propertyContainer.xsd)

*Fig. 24D*

```
<?xml version="1.0" encoding="UTF-8"?>
<xsd:schema xmlns:xsd="http://www.w3.org/2001/XMLSchema"
    xmlns="http://www.rnd.avaya.com"
    targetNamespace="http://www.rnd.avaya.com">

<xsd:annotation>
  <xsd:documentation>
  This Schema defines the SDL information for defining UI metadata for
a subsystem entity.  The
  UI metadata is used to control how the entity is administered via the
Subsystem Admin GUI.

A UIMetaData element can contain the following elements:
        createWizard - an optional element containing information used to
initially create/define the entity using
        the Subsystem Admin GUI wizard pages
        tab - a set of zero or more elements used to define the
administration tabs for the entity The createWizard element can contain zero or more page elements.  The
page elements define the wizard
        pages used to initially create/define the entity.

The tab elements can contain a button element.  A button elements
define a link to specialized
        administration processing for an entity.

</xsd:documentation>
</xsd:annotation>

<xsd:element name="UIMetaData">
    <xsd:complexType>
      <xsd:sequence>
        <xsd:element ref="createWizard" minOccurs="0" maxOccurs="1"/>
        <xsd:element ref="tab" minOccurs="0" maxOccurs="unbounded"/>
      </xsd:sequence>
      <xsd:attribute name="adminClass" type="xsd:string" />
    </xsd:complexType>
</xsd:element>

<xsd:element name="createWizard">
  <xsd:complexType>
    <xsd:sequence>
      <xsd:element ref="page" minOccurs="0" maxOccurs="unbounded"/>
    </xsd:sequence>
  </xsd:complexType>
</xsd:element>

<xsd:element name="tab">
  <xsd:complexType>
    <xsd:sequence>
        <xsd:element ref="button" minOccurs="0" maxOccurs="1"/>
    </xsd:sequence>
    <xsd:attribute name="tabNameKey" type="xsd:string"/>
    <xsd:attribute name="tabNameId" type="xsd:string"/>
  </xsd:complexType>
</xsd:element>
```

*Fig. 25A*

```
<xsd:element name="button">
  <xsd:complexType>
    <xsd:attribute name="btnId" type="xsd:string" use="required"/>
    <xsd:attribute name="btnNameKey" type="xsd:string" use="required"/>
    <xsd:attribute name="btnUrl" type="xsd:string" use="required"/>
  </xsd:complexType>
</xsd:element>

<xsd:element name="page">
  <xsd:complexType>
    <xsd:attribute name="pageNumber" type="xsd:string"/>
    <xsd:attribute name="pageTitleKey" type="xsd:string"/>
    <xsd:attribute name="pageDescKey" type="xsd:string"/>
    <xsd:attribute name="pageBundle" type="xsd:string" use="required"/>
    <xsd:attribute name="pageProductActionPath" type="xsd:string"/>
  </xsd:complexType>
</xsd:element>

</xsd:schema>
```

*Fig. 25B*

```
<?xml version="1.0" encoding="UTF-8"?>
<xsd:schema xmlns:xsd="http://www.w3.org/2001/XMLSchema"
    xmlns="http://www.rnd.avaya.com"
    targetNamespace="http://www.rnd.avaya.com">

<xsd:annotation>
  <xsd:documentation>
  This Schema defines the SDL information for defining property UI
metadata.  The UI metadata
  is used to control how a property is administered via the Subsystem
Admin GUI.

A propertyUIMetaData element can contain the following elements:
        htmlAttribute - a set of elements that provide additional
miscellaneous information used to define
        HTML attributes needed to administer the property
        selectOptions - an element that defines the options for property
values that should be defined using
        a dropdown menu A propertyUIMetaData element should also be defined using the
following attributes:
        adminClass - not currently used
        displayKey - the resource bundle key used for localizing the
property name
        descriptionKey - the resource bundle key used for localizing the
property description
        exposed - a boolean that indicates whether or not this property
should be exposed to the
        adminstration user
        administrable - a boolean that indicates whether or not the
administration user can change the
        value of this property
        inputType - the mechanism to be used for entering values for this
property.  The inputType may be
        one of the following: text, textarea, dropdown, checkbox, or
password.
        wizardProperty - a boolean that indicates whether this property
should be administered via the GUI
        wizard page(s) for this entity.
        wizardPageNum - the wizard page that should include the
administration fields for this property.
        advanced - a boolean that indicates whether this property should
be included in the advanced properties
        tab for this entity.
        group - the property group with which this property should be
included
        groupKey - the resource bundle key used for localizing the group
description
        editPageReadOnly - a boolean that indicates whether this property
should only be allowed to be viewed
        but not edited on the property edit page
        tabNameId - a reference to the tab on which this property should
be administered.  This ID must
        correspond to a tab defined in the UIMetaData element for the
entity.
```

*Fig. 26A*

```
      bundle - the resource bundle to be used for localizing the
resource bundle keys
      displayOrder - the order in which this property should be
displayed on the administration screens </xsd:documentation>
</xsd:annotation>

<xsd:element name="PropertyUIMetaData">
  <xsd:complexType>
    <xsd:sequence>
      <xsd:choice>
        <xsd:element  ref="htmlAttribute" maxOccurs="unbounded"
minOccurs="0"/>
        <xsd:element  ref="selectOptions" maxOccurs="1" minOccurs="0"/>
      </xsd:choice>
    </xsd:sequence>
    <xsd:attribute name="adminClass" type="xsd:string" />
    <xsd:attribute name="displayKey" type="xsd:string"/>
    <xsd:attribute name="descriptionKey" type="xsd:string"/>
    <xsd:attribute name="exposed" type="xsd:boolean" default="true"/>
    <xsd:attribute name="administrable" type="xsd:boolean"
default="true"/>
    <xsd:attribute name="inputType" default="text">
      <xsd:simpleType>
        <xsd:restriction base="xsd:string">
          <xsd:enumeration value="text"/>
          <xsd:enumeration value="textarea"/>
          <xsd:enumeration value="dropdown"/>
          <xsd:enumeration value="checkbox"/>
          <xsd:enumeration value="password"/>
        </xsd:restriction>
      </xsd:simpleType>
    </xsd:attribute>
    <xsd:attribute name="maximumLimit" type="xsd:integer"/>
    <xsd:attribute name="wizardProperty" type="xsd:string"
default="true"/>
    <xsd:attribute name="wizardPageNum" type="xsd:integer"
default="1"/>
    <xsd:attribute name="advanced" type="xsd:boolean" default="false"/>
    <xsd:attribute name="group" type="xsd:string"/>
    <xsd:attribute name="groupKey" type="xsd:string"/>
    <xsd:attribute name="editPageReadOnly" type="xsd:boolean"/>
    <xsd:attribute name="tabNameId" type="xsd:string"/>
    <xsd:attribute name="bundle" type="xsd:string"/>
    <xsd:attribute name="displayOrder" type="xsd:string"/>
  </xsd:complexType>
</xsd:element>

<xsd:element name="selectOptions">
  <xsd:complexType>
    <xsd:sequence>
      <xsd:element maxOccurs="unbounded" ref="option"/>
    </xsd:sequence>
    <xsd:attribute name="objType" type="xsd:string" use="required"/>
  </xsd:complexType>
```

*Fig. 26B*

```
</xsd:element>

<xsd:element name="option">
  <xsd:complexType>
    <xsd:attribute name="label" type="xsd:string" use="required"/>
    <xsd:attribute name="value" type="xsd:string" use="required"/>
    <xsd:attribute name="selected" type="xsd:boolean" default="false"/>
  </xsd:complexType>
</xsd:element>

<xsd:element name="htmlAttribute">
  <xsd:complexType>
    <xsd:attribute name="name" type="xsd:string"/>
    <xsd:attribute name="value" type="xsd:string"/>
    <xsd:attribute name="objType" type="xsd:string" use="required"/>
  </xsd:complexType>
</xsd:element>

</xsd:schema>
```

*Fig. 26C*

```
<?xml version="1.0" encoding="UTF-8"?>
<xsd:schema xmlns:xsd="http://www.w3.org/2001/XMLSchema"
    xmlns="http://www.rnd.avaya.com"
    targetNamespace="http://www.rnd.avaya.com">

<xsd:annotation>
  <xsd:documentation>
  This Schema defines the SDL information for defining a processing
element.

A Processing Element SDL file can include the following elements:
      description - an element containing a resource bundle key for
localizing the
      processing element description text (maximum of 1 description
element)
      UIMetaData - an optional element containing metadata used to
define how the PE definition
      information should be presented to an administration user via
the Subsystem admin GUI (see the
      UIMetaData schema for more details)
      propertyContainer - an optional element containing 0 or more
elements defining the processing element
      property containers and constituent properties associated with
the PE (see the
      propertyContainer schema for more details)
      resource - an optional element containing a reference to a
Resource type that should be associated with
      this processing element
      libraryBundleLocation - an optional set of elements containing
paths to the required library bundles on
      the host A Processing Element should also be defined using the following
attributes in the SDL file:
      type - the processing element type (required)
      adminClass - not currently used
      checkPrerequisite - a class to be used for checking prerequisites
for this processing element (optional)
      checkLicense - a class to be used for checking licenses for this
processing element (optional)
      checkLicenseType - the way of checking license (optional). Valid
values are:
                     Both, FeatureOnly, CountOnly
      resourceBundle - the resource bundle to use for resolving the
type key, description keys, etc. (required)
      typeKey - the resource bundle key used for localizing the PE type
(required)
      maxInstances - the maximum number of instances of PEs of this
type
      minInstances - the minimum number of instances of PEs of this
type
      stateManageable - a boolean indicating whether this PE can be
managed via Subsystem Admin (e.g.,
      started, stopped, etc.)
      resyncable - a boolean indicating whether this PE can be
resync'ed
```

Fig. 27A

```
        resyncWarningKey - a resource bundle key used for defining a
localized warning message
        to be presented when the resync action is selected
        sourceLocationPath - the path to the source of the PE on the host
        destinationLocationPath - the path where the PE needs to be
installed
        mBeanClassName - the class name for a JMX MBean (for JBoss PE)
        startOrder - start order inside container (only supported in
JBoss)
        {Set value of following attributes in PE SDL files to true to
disable access to perform the operation from the SSA page}
        startPEdisabled - a boolean to disable this operation from the
Subsystem Admin Host View page
        stopPEdisabled - a boolean to disable this operation from the
Subsystem Admin Host View page
        restartPEdisabled - a boolean to disable this operation from the
Subsystem Admin Host View page
        executeOnAdd - a class that should be executed when this type of
PE is added
        executePreUpdate - a class that should be executed when this type
of PE is modified, but
            before the updates are saved in the database.
        executePostUpdate - a class that should be executed after this
type of PE is modified and
            stored in the database.
        executeOnDelete - a class that should be executed before this
type of PE is deleted </xsd:documentation>
</xsd:annotation>

<xsd:include schemaLocation="propertyContainer.xsd"/>
<xsd:include schemaLocation="UIMetaData.xsd"/>

<xsd:element name="processingElement">
   <xsd:complexType>
      <xsd:sequence>
         <xsd:element ref="description" minOccurs="0" maxOccurs="1"/>
         <xsd:element ref="UIMetaData" minOccurs="0" maxOccurs="1"/>
         <xsd:element ref="propertyContainer" minOccurs="0"
maxOccurs="unbounded"/>
         <xsd:element ref="resource" minOccurs="0" maxOccurs="1"/>
         <xsd:element ref="libraryBundleLocation" minOccurs="0"
maxOccurs="unbounded"/>
      </xsd:sequence>
      <xsd:attribute name="adminClass" type="xsd:string" />
      <xsd:attribute name="checkPrerequisite" type="xsd:string" />
      <xsd:attribute name="checkLicense" type="xsd:string" />
      <xsd:attribute name="checkLicenseType" >
         <xsd:simpleType>
            <xsd:restriction base="xsd:string">
               <xsd:enumeration value="Both"/>
               <xsd:enumeration value="FeatureOnly"/>
               <xsd:enumeration value="CountOnly"/>
            </xsd:restriction>
         </xsd:simpleType>
      </xsd:attribute>
```

*Fig. 27B*

```
    <xsd:attribute name="type" type="xsd:string" use="required"/>
    <xsd:attribute name="resourceBundle" type="xsd:string" use="required"/>
    <xsd:attribute name="typeKey" type="xsd:string" use="required"/>
    <xsd:attribute name="maxInstances" type="xsd:integer"
default="2147483647"/>
    <xsd:attribute name="minInstances" type="xsd:integer" default="0"/>
    <xsd:attribute name="stateManageable" type="xsd:boolean"
default="false"/>
    <xsd:attribute name="resyncable" type="xsd:boolean" default="false"/>
    <xsd:attribute name="resyncWarningKey" type="xsd:string" />
    <xsd:attribute name="sourceLocationPath" type="xsd:string" />
    <xsd:attribute name="destinationLocationPath" type="xsd:string" />
    <xsd:attribute name="mBeanClassName" type="xsd:string" />
    <xsd:attribute name="startOrder" type="xsd:integer"/>
    <xsd:attribute name="startPEdisabled" type="xsd:boolean"
default="false"/>
    <xsd:attribute name="stopPEdisabled" type="xsd:boolean"
default="false"/>
    <xsd:attribute name="restartPEdisabled" type="xsd:boolean"
default="false"/>
    <xsd:attribute name="executeOnAdd" type="xsd:string"/>
    <xsd:attribute name="executePreUpdate" type="xsd:string"/>
    <xsd:attribute name="executePostUpdate" type="xsd:string"/>
    <xsd:attribute name="executeOnDelete" type="xsd:string"/>
    </xsd:complexType>
</xsd:element>

<xsd:element name="description">
  <xsd:complexType>
    <xsd:attribute name="key" type="xsd:string"/>
  </xsd:complexType>
</xsd:element>

<xsd:element name="resource">
  <xsd:complexType>
    <xsd:sequence>
      <xsd:element maxOccurs="1" ref="refResourceType"/>
    </xsd:sequence>
  </xsd:complexType>
</xsd:element>

<xsd:element name="refResourceType">
  <xsd:complexType>
    <xsd:attribute name="ref" type="xsd:string"/>
    <xsd:attribute name="createUnconditionally" type="xsd:boolean"
default="true"/>
  </xsd:complexType>
</xsd:element>

<xsd:element name="libraryBundleLocation">
  <xsd:complexType>
    <xsd:attribute name="bundlePath" type="xsd:string"/>
  </xsd:complexType>
</xsd:element>

</xsd:schema>
```

*Fig. 27C*

```
   xmlns="http://www.rnd.avaya.com"
   targetNamespace="http://www.rnd.avaya.com">

<xsd:annotation>
  <xsd:documentation>
  This Schema defines the SDL information for defining a Resource.

A Resource SDL file can include the following elements:
       description - an element containing a resource bundle key for
localizing the
          Resource description text (maximum of 1 description element)
       UIMetaData - an optional element containing metadata used to
define how the resource definition
          information should be presented to an administration user via
the Subsystem admin GUI (see the
          UIMetaData schema for more details)
       propertyContainer - an optional element containing 0 or more
elements defining the resource
          property containers and constituent properties associated with
the resource (see the
          propertyContainer schema for more details)
       processContainers - an element containing references to the
Process Containers that must be
          added when a resource of this type is associated with a host.
A new instance of each of
          the specified process containers will be created with all of
its constituent processing
          elements. (optional)
       processingElements - an element containing references to the
Processing Elements and their parent
          process containers associated with this resource.  These
processing elements will be added to
          their specified container when a resource of this type is
associated with a host.  If the specified
          container type already exists, the new PE instances will be
inserted into the existing container.
          Otherwise, a new container instance will be created. (optional)

A Resource should also be defined using the following attributes in
the SDL file:
       type - the process container type (required)
       adminClass - not currently used
       checkPrerequisite - a class to be used for checking prerequisites
for this resource (optional)
       checkLicense - a class to be used for checking licenses for this
resource (optional)
       checkLicenseType - the way of checking license (optional). Valid
values are:
                          Both, FeatureOnly, CountOnly
       resourceBundle - the resource bundle to use for resolving the
type key, description keys, etc. (required)
       typeKey - the resource bundle key used for localizing the process
container type (required)
       maxInstances - the maximum number of instances of resources of
this type
       minInstances - the minimum number of instances of resources of
this type
```

Fig. 28A

```
      stateManageable - a boolean indicating whether this resource can
be managed via Subsystem Admin (e.g.,
      started, stopped, etc.)
      parentResourceType - the "parent" resource type that this
resource should be associated with (optional)
      childResourceType - the type of "child" resource that should be
associated with this resource (optional)
      executeOnAdd - a class that should be executed when this type of
resource is added
      executePreUpdate - a class that should be executed when this type
of resource is modified, but
         before the updates are saved in the database.
      executePostUpdate - a class that should be executed after this
type of resource is modified and
         stored in the database.
      executeOnDelete - a class that should be executed before this
type of resource is deleted
      addEnabled - a boolean indicating whether resources of this type
can be added via the Resource
         Management menus
      deleteEnabled - a boolean indicating whether resources of this
type can be deleted via the
         Resource Management menus </xsd:documentation>
</xsd:annotation>

<xsd:include schemaLocation="propertyContainer.xsd"/>
<xsd:include schemaLocation="UIMetaData.xsd"/>

<xsd:element name="resource">
   <xsd:complexType>
      <xsd:sequence>
         <xsd:element ref="description" minOccurs="0" maxOccurs="1"/>
         <xsd:element ref="UIMetaData" minOccurs="0" maxOccurs="1"/>
         <xsd:element ref="propertyContainer" minOccurs="0"
maxOccurs="unbounded"/>
         <xsd:element ref="processContainers" minOccurs="0" />
         <xsd:element ref="processingElements" minOccurs="0" />
      </xsd:sequence>
      <xsd:attribute name="type" type="xsd:string" use="required"/>
      <xsd:attribute name="adminClass" type="xsd:string" />
      <xsd:attribute name="checkPrerequisite" type="xsd:string" />
      <xsd:attribute name="checkLicense" type="xsd:string" />
      <xsd:attribute name="checkLicenseType" >
         <xsd:simpleType>
            <xsd:restriction base="xsd:string">
               <xsd:enumeration value="Both"/>
               <xsd:enumeration value="FeatureOnly"/>
               <xsd:enumeration value="CountOnly"/>
            </xsd:restriction>
         </xsd:simpleType>
      </xsd:attribute>
      <xsd:attribute name="resourceBundle" type="xsd:string"
use="required"/>
      <xsd:attribute name="typeKey" type="xsd:string" use="required"/>
```

*Fig. 28B*

```
    <xsd:attribute name="maxInstances" type="xsd:integer"
default="2147483647"/>
    <xsd:attribute name="minInstances" type="xsd:integer" default="0"/>
    <xsd:attribute name="stateManageable" type="xsd:boolean"
default="false"/>
    <xsd:attribute name="parentResourceType" type="xsd:string"/>
    <xsd:attribute name="childResourceType" type="xsd:string"/>
    <xsd:attribute name="executeOnAdd" type="xsd:string"/>
    <xsd:attribute name="executePreUpdate" type="xsd:string"/>
    <xsd:attribute name="executePostUpdate" type="xsd:string"/>
    <xsd:attribute name="executeOnDelete" type="xsd:string"/>
    <xsd:attribute name="addEnabled" type="xsd:boolean" default="true"/>
    <xsd:attribute name="deleteEnabled" type="xsd:boolean" default="true"/>
  </xsd:complexType>
</xsd:element>

<xsd:element name="description">
  <xsd:complexType>
    <xsd:attribute name="key" type="xsd:string"/>
  </xsd:complexType>
</xsd:element>

<xsd:element name="processContainers">
  <xsd:complexType>
    <xsd:sequence>
      <xsd:element maxOccurs="unbounded" ref="refProcessContainerType"/>
    </xsd:sequence>
  </xsd:complexType>
</xsd:element>

<xsd:element name="refProcessContainerType">
  <xsd:complexType>
    <xsd:attribute name="ref" type="xsd:string"/>
    <xsd:attribute name="createUnconditionally" type="xsd:boolean"
default="true"/>
  </xsd:complexType>
</xsd:element>

<xsd:element name="processingElements">
  <xsd:complexType>
    <xsd:sequence>
      <xsd:element maxOccurs="unbounded" ref="refProcessingElementType"/>
    </xsd:sequence>
  </xsd:complexType>
</xsd:element>

<xsd:element name="refProcessingElementType">
  <xsd:complexType>
    <xsd:attribute name="ref" type="xsd:string" use="required"/>
    <xsd:attribute name="parentContainerType" type="xsd:string"
use="required"/>
  </xsd:complexType>
</xsd:element>

</xsd:schema>
```

Resource SDL Schema (resource.xsd)

DYNAMIC USER-INTERFACE GENERATION AND ADMINISTRATION METHOD AND APPARATUS

FIELD

The present invention is directed to generating a user-interface for collecting configuration information for a software system or component from a user. More particularly, the user-interface is generated from one or more files conforming to a well-defined schema and containing items of data selected from a larger set of items of data.

BACKGROUND

Systems containing a number of software components are used in a wide variety of applications. In order to integrate a new or modified software component into a larger system, certain configuration, deployment, management and administration information is required. Accordingly, integrating a new or modified software component into a larger system has required that new code be written, code recompiled, and/or code redeployed on the larger system so that the new components can be configured, deployed, managed, and administered. As a result, updating an existing system to add new processing elements or other software components has been difficult, time consuming and expensive. In addition, the configuration and deployment requirements are typically project specific, and may not be known at the time a software component is originally deployed. Accordingly, new or modified components often require different configurations when used in different projects.

The integration of software components therefore has often required that existing or established software be modified or re-configured in order to add the new component. In addition to often being a difficult task, such modification or re-configuration usually requires a step of compiling and/or redeploying the modified code. Accordingly, integrating new or modified software into systems has remained difficult, and has required the creation of revised code for each different application or use of a system.

SUMMARY

The present invention is directed to solving these and other problems and disadvantages of the prior art. In accordance with embodiments of the present invention, a schema comprising one or more sets of items of data (hereinafter referred to simply as "items") for defining configuration data for software components is defined to create an integration standard. For a particular software component, a subset of the items or elements is selected and placed in one or more subsystem definition language (SDL) files. These items may comprise metadata elements that conform to the schema and that together with associated values or parameters comprise items of data that define the required configuration data for a particular software component. When a new or modified software component is added to a system, the SDL files are used to generate a user interface for collecting the required configuration data from a user. The configuration data provided by the user is then applied to integrating the software component with the system.

In accordance with embodiments of the present invention, an SDL file comprises a file written in XML or in some other standardized language. When a component of a system is added or modified, the SDL files associated with the component are accessed. The SDL files are parsed by a management service in order to generate the user interface. In accordance with further embodiments of the present invention, the user interface comprises a web page or a means for providing a user interface that is generated from the SDL files and displayed to the user. Moreover, user input can be collected through the web page. Information collected from the user through the web page is validated and persisted to the data model by the management service. The management service may also deploy and start the software component using the information collected from the SDL files. In an additional aspect, the SDL files provide a mechanism by which complexity can be abstracted away. For example, a subsystem can define a collection of processing elements, a host function defines possible deployment options, etc.

BRIEF DESCRIPTION OF THE DRAWINGS

FIG. 15 illustrates a host function or flavor SDL file in accordance with embodiments of the present invention;

FIGS. 16 A-B illustrate a process container SDL file in accordance with embodiments of the present invention;

FIG. 17 illustrates a sub-system SDL file comprising a data collection file in accordance with embodiments of the present invention;

FIGS. 18 A-E illustrate a processing element SDL file in accordance with embodiments of the present invention;

FIGS. 19 A-QQ illustrate a resource SDL file in accordance with embodiments of the present invention;

FIGS. 20 A-B illustrates a host function SDL schema in accordance with embodiments of the present invention;

FIG. 21 illustrates a data collection host function SDL file in accordance with embodiments of the present invention;

FIGS. 22 A-B illustrate a subsystem SDL schema in accordance with embodiments of the present invention;

FIGS. 23 A-C illustrate a process container SDL schema in accordance with embodiments of the present invention;

FIGS. 24 A-D illustrate a property container SDL schema in accordance with embodiments of the present invention;

FIGS. 25 A-B illustrate a UIMetaData SDL schema in accordance with embodiments of the present invention;

FIGS. 26 A-C illustrate a property UIMetaData SDL schema in accordance with embodiments of the present invention;

FIGS. 27 A-C illustrate a processing element SDL schema in accordance with embodiments of the present invention;

FIGS. 28 A-C illustrate a resource SDL schema in accordance with embodiments of the present invention;

DETAILED DESCRIPTION

Figure 1:
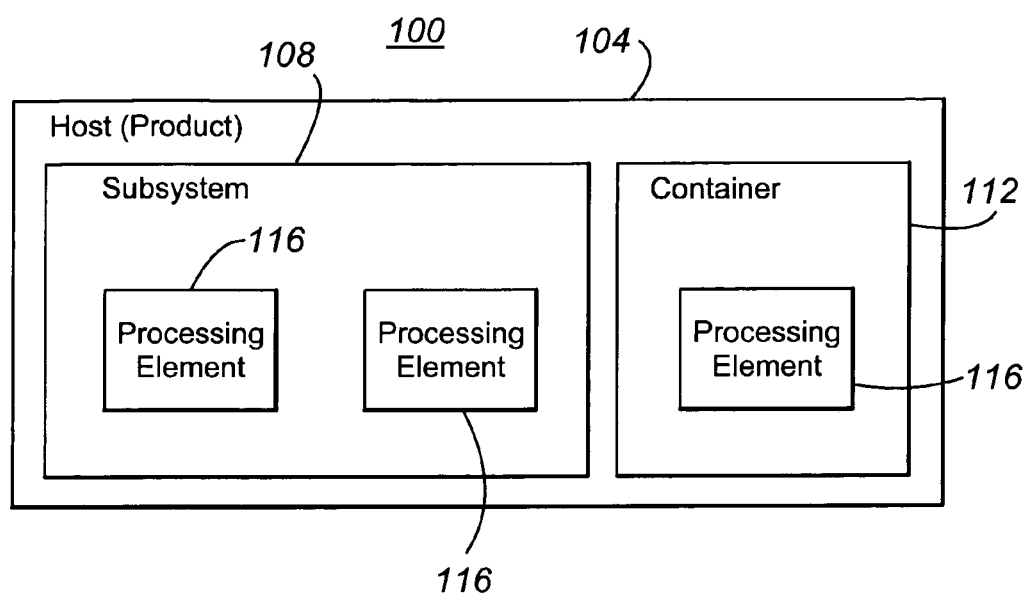
FIG. 1 is a block diagram of a host incorporating a host system including components utilizing a sub-system definition language in accordance with embodiments of the present invention.

FIG. 1 illustrates components comprising a system 100 utilizing a sub-system definition language (SDL) in accordance with embodiments of the present invention. The system 100 generally comprises a host or product 104. The host 104 can be any application or system implemented in connection with the execution of programming by a computer processor. By way of example, and without limitation, a host 104 may comprise a customer relationship management (CRM) product or system. The host 104 is made up of one or more sub-systems 108. The host 104 may also include zero or more containers 112. The subsystems 108 provide a logical grouping of processing elements 116, while the containers 112 provide a physical, runtime-grouping of processing elements 116. Accordingly, both the subsystems 108 and the containers 112 include processing elements 116. The arrangement of host 104 software components 108-116 illustrated in FIG. 1 provides one schema for arranging and inter-relating such software components. However, as can be appreciated by one of skill in the art, other arrangements are possible. Moreover, after consideration of the present disclosure, it can be appreciated that the present invention facilitates the integration, deployment and management of software components, regardless of the configuration of the system in which the software components are associated.

Figure 2:
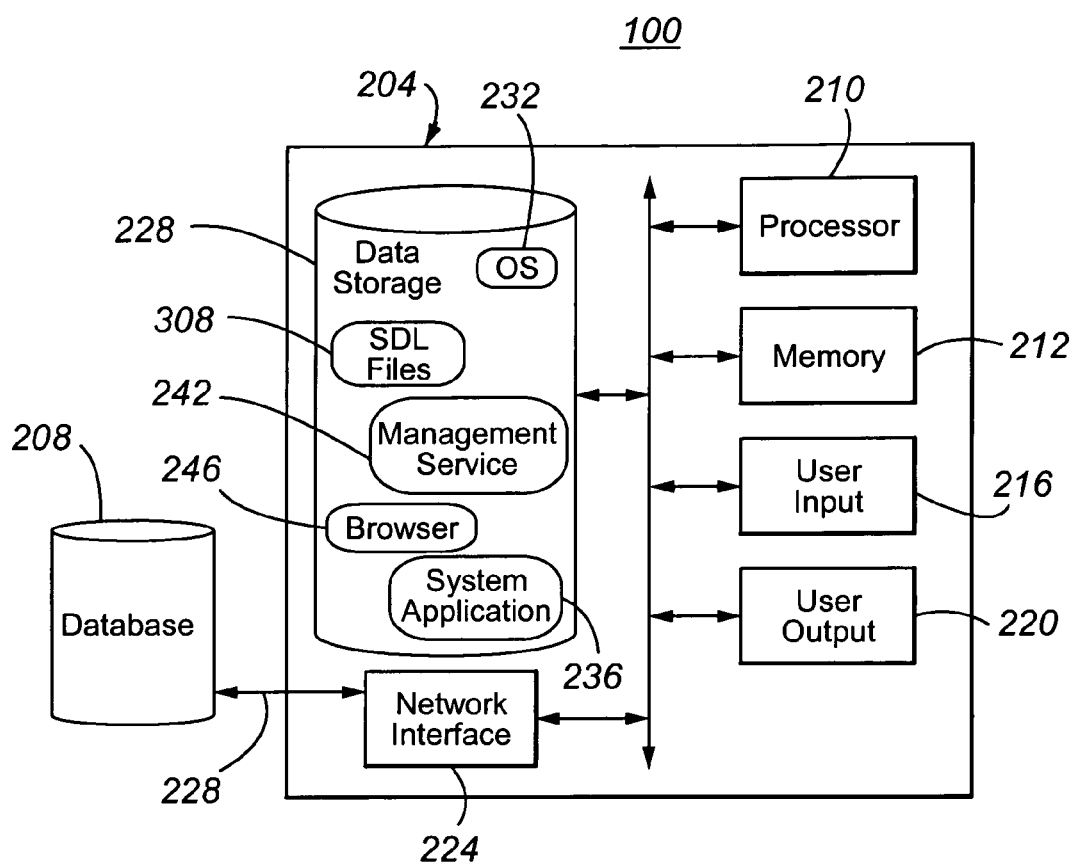
FIG. 2 is a block diagram depicting components of a computing apparatus capable of running a host system and associated management service in accordance with embodiments of the present invention.

With reference now to FIG. 2, an example of hardware components that may be included as part of a system 100 utilizing a sub-system definition language in accordance with embodiments of the present invention is illustrated in functional block diagram form. In general, the system 100 may comprise a general purpose programmable computer 204. The computer 204 may be associated with or connected to one or more databases 208.

Components of the computer 204 may include a processor 210 capable of executing program instructions. Accordingly, the processor 210 may include any general purpose programmable processor or controller for executing application programming. Alternatively, the processor 210 may comprise a specially configured application specific integrated circuit (ASIC). Processor 210 generally functions to run programming code implementing various functions performed by the system 100. For instance, continuing the example of a CRM system, such functions may include the routing of incoming calls to available customer service agents. As further examples, such functions may include a management service and administrative functions in connection with the deployment and or use of a sub-system definition language as described herein.

The computer 204 may additionally include memory 212 for use in connection with the execution of programming by the processor 210, and for the temporary or long term storage of data or program instructions. For example, the memory 212 may be used to store application programming or a set of instructions for execution in connection with the processor 210.

Various user input devices 216 and user output devices 220 may also be provided. Examples of user input devices 216 include a keyboard and numeric keypad. Examples of user output devices 220 include a speaker and a display. In general, the user input 216 and user output 220 devices are provided to support the operation or administration of the system 100.

A network interface 224 supports an interconnection between the computer 204 and other computers or devices associated with a network 228. For example, as illustrated, the network interface 224 may operate to interconnect the computer 204 to a database 208 via the network 228. Accordingly, examples of a network interface 224 include a wireline Ethernet interface or a wireless Wi-Fi interface.

A computer 204 provided as part of a system 100 in accordance with embodiments of the present invention may also include data storage 228 for the storage of application programming and data. For example, operating system software 232 may be stored in the data storage 228. In addition, various system applications 236 may be stored in data storage 228. Examples of system applications 236 include call distribution applications for use in connection with a system 100 comprising a CRM system. A management service or application 242 may also be stored in data storage 228. The management service 242, as described in greater detail elsewhere herein, can function to provide a user interface through which software components can be configured. More particularly, the management service uses SDL files 308 containing SDL items 306 (see FIG. 3). The SDL files 308 and SDL items 306 that are associated with a particular software component conform to the defined SDL schema. Accordingly, a product 104 comprising multiple software components can be associated with multiple schemas. In general, the set of SDL items 306 for a software component specify how that component should be configured. An SDL item 306 comprises metadata and an associated attribute, or characteristic value. The set of SDL items 306 in an SDL file 308 specify how the software component associated with the SDL file 308 should be configured/administered. In addition, the set of SDL items 306 in an SDL file 308 can be used to manage the collection and application of configuration/administration information from a user or administrator. Data, including SDL files 308 may also be stored in data storage 228. Other applications that may be stored include a browser application 246, which may be used to present and/or collect configuration information generated from SDL files 308 to a user via user input 216 and user output 220, as described in greater detail elsewhere herein.

The database 208 may itself comprise or incorporate a computer 204. Alternatively, the database 208 may comprise a data storage sub-system. As described in greater detail elsewhere herein, the database 208 may be used to store data collected by or operated on by the system 100, and/or data related to management of the system 100. Moreover, although a single computer 204 and database 208 are illustrated, it should be appreciated that a system 100 may include any number of computer 204 and/or databases. Moreover, connections between different devices included in a system 100 may be by one or more networks or may be direct.

Figure 3:
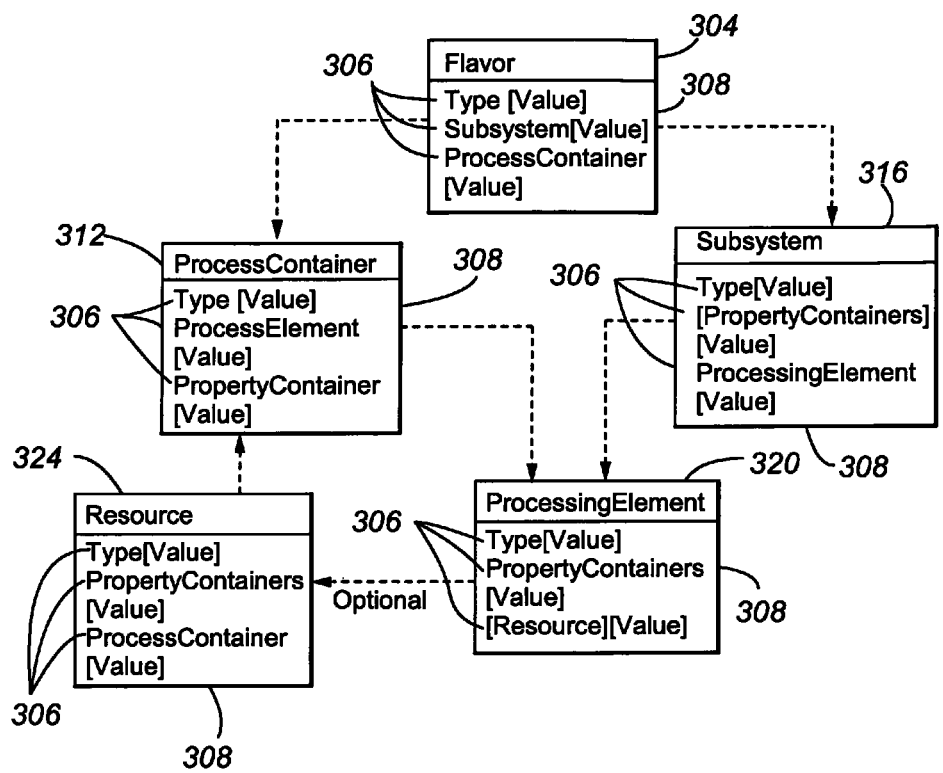
FIG. 3 is a block diagram of categories of sub-system definition language elements and related software components.

With reference now to FIG. 3, categories of sub-system definition language elements or schemas and related software components in accordance with embodiments of the present invention are illustrated. For example, a host function 304 may be described, at least partially, using a set of sub-system definition language items 306 that conform to the schema. Examples of particular SDL items 306 that can be included in a host function 304 SDL file include a host function type, sub-system identification, and process container identification. The sub-system definition language items 306 may be stored as metadata and name/value pairs in a file 308. An example of the contents of a host function SDL file 308 that supports all of the reporting system functionality is illustrated in FIG. 15. In particular, FIG. 15 illustrates a host function SDL file comprising plurality of SDL items 306, with each SDL item is associated with a metadata 310 and a value 311.

As depicted by the dotted lines in FIG. 3, the components of a system 100 may have a defined relationship to one another. Moreover, relationships between the components may be defined by the SDL files 308. For example, as defined by the SDL file 308 associated with the host function 304, one or more process containers 312 are specified. The process container 312 itself includes or is associated with an SDL file 308 containing a number of SDL items 306, such as a process container type SDL item, an SDL item specifying one or more processing elements associated with the process container 312, and an SDL item specifying one or more property containers included in the process container 312. An example set of the elements that can comprise a process container 312 SDL file 308 is illustrated in FIGS. 16 A-B. In particular, FIG. 16 illustrates a process container SDL file comprising a plurality of SDL items 306, with each SDL item 306 comprising metadata and a value.

In addition, one or more sub-systems 316 may be specified by the SDL items 306 of the SDL file 308 associated with the host function 304. The sub-system 316 may include or be associated with an SDL file containing a number of SDL items 306. Such items may include a sub-system type, property containers, and a processing element. Moreover, a sub-system 316 may refer to a number of processing elements 320. An example of the SDL items that can be included in a sub-system 316 SDL file 308, each comprising metadata 310 and value 311 pairs is illustrated in FIG. 17.

Another SDL file 308 is provided for the processing element 320. As an example, the SDL items 306 included in an SDL file 308 associated with a processing element 320 include a processing element type, property containers, and resources. An example of the SDL items 306 of a processing element 320 SDL file 308, each comprising metadata 310 and value 311 pairs, is illustrated in FIGS. 18 A-E.

If a resource 324 is included in the system and referred to by a processing element 320, the resource 324 is itself associated with an SDL file 308 containing a number of SDL items 306. Such items 306 may include a resource type and an identification of one or more property containers and process containers associated with the resource 324. An example of the SDL items 306 of a resource 324 SDL file 308, each comprising metadata and value pairs is illustrated in FIGS. 19 A-QQ.

As shown in the various examples, each SDL file 308 can contain child elements comprising property containers and/or UIMetaData. A property container is a collection of configuration or administration properties. UIMetaData information defines how entities or properties should be presented to the user for configuration or administration. Property containers and UIMetaData can each be defined in SDL files 308. An example of the property container SDL items 306 that can be included in SDL files 308 according to the property container schema is illustrated in FIGS. 24A-D. This schema file is included in the schema files for all of the higher-level entities (e.g. host function, subsystem, process container, processing element, resource, etc). In accordance with embodiments of the present invention, a property container can function in connection with the generation of the user interface 242 for receiving configuration information from the user.

Similarly, UIMetaData can function in connection with the generation of the user interface 242 for receiving configuration information from the user. In particular, a set of UIMetaData elements can be used to specify how the entity definition information should be provided to the administration users via the management service GUI. The UIMetaData items or information must conform to the XML or other schema defined in the UIMetaData.xsd file. A UIMetaData schema is illustrated in FIGS. 25 A-B. This schema file is also included in the schema files for all of the higher-level entities (e.g. host function, subsystem, process container, processing element, resource, etc).

In accordance with embodiments of the present invention, a schema is defined for each of a number of software component types included in a system 100. In general, a schema controls how the SDL metadata for a software component must be defined in order to operate within the system 100. The particular items of data or metadata 306 that are relevant to a particular software component are defined by that software component and/or the host or product 104 that includes the software component. In addition to specifying particular parameters, SDL items 306 can define data that is collected from a user or administrator. The way in which items of data are presented to and are collected from the user can be specified by metadata included in the SDL file 308. Accordingly, while the schema controls how the metadata is defined, the metadata and associated values determines how the component is administered and/or configured.

Moreover, all SDL files 308 for the system 100 may conform to one of the schemas. In general, when components such as sub-systems 108 or processing elements 116 are added to a system 100, the SDL files 308 for that component are provided with the programming code for the software component. Installation of the component includes placing the associated SDL file 308 in a central location (e.g. the data storage 228 of a computer 204 or in a database 208) where they can be accessed by administration processes, such as a management service.

Figure 4:
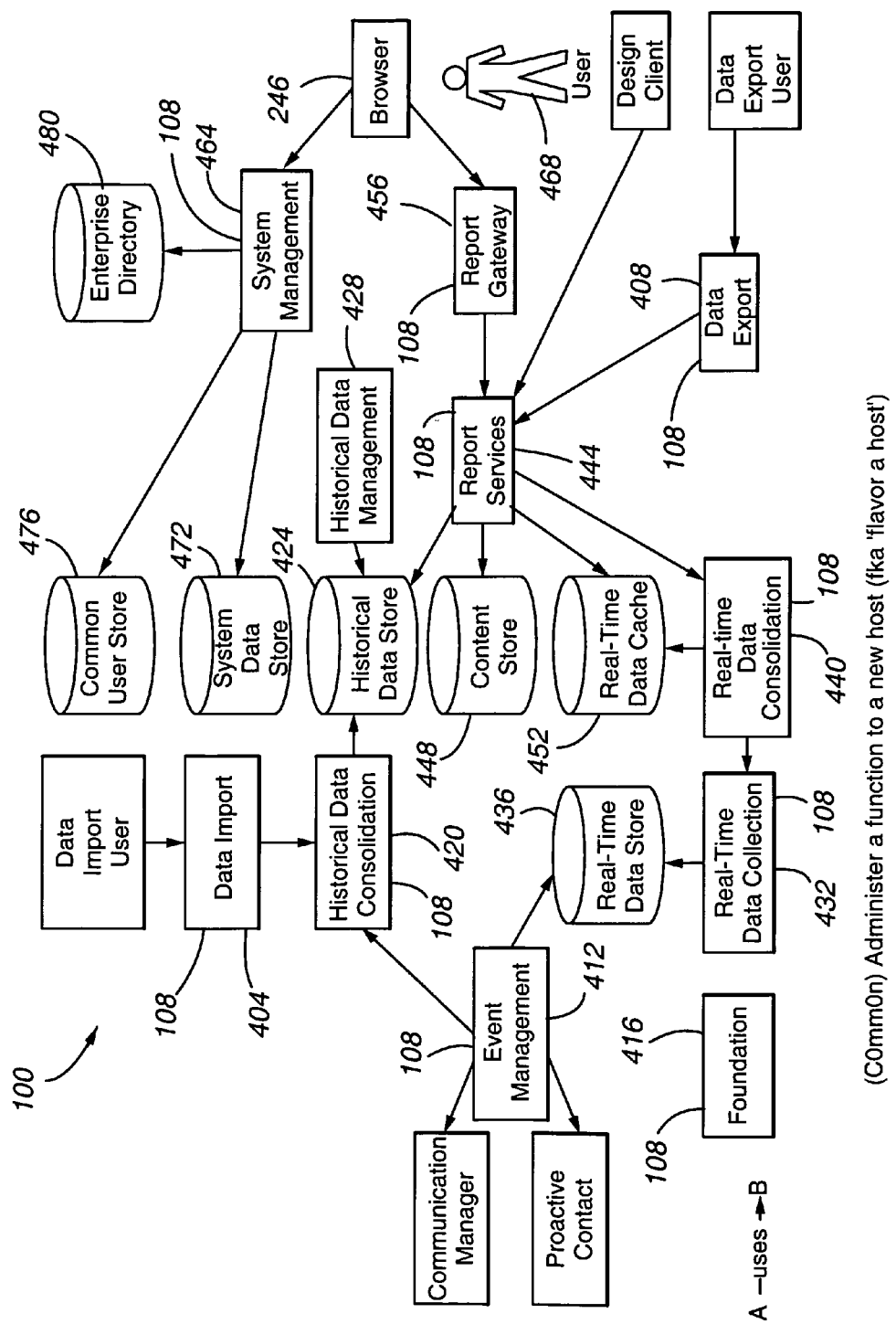
FIG. 4 is a block diagram depicting sub-systems, data stores and external systems in connection with an example system utilizing a sub-system definition language in accordance with embodiments of the present invention.

FIG. 4 is a block diagram depicting sub-systems, data storage and external systems associated with an example system 100 utilizing a sub-system definition language in accordance with embodiments of the present invention. More particularly, the illustrated system 100 is an example of a customer relationship management reporting system utilizing a sub-system definition language in accordance with embodiments of the present invention. In general, the system 100 includes a number of sub-systems 108, and can be deployed across multiple computers 204 for scalability and availability. All of the sub-systems 108 can be deployed onto a single host computer 204, or they can be deployed onto individual host computers 204. The system 100 may also operate in association with one or more databases 208. Accordingly, a number of deployment combinations are possible. Moreover, the set of supported deployment combinations is specified using SDL files 308. In addition, the individual components are also defined using the SDL files 308.

Table 1 illustrates the contents of an example host function SDL file. More particularly, the AllFunctions SDL file contents are illustrated. This host function SDL file defines how all the sub-systems in an example system can be deployed on a single host computer.

TABLE 1

```
<?xml version="1.0" encoding="UTF-8" ?>
- <flavor xmlns="http://www.rnd.avaya.com"
        xmlns:xsi="http://www.w3.org/2001/XMLSchema-
        instance"
        xsi:schemaLocation="http://www.rnd.avaya.com
        flavor.xsd"
        type="ABFunctions" resourceBundle="CCRSubsys"
        typeKey="AllFunctions.typeKey" minInstances="0"
        maxInstances="1">
        <description key="AllFunctions.firstKey" />
    - <subsystems>
            <refSubsystemType ref="SystemManagement" />
            <refSubsystemType ref="Foundation" />
            <refSubsystemType ref="ReportGateway" />
            <refSubsystemType ref="ReportManagement" />
            <refSubsystemType ref=
            "RealTimeReportExecution" />
            <refSubsystemType ref=
            "HistoricalDataConsolidation" />
            <refSubsystemType ref=
            "RealTimeDataConsolidation" />
            <refSubsystemType ref="DataCollection" />
        </subsystems>
    - <processContainers>
            <refProcessContainerType ref=
            "MessageBrokerService"
               createUnconditionally="true" />
            <refProcessContainerType ref="CSTomcat"
               createUnconditionally="true" />
            <refProcessContainerType ref="AdminJBoss"
               createUnconditionally="true" />
            <refProcessContainerType ref="DataProcessingJBoss"
               createUnconditionally="false" />
            <refProcessContainerType ref="ReportingJBoss"
               createUnconditionally="true" />
            <refProcessContainerType ref=
            "ReportingApplicationService"
               createUnconditionally="true" />
            <refProcessContainerType ref="ReportingWebService"
               createUnconditionally="true" />
        </processContainers>
</flavor>
```

Another example of a host function SDL file is the data collection function illustrated in Table 2. As is apparent from a comparison of the contents of the data collection SDL file and the AllFunctions SDL file, the data collection host function SDL file only includes a sub-set of the sub-system types associated with the overall system. This illustrates how the host function SDL files can define which components can be included in different deployment combinations.

TABLE 2

```
<?xml version="1.0" encoding="UTF-8" ?>
- <flavor xmlns="http://www.rnd.avaya.com"
        xmlns:xsi="http://www.w3.org/2001/XMLSchema-instance"
        xsi:schemaLocation="http://www.rnd.avaya.com flavor.xsd"
        type="DataCollection" resourceBundle="CCRSubsys"
        typeKey="DataCollection.typeKey" minInstances="0"
        maxInstances="1">
        <description key="DataCollection.firstKey" />
    - <subsystems>
            <refSubsystemType ref="Foundation" />
            <refSubsystemType ref="DataCollection" />
        </subsystems>
    - <processContainers>
            <refProcessContainerTyperef=
            "MessageBrokerService"
               createUnconditionally="true" />
            <refProcessContainerType ref=
            "CSTomcatBasic"
               createUnconditionally="true" />
            <refProcessContainerType ref=
            "DataCollectionJBoss"
               createUnconditionally="false" />
            <refProcessContainerType ref="IRSJBoss"
               createUnconditionally="true" />
        </processContainers>
</flavor>
```

An example of a sub-system SDL file is illustrated in Table 3. Specifically, Table 3 illustrates the contents of the data collection subsystem SDL file. As shown in Table 1, the data collection sub-system is referenced in the AllFunctions host function SDL file, and is also defined in the data collection host function SDL file. As shown in Table 3, a sub-system SDL file can define metadata and can include processing elements. For instance, the data collection sub-system in the example of Table 3 includes PECM Adapter and PEPDS Adapter processing elements.

TABLE 3

```
<?xml version="1.0" encoding="UTF-8"?>
<subsystem
    xmlns="http://www.rnd.avaya.com"
    xmlns:xsi=
    "http://www.w3.org/2001/XMLSchema-instance"
    xsi:schemaLocation=
    "http://www.rnd.avaya.com subsystem.xsd"
    type="DataCollection"
    resourceBundle="CCRSubsys"
    typeKey="DataCollection"
    minInstances="0"
    maxInstances="1">
    <processingElements>
        <refProcessingElementType ref="PECMAdapter"
createUnconditionally="false" />
        <refProcessingElementType ref="PEPDSAdapter"
            createUnconditionally="false"/>
    </processingElements>
</subsystem>
```

In table 4, the contents of an example processing elements SDL file, and more particularly, the PECMAdapter SDL file are illustrated. In this example processing element SDL file, various property containers are included.

TABLE 4

```
<?xml version="1.0" encoding="UTF-8" ?>
- <processingElement xmlns="http://www.rnd.avaya.com"
        xmlns:xsi="htitp://www.w3.org/2001/XMLSchema-insitance"
        xsi:schemaLocation="http://www.rnd.avaya.com
        processingElement.xsd" type="PECMAdapter"
        typeKey="PECMAdapter" maxInstances="1" minInstances=
        "1" stateManageable="true" resourceBundle="CCRSubsys"
```

TABLE 4-continued

```
        mBeanClassName="com.avaya.ccr.common.adapter.
            PEAdapterLCM"
        startOrder="7">
- <!--
PECMAdapter Tab Designation
    -->
- <UIMetaData>
        <tab tabNameKey="general_key" tabNameId="General" />
    </UIMetaData>
- <!--
DSS Service Property Container
    -->
- <propertyContainer name="PECMAdapterDSSInterface"
            categoryName="DSSInterface">
    - <properties>
        - <!--
        UUID property value is system generated
        -->
            <stringProperty property="UUID" default="" required="false"
            />
        - <!--
        Service Type property
        -->
            <stringProperty property="Type" default="AdapterManager"
                required="true" />
        - <!--
        Major Version property
        -->
            <stringProperty property="Major" default="1"
                required="true" />
        - <!--
        Minor Version property
        -->
            <stringProperty property="Minor" default="0"
                required="true" />
        - <!--
        DSS Interface property
        -->
            <stringProperty property="InterfaceClass"
                default="com.avaya.ccr.common.adapter.
                AdapterManager" required="true" />
        - <!--
        Protocol property
        -->
            <stringProperty property="DefaultProtocol" default="VESP"
                required="true" />
        - <!--
        Host property
        -->
            <stringProperty property="Host" default="" required="false"
            />
    </properties>
</propertyContainer>
- <!--
StateManageable DSS Service Property Container
    -->
- <propertyContainer name="StateManageableDSSInterface"
            categoryName="DSSInterface">
    - <properties>
        - <!--
        UUID property value is system generated
        -->
            <stringProperty property="UUID" default=""
            required="false"
            />
        - <!--
        Service Type property
        -->
            <stringProperty property="Type"
                default="StateManageableDSSInterface"
                required="true" />
        - <!--
        Major Version property
        -->
            <stringProperty property="Major" default="1"
                required="true" />
        - <!--
        Minor Version property
        -->
            <stringProperty property="Minor" default="0"
                required="true" />
        - <!--
        DSS Interface property
        -->
            <stringProperty property="InterfaceClass"
                default="com.avaya.coreservice.admin.pe.PEState
                Manageable" required="true" />
        - <!--
        Protocol property
        -->
            <stringProperty property="DefaultProtocol" default=
            "VESP"
                required="true" />
        - <!--
        Host property
        -->
            <stringProperty property="Host" default="" required=
            "false"
            />
    </properties>
</propertyContainer>
- <!--
Generated Properties Start
    -->
- <!--
heartbeat Property Container
    -->
- <propertyContainer name="heartbeat"
            displayKey="pecmadapter.heartbeat.disp.key"
            descriptionKey="pecmadapter.heartbeat.desc.key"
            categoryName="heartbeat"
            categoryKey="pecmadapter.heartbeat.category.key">
    - <properties>
        - <!--
        heartbeatintervalSeconds property
        -->
            <longProperty property="heartbeatIntervalSeconds"
                default="300" required="false"
                restartRequiredOnChange="true" />
        - <!--
        missingHeartbeatCountsToFailure property
        -->
            <longProperty
                property="missingHeartbeatCountsToFailure"
                default="4" required="false"
                restartRequiredOnChange="true" />
        - <!--
        missingHeartheatCountsToUnknown property
        -->
            <longProperty
                property="missingHeartbeatCountsToUnknown"
                default="2" required="false"
                restartRequiredOnChange="true" />
        - <!--
        numberRestartsToEscalation property
        -->
            <longProperty property="numberRestartsToEscalation"
                default="5" required="false"
                restartRequiredOnChange="true" />
        - <!--
        restartLimitOnFailure property
        -->
            <longProperty property="restartLimitOnFailure"
                default="10" required="false"
                restartRequiredOnChange="true" />
    </properties>
</propertyContainer>
- <!--
inputresource Property Container
    -->
- <propertyContainer name="inputresource"
            displayKey="pecmadapter.inputresource.disp.key"
            descriptionKey="pecmadapter.inputresource.desc.key"
            categoryName="inputresource"
            categoryKey="pecmadapter.inputresource.category.key">
    - <properties>
        - <!--
        dphostUUID property
        -->
            <stringProperty property="dphostUUID" default=""
```

TABLE 4-continued

```
            required="true" restartRequiredOnChange="true" />
- <!--
    inputresourceid property
        -->
        <stringProperty property="inputresourceid" default=""
            required="true" restartRequiredOnChange="true" />
- <!--
    reportingsourceUUID property
        -->
        <stringProperty property="reportingsourceUUID"
            default=""
            required="true" restartRequiredOnChange="true" />
- <!--
    sourcelevel property
        -->
        <integerProperty property="sourcelevel" default="10"
            minValue="0" maxValue="10" required="true"
            restartRequiredOnChange="true" />
- <!--
    sourceUUID property
        -->
        <stringProperty property="sourceUUID"" default=""
            required="true" restartRequiredOnChange="true" />
    </properties>
</propertyContainer>
- <!--
    persistence Property Container
        -->
- <propertyContainer name="persistence"
    displayKey="pecmadapter.persistence.disp.key"
    descriptionKey="pecmadapter.persistence.desc.key"
    categoryName="persistence"
    categoryKey="pecmadapter.persistence.category.key">
- <properties>
    - <!--
        policy property
            -->
        <stringProperty property="policy" default="none"
            required="true" restartRequiredOnChange="true" />
    </properties>
</propertyContainer>
- <!--
    Generated Properties End
        -->
</processingElement>
```

One sub-system 108 included in the example of FIG. 4 is the data integration sub-system 108, shown as data import 404 and data export 408. The event management sub-system 412 collects real-time events from one or more external source systems or applications and processes the events into historical and real-time data. The foundation sub-system 416 contains common services used across the product or system 100, including core services as well as product specific services. The historical data consolidation sub-system 420 writes historical data from multiple event management sub-systems 412 to the historical data store 424. The historical data management sub-system 428 provides database management functionality such as schema management and automatic removal of old data from the historical data store 424. The real-time data collection sub-system 432 provides access to real-time data created by an event management sub-system 412 via a real-time data store 436. The real-time data consolidation sub-system 440 provides a consolidated view of real-time data from one or more real-time data collection sub-systems 432. The real-time report execution sub-system 444 manages the execution and display of automatically refreshing real-time reports, and can provide output for storage to the historical data store 424, a content store 448, and/or a real-time data cache 452. The report gateway sub-system 456 provides web access to reports. Accordingly, the report gateway sub-system 456 may operate in association with a browser 460. A report management sub-system may also be provided to allow users to view, create, manage and distribute reports. After consideration of the present disclosure, it can be appreciated that the configuration parameters for each sub-system can be defined in a unique SDL file.

A system 100 utilizing a sub-system definition language in accordance with embodiments of the present invention also includes a system management sub-system 464. The system management sub-system 464 provides operations, administration and maintenance (OAM) capabilities for the system and administration of system components or entities. Moreover, the system management sub-system 464 may comprise or provide a management service 242. As such, a user interface may be presented to a user 468, for example via a browser 246, for receiving configuration information from the user 468 with respect to system 100 components.

As illustrated in FIG. 4, various data stores may be provided for storing different types of data in an organized fashion. For example, the historical data store 424 generally stores historical detail and summary data for generating reports related to the operation of the system 100. The real-time data store 436 generally contains real-time data generated by the event management sub-system 412. The real-time data cache 452 provides a consolidated view of multiple real-time data stores 436 used by currently active real-time reports. The central content store 448 generally contains report definitions and administration data used by the reporting sub-systems. A local content store (not shown in FIG. 4) can also be provided for storing real-time report definitions and administration data used to run real-time reports. A system data store 472 can be provided for storing administration and configuration data. A common user store 476 is a light weight directory access protocol (LDAP) containing user profile data for users of the system 100, and can be encapsulated by a common user service. The enterprise directory 480 is an optional, customer provided identity management system containing enterprise user identities. If provided, the enterprise directory 480 is synchronized to the common user store 476 for authentication of system 100 users.

In general, embodiments of the present invention present a user interface, for example the browser 246 to a user 468 that can be used to collect information from the user 468. More particularly, the elements in an SDL file 308 associated with a system 100 component being administered (e.g. added or modified) drive the content of pages displayed by the browser 246. For example, the host functions for a host or product 104 are defined by the SDL file 308 for the host 104 and displayed by a user interface comprising a browser 246 page running on or in association with a computer 204.

Figure 5:
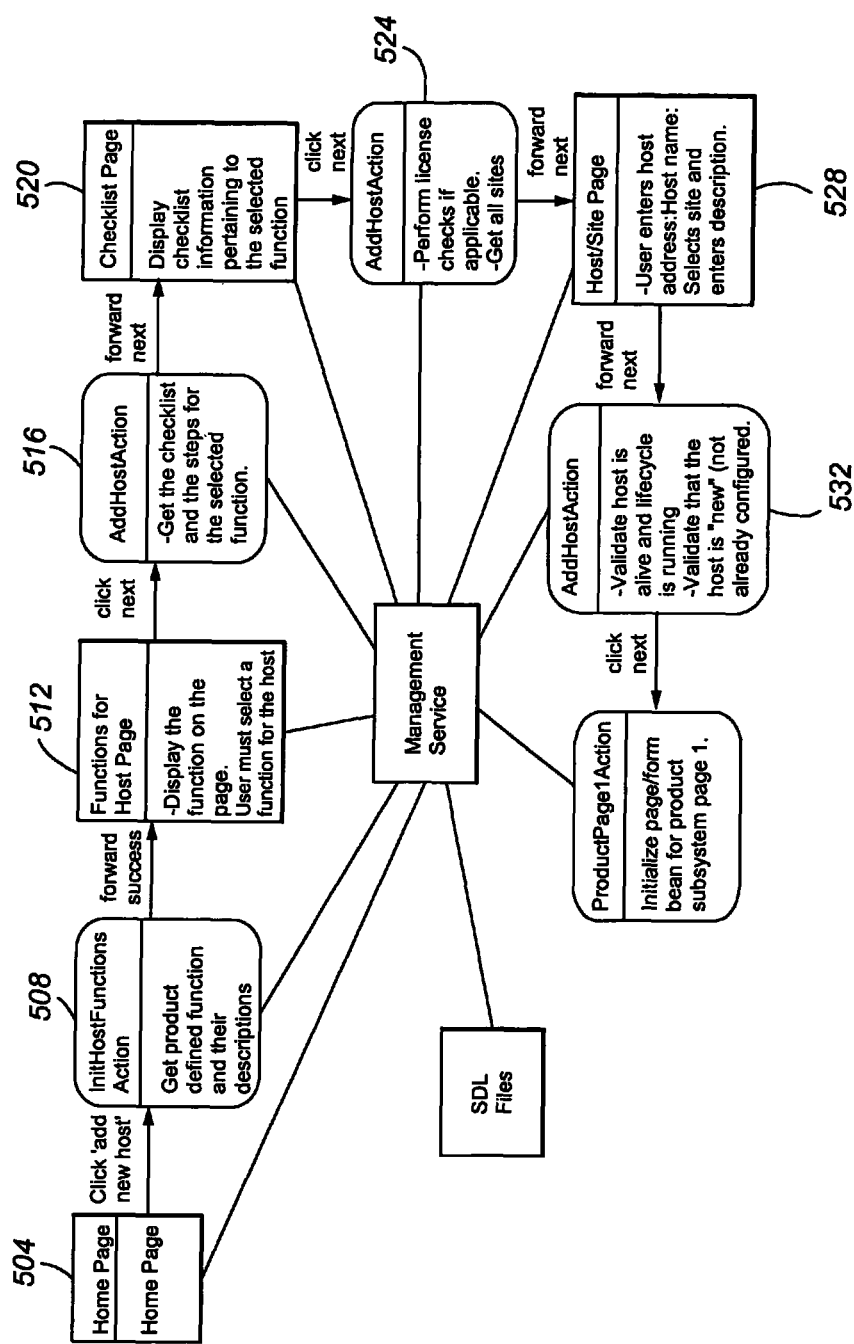
FIG. 5 depicts a user interface flow of a system in accordance with the embodiments of the present invention.

FIG. 5 is an illustration of an exemplary user interface flow in accordance with the embodiments of the present invention. In general, the user interface flow may be generated and controlled through operation of the management service 242, with reference to the SDL files 308 for software components being configured. Moreover, data may be displayed and collected using a web browser 246. Initially, a user 468 is presented with a home page 504. The home page 504 may present a number of choices from which a user 468 may select, and/or entry fields in which input may be provided. More particularly, embodiments of the present invention provide common pages in which at least some content may be data driven based on information contained in SDL files 308. The home page 504 may accept input in the form of selections or data entry from a user 468. In response to the input from the user, a next page is presented.

In the example of FIG. 5, the user has selected an "add new host" item in the home page 504. In response, the system 100 presents an initial host functions action page 508. The initial host functions action page 508 can present available host functions to the user 468 for selection; the list of available host functions is determined by in the defined list of host function SDL files. Moreover, by selecting one of the available host functions, product defined functions and/or descriptions are available to the user 468. In accordance with embodiments of the present invention, the host function description information is defined in the SDL file 308 for the selected host function. The user selects a function for the host from the functions for host page 512. By then clicking next, the user 468 may access an add host action page 516 that allows the user the option to obtain a checklist containing the steps that must be taken in order to add the selected host function to the system 100.

Through the checklist page 520, the user 468 may be provided with information necessary to integrate the host to the system 100. In accordance with embodiments of the present invention, the contents of the checklist page 520 are determined by the SDL file 308 for the selected host function. By clicking next, the add host action page is presented in a second instance 524, at which license checks may be performed for applicable sites. A host/site page 528 can then be accessed. The host/site page 528 can present fields to the user 468 in which the host address, host name, selected site, description and other information may be entered. Accordingly, the user may input configuration data through the browser and more particularly through the web page presented by the browser 246. Once the user has completed the entry of information in the host site page 528, a third instance of the add host action page 532 may be accessed to validate that the host 104 is alive and that its life cycle is running, and to validate that the host 104 is new and not already configured. At this point, the information in all the SDL files for the constituent sub-system and container types specified in the host function SDL file, as well as the information in all the SDL files for the constituent processing elements specified in the sub-system and process container SDL files, is parsed and used by the management service to generate the user interface web pages for configuring all the components that make up the selected host function. The user is prompted to enter the configuration information for each component according to the rules specified by the metadata defined in each SDL file. The entered information is also validated according to the rules specified by the metadata defined in each SDL file. Once all the configuration information has been entered and validated, the user is prompted to confirm the information for the new host. By clicking finish, the information for the added host 104, as set out in the configured host SDL file 308, may be persisted to the system model by management service 242, and the system may be operated with the added host 104. Accordingly, it can be appreciated that a host may be added to a system 100, without requiring that the programming instructions for the management service be re-compiled.

Figure 6:
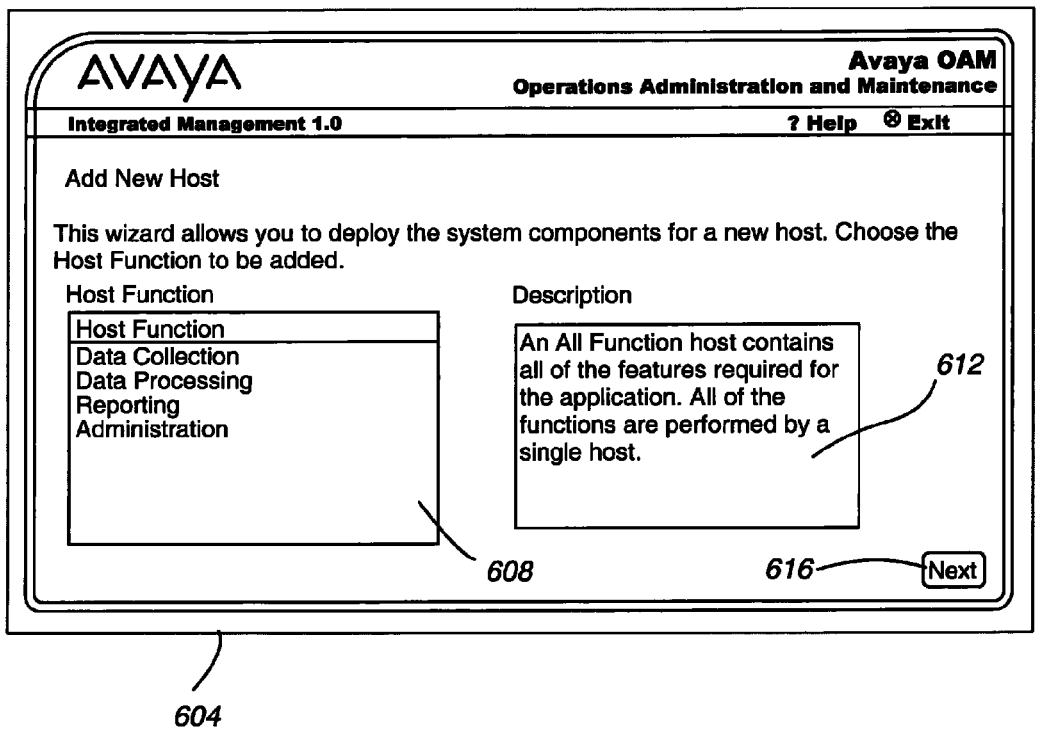
FIG. 6 is a screen shot of a user interface presented to a user in response to a selection to add a host in accordance with an exemplary embodiment of the present invention.

FIG. 6 is a screen shot of an exemplary page that may be displayed by a system 100 utilizing a sub-system definition language in accordance with the embodiments of the present invention. More particularly, FIG. 6 illustrates an example of an add new host page. The add new host page 604 is the first page that a user 468 sees after pressing an "add host" button on an introductory or previous page. The add new host page 604 includes a list of host functions 608 that is generated based on the host functions or "flavors" that have been defined in the host function SDL files 308 and stored in the database 208 or data storage 228. Accordingly, the list of host functions 608 is an example of data presented to a user that is generated based on the content of particular SDL files 308 for a host 104 associated with or available to a system 100.

The add new host page 604 includes host description information 612 that is generated based on data included in the host function SDL file 308 for the function selected by the user in the list of host functions 608. Accordingly, the host description information 612 is another example of information that may be presented to a user 468 and that is generated based on information contained in SDL files 308. The user 468 may advance to the next screen by selecting the next button 616.

Figure 7:
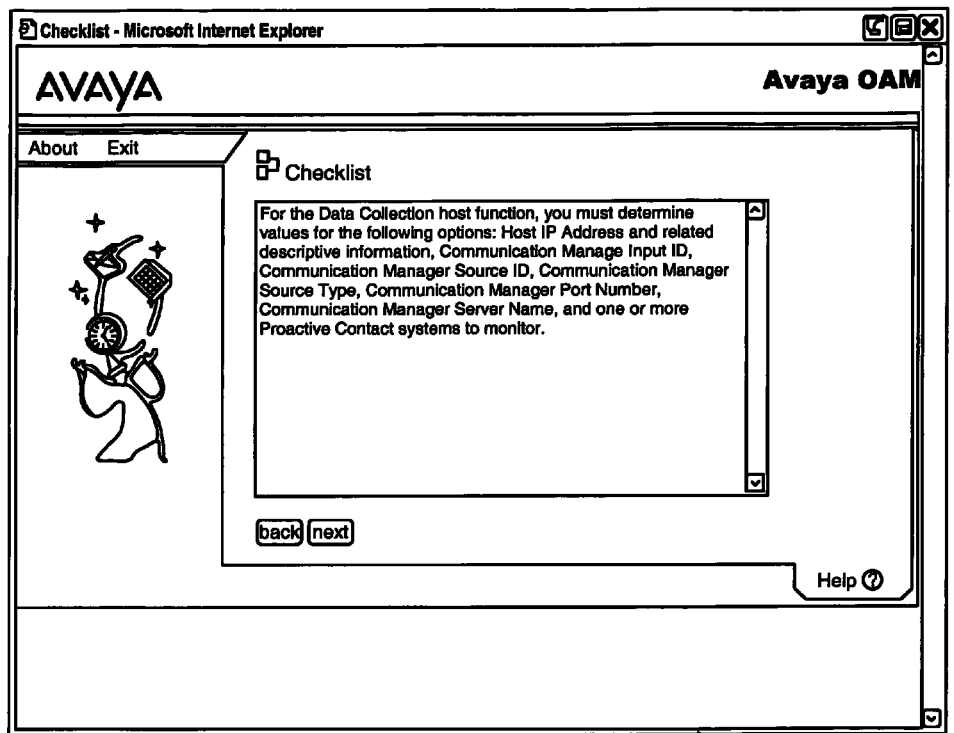
FIG. 7 is a screen shot of a checklist presented to a user after selection of a host function in accordance with an exemplary embodiment of the present invention.

The checklist page 704 illustrated in FIG. 7 is presented to the user 468 after a selection of the next button 616 from the add new host page 604. The checklist page 704 displays information regarding configuration data that must be provided in order to successfully add the host function that was selected by the user 468 from the add new host page 604. The checklist information is generated based on data contained in the selected host function's SDL file 308.

Figure 8:
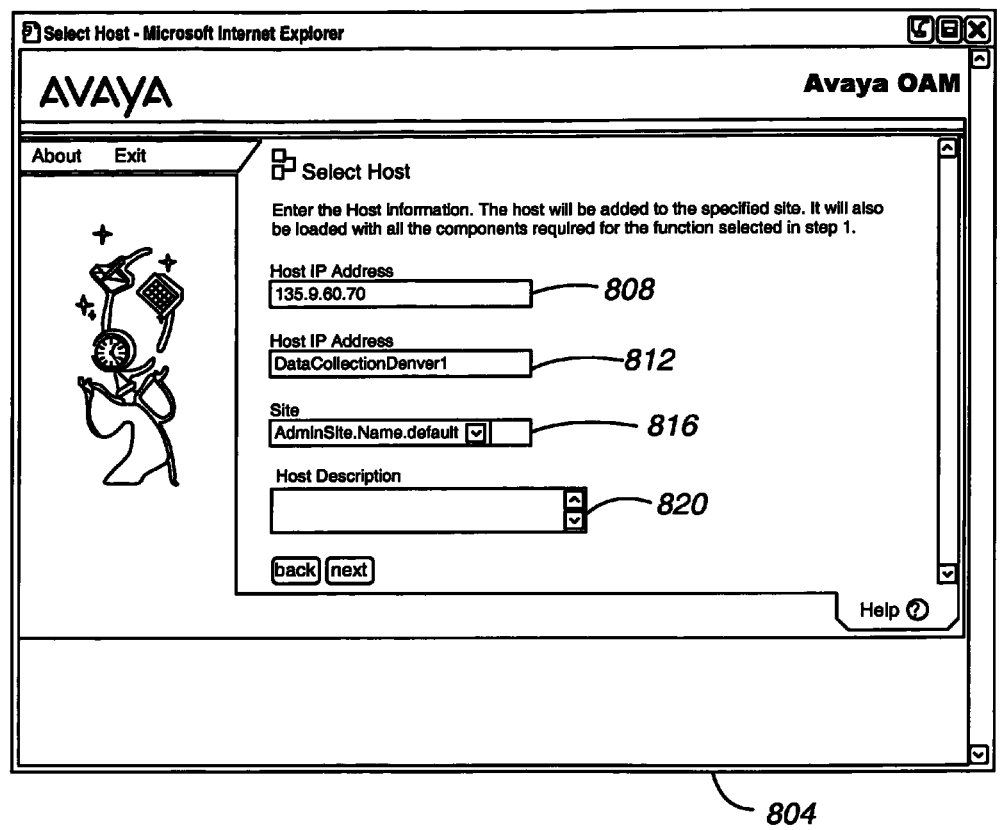
FIG. 8 is a screen shot of a user interface presented to a user that allows a user to select a host to configure in accordance with an exemplary embodiment of the present invention.

FIG. 8 illustrates a select host page 804 from which a user 468 may select a particular host 104 for configuration. The select host page 804 may include various fields in which the user 468 may enter information or edit pre-configured information. For example, host address 808, host name 812, site 816, and host description 820 fields may be provided.

Figure 9:
FIG. 9 is a screen shot of a user interface presented to a user to prompt the user to enter appropriate configuration data in accordance with an exemplary embodiment of the present invention.

Subsequent pages presented to the user 468 may prompt the user to enter appropriate configuration data required for the host function that was selected from the new host function list 608 on the add new host page 604. Moreover, pages may be presented for each sub-system 108 that comprises the selected host function 104. The management service may then iterate through the SDL data for each processing element 116 that comprises each sub-system 108 to determine the administration pages that should be generated as well as their contents. In FIG. 9, an example configuration data page 904 is illustrated. As shown, the configuration data page 904 includes a number of fields 908 in which a user may input data. The fields 908 may be free-form, pre-defined, or may comprise drop down lists. In this example, the configuration data page 904 relates to configuring a communication manager function. As can be appreciated by one of skill in the art after consideration of the present disclosure, a configuration data page 904 may be provided for each configurable component that is associated with or that can be added to a system 100. The content of the configuration data screen or administration screen 904 is driven by the SDL definition file 308 for the selected component. Moreover, it should be appreciated that property definitions included in an SDL definition file 308 for a component drives the generation of the administration screens. However, that information does not need to be included in the user interface presented to the user 468 if the default value is all that is required by the management service 242 and/or the larger system 100 in order to properly configure the selected component. That is, the default value is already provided by the SDL file 308, and further input from the user is not required. Those properties that do require input from the user are what are typically presented as part of the configuration page 904. After the user 468 has entered information in the fields presented as part of the configuration page 904, a next button 912 may be selected.

Figure 10:
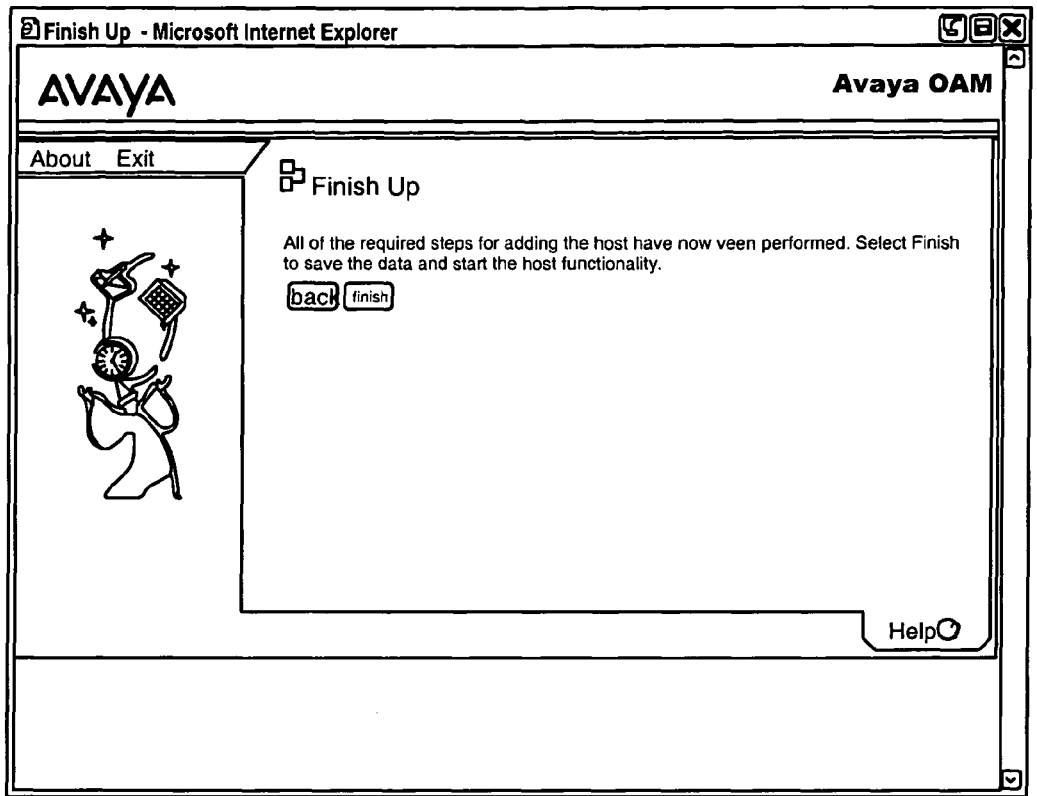
FIG. 10 is a screen shot of a user interface presented to a user once configuration data has been entered in accordance with an exemplary embodiment of the present invention.

Following entry of data in the configuration page 904, the user 468 may be prompted to save their changes in a completion confirmation page 1004, an example of which is illustrated in FIG. 10. By selecting the "finish" button the user can save all of the configuration data to the database 208, and continue with configuring other hosts 104, host functions, sub-systems 108, process containers 112, processing elements 116 and/or other components associated with the host 104 or host function.

Figure 11:
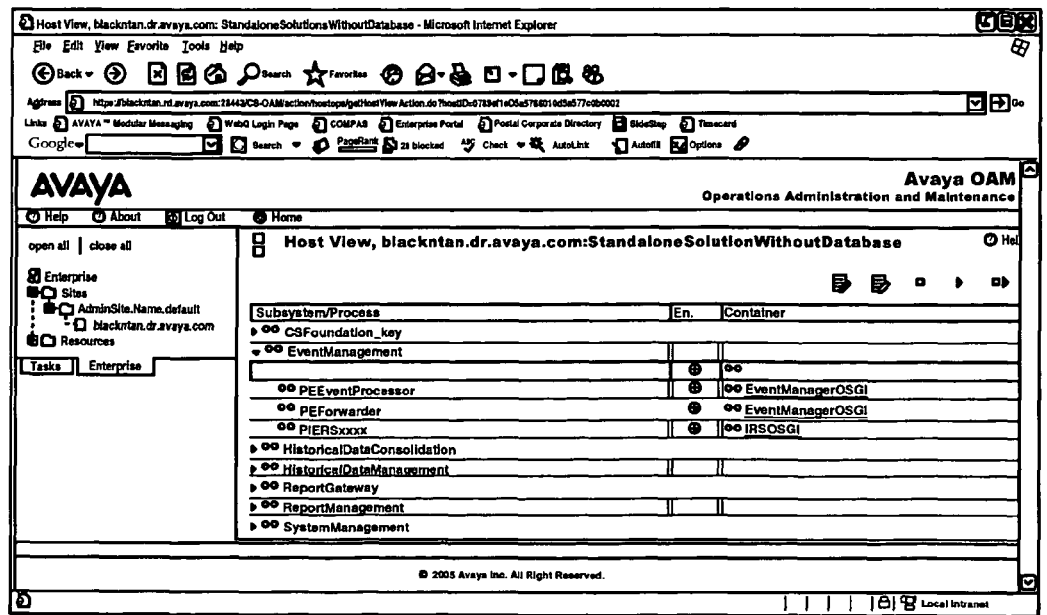
FIG. 11 is a screen shot of an administration interface displaying status information in accordance with an exemplary embodiment of the present invention.

After a component has been added or configured, a user 468 can access the administration interface to monitor the status of the host 104 and all of its constituent processing elements 116 or other software components. An example administration interface page 1104 is illustrated in FIG. 11. The administration interface 1104 allows the user to drill down into individual processing elements in order to edit the associated properties.

Figure 12A:
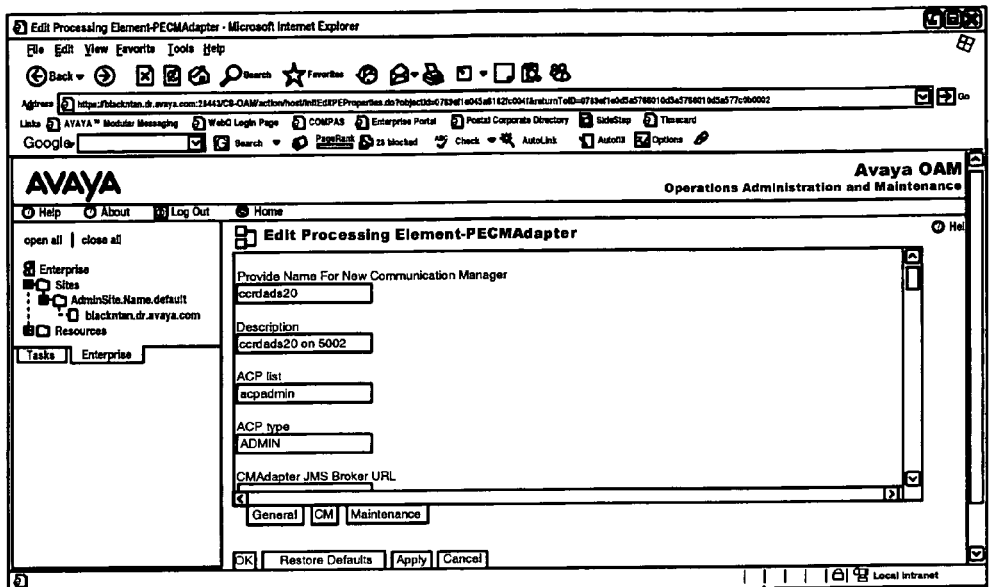
FIG. 12A is a screen shot of a user interface presented to a user for receiving configuration information in connection with a selected processing element in accordance with an exemplary embodiment of the present invention.
Figure 12B:
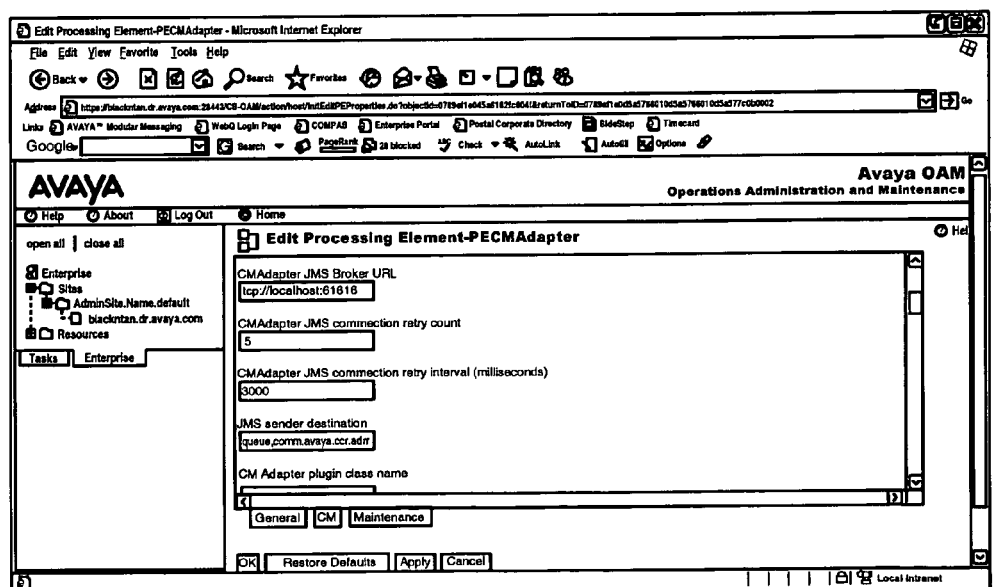
FIG. 12B is a continuation of the screen shot of FIG. 12A.
Figure 12C:
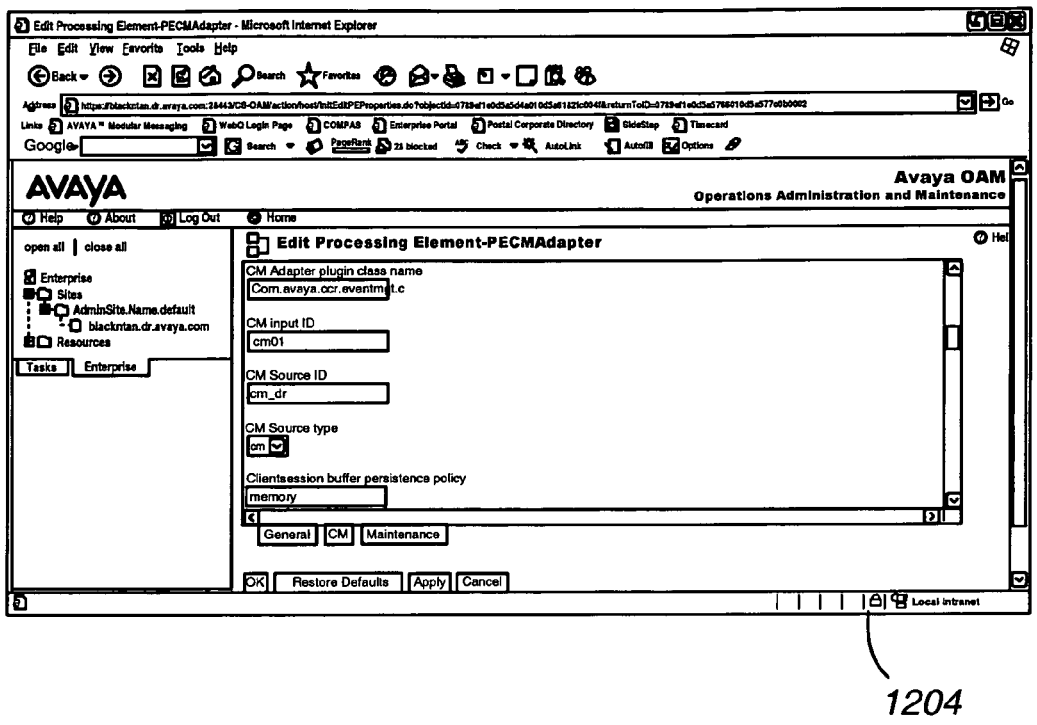
FIG. 12C is a continuation of the screen shots illustrated in FIGS. 12A and 12B.

If a user 468 chooses to edit a processing element by selecting a processing element from the administration interface 1104 and selecting the edit button, an edit page 1204 is presented to the user 468. Different portions of the edit page 1204 are illustrated in FIGS. 12A-12C. In the example edit page 1204, information related to the same processing element 116 that was the subject of the example configuration page 904 (FIG. 9) is shown. As can be seen from a comparison of FIG. 9 to FIGS. 12A-C, the same properties shown in the configuration pages 904 can be accessed through the edit pages 1204. The edit pages 1204 also include properties for the subject component that were not included in the configuration pages 904. For example, properties that normally use a default value are displayed by the edit page 1204, but not by the configuration page 904. The particular properties that are displayed by the various pages, such as the configuration 904 and edit pages 1204, are determined by the SDL file definitions for the subject software component.

Figure 13:
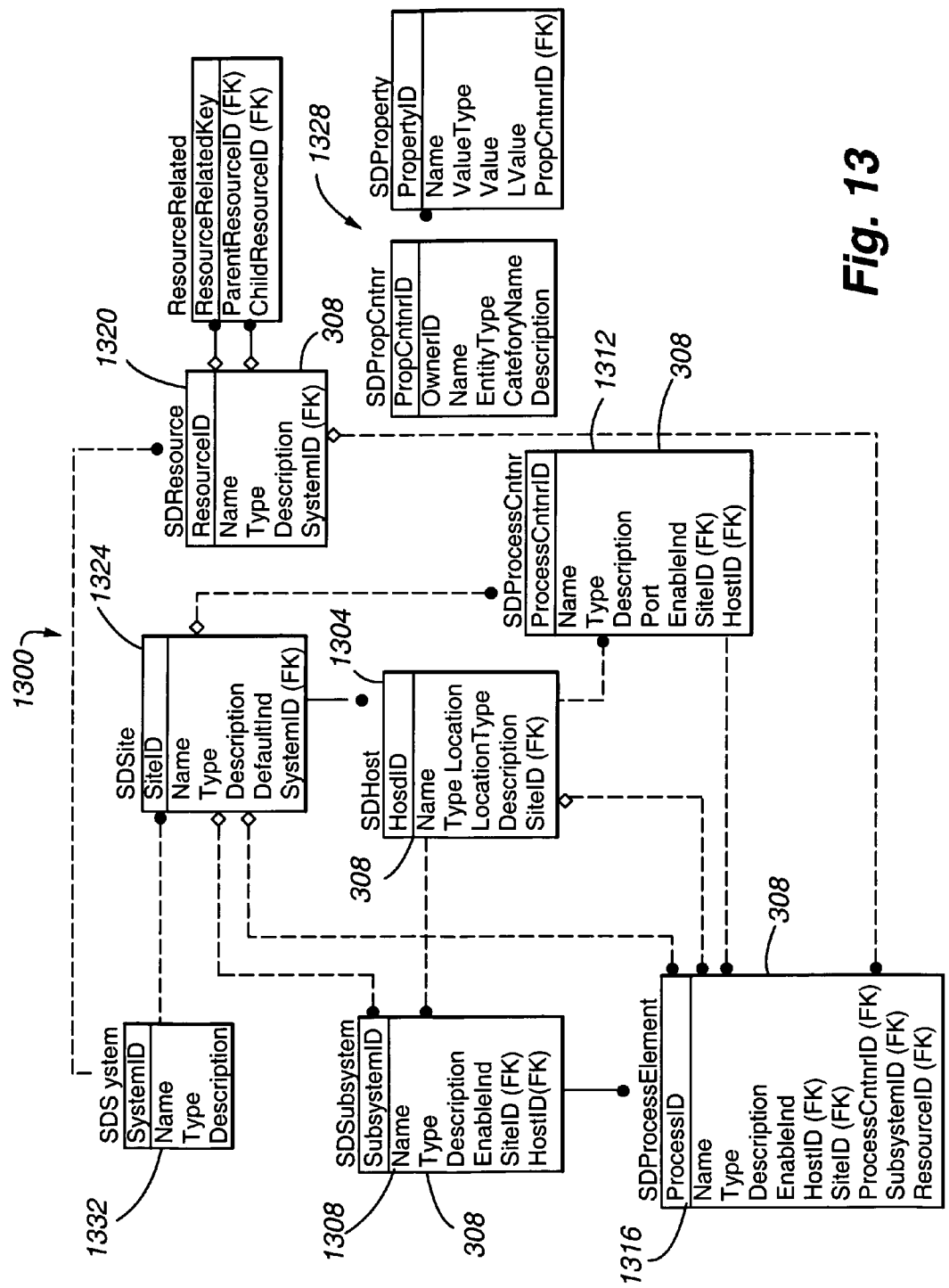
FIG. 13 is a depiction of a system data model in accordance with an exemplary embodiment of the present invention.

FIG. 13 illustrates an example of a system data model 1300 for a system 100 in accordance with embodiments of the present invention. In general, administration of system 100 software components will be performed by classes that in turn provide object models for each SDL table or file type 308 in the system data model 1300. More particularly, the data included in the SDL files 308 and/or defined in the SDL files 308 and configured via user input for the various components of the system 100 can be persisted to the system data model 1300. That is, the configuration information necessary to run the system 100 is provided and/or defined within the SDL files 308.

A host object 1304 is defined by an SDL file 308 and contains fields for storing information about the host 104. More particularly, a host object 1304 is created based on the meta-data that defines the selected host function. The relevant information from the host function meta-data object, such as the host function type, host function meta-data, constituent sub-systems, constituent process containers, etc., will be stored in the host object 1304. The properties associated with the host will also be stored in the host object 1304 when the host 104 is initially created, since the properties are needed to fully administer or define the host 104. However, the properties will not automatically be included with the host object 1304 when the host information is retrieved later. The host properties should only be needed if the user 468 wants to view or edit the host properties. Since this should not happen frequently, embodiments of the present invention do not need to include host properties in a default mode, in order to keep the host object 1304 as thin as possible.

Sub-system objects 1308 are used to store information about the sub-systems 108 associated with a host 104. A sub-system object 1308, defined by an SDL file 308, contains a sub-system meta-data object for storing all the information about the sub-system 108 that is defined in a sub-system SDL file 308. The sub-system object 1308 can also include a getMetaData( ) access method for retrieving the information. When the object 1308 is constructed, it will also construct the SubsystemMetaData object based on the attributes and description keys in the SDL. It will also generate the processing element objects 1316 and property objects associated with the sub-system 108 based on the definitions in the SDL.

Process container objects 1312 are used to store information about the process containers 112 associated with a host 104. A process container object 1312, defined by an SDL file 308, contains a process container meta-data object for storing all the information about the container 112 that is defined in a process container SDL file 308. It will also include a getMetaData( ) access method for retrieving the information. When the object 1312 is constructed, it will also construct the ProcessContainerMetaData object based on the attributes and description keys in the SDL. It will also generate references to the processing element objects 1316 and property objects associated with the container 112 based on the definitions in the SDL. Process container objects can include information about the run time parameters for the container as specified in the container SDL files. Any process containers 112 that are used for managing run time parameters, such as information for managing distributed system services (DSS) should specify the properties needed to define the parameters for the container 112 in the container SDL file 308. In general, DSS provides internal interprocess communications within a distributed application, and it hides the decisions about how components of a system are physically distributed and interconnected.

Resource objects 1320 can be used to store information about external resources that are not manageable by sub-system administration (i.e. cannot be started or stopped). Communication manager and predictive dialing systems are examples of resources. A resource object 1320 can contain a resource meta-data object for storing all the information about the resource that is defined in a resource SDL file 308. The resource object 1320 can also include a getMetaData( ) access method for retrieving the information. When the resource object 1320 is constructed, it will also construct the ResourceMetaData object based on the attributes and description keys in the SDL. It will also generate references to the process container objects 1320 based on the definitions in the resource SDL file 1308.

The processing element object 1316 facilitates the configuration and management of processing elements 116. In particular, the processing element objects can contain information about the runtime parameters for the process as specified in the processing element SDL file. For example, in accordance with embodiments of the present invention, a processing element object 1316 implements the state manageable interface provided by the system management toolkit. The processing element class will provide fields for storing information about a processing element 116 that is defined in a processing element SDL file 308. When a processing element object 1316 is constructed, it will create a PEMetaData object based on the attributes and description keys in the SDL. The processing element object 1316 will also generate the property objects associated with the processing element 116 based on the definitions in the SDL. A processing element 116 may also specify a property container 112 for the DSS interfaces that it uses. DSS interface properties that are specified include UUID, type, version information, interface class, default protocol and service set. Each of these properties may be specified as non-administrable string properties. The sub-system administration business logic can generate appropriate values for the UUID and service set properties. The remaining DSS interface properties can be specified in the SDL file 308 by hard coding the appropriate default value. The DSS interface properties are included in the SDL file 308 comprising the process element object 1316.

Site objects 1324 are used to store information about sites. A site is a grouping mechanism for host systems. Sites are typically used to provide a geographic grouping for hosts. The information exposed can be used to create new sites or to provide new information about previously administered sites. A site object 1324 contains fields for storing all the information about the site. It can also include access methods for retrieving the information. Unlike other software components, site definitions are not driven by SDL files 1308, since there are no product definable attributes or properties for sites.

The system data model 1300 may also provide for the configuration and management of properties 1328. More particularly, the SDL as provided herein provides the ability to automatically generate the UI pages for administering or configuring the properties of the various components. Specifically, items included in the SDL files can be used to generate user interface pages that can be used to collect information from a user related to administration or configuring system components. In addition, the system data model 1300 is generally associated with information identifying the system 1332, such as the system ID, name, type and description.

Figure 14:
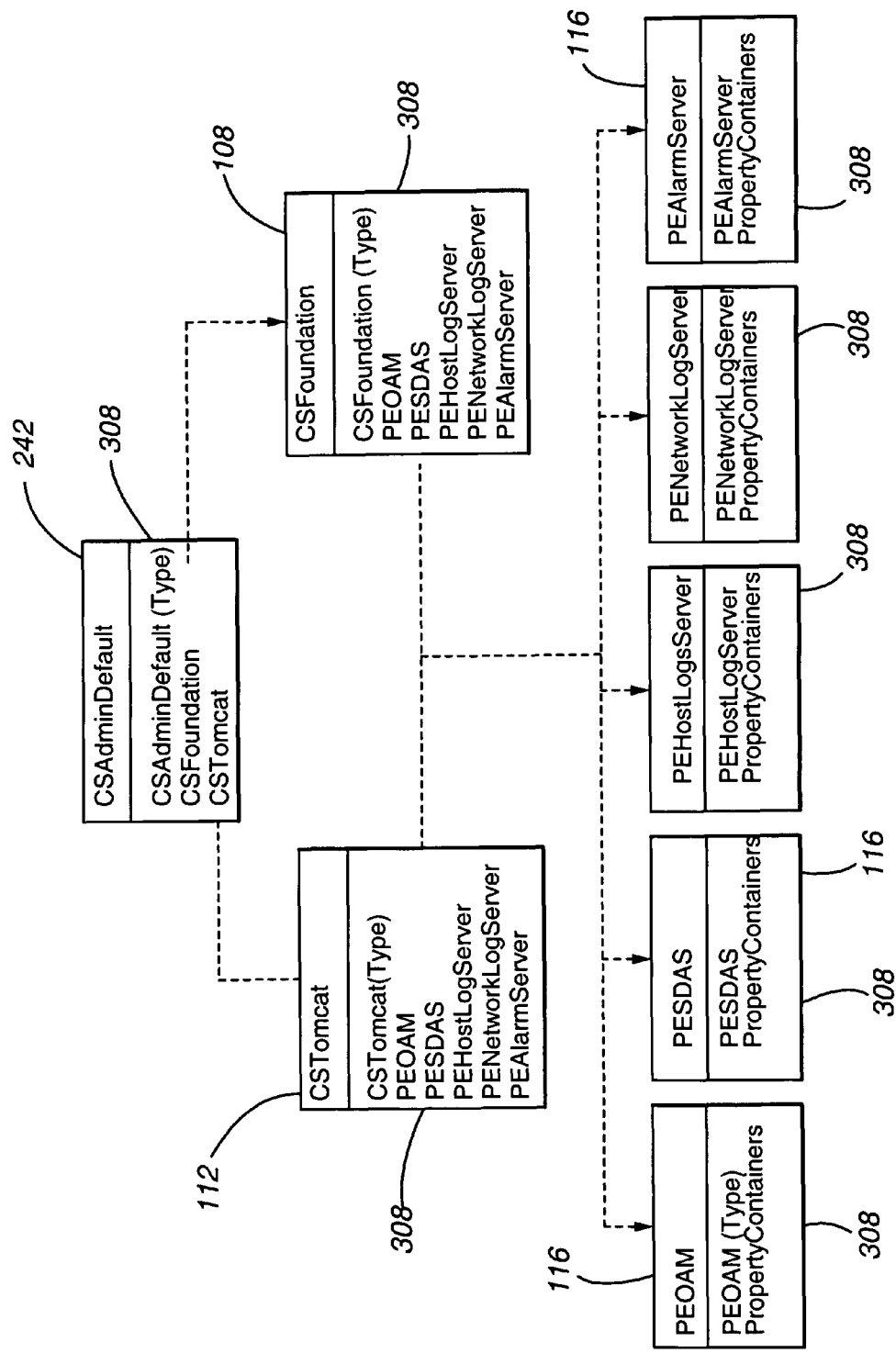
FIG. 14 is a depiction of sub-system definition language files in accordance with an exemplary embodiment of the present invention.

FIG. 14 is a depiction of sub-system definition language files 308 associated with an administration host flavor or function. Accordingly, it can be appreciated that the management service 242 may itself be configured and/or defined using SDL files 308. In the example of FIG. 14, the management service function 242 is associated with an administration default flavor. The administration default flavor contains a CS foundation sub-system 108 and a CS tomcat process container 112. The sub-system 108 and container 112 are in turn associated with a number of processing elements 116, each associated with its own SDL file 308.

Embodiments of the sub-system definition language described herein may incorporate system management capabilities that are implemented using a common administration software development toolkit. The toolkit may provide a common administration framework that provides the management service 242, and for developing web-based management applications. For example, in addition to application programming comprising the management service 242, a common administration software development toolkit may comprise SDL files 308 as illustrated in FIG. 14. The common system management architecture of embodiments of the present invention separates the presentation layer from the implementation business logic. The presentation layer may use open source SiteMesh or Tiles page decoration technology to integrate multiple presentation technologies, such as JSP, Struts and JSF. The business logic may be encapsulated in a collection of Java objects referred to as the admin domain models. The presentation layer and the business logic both allow for common and product specific components. Moreover, to support distributed event notification, the admin domain models will use a published/subscribed pattern implemented on durable JMS topics. JMS ensures reliable delivery of admin change notifications.

An administrator or user 468 can manage sub-systems 108 and their constituent processing elements 116, including the initial set-up of sites and hosts in the system 100 and on-going operations and maintenance, such as setting properties, monitoring state, and controlling life-cycle, through sub-system administration. An XML schema controls the behavior of sub-system administration. The sub-system definition language defines the processing elements and containers within a sub-system and the properties required for administration. A separate SDL XML file exists for each supported sub-system type. In addition, an SDL XML file is provided for each host function type, each container type, each processing element type or other software component included in the system. The SDL ensures each sub-system is deployed with the correct combination of processing elements. The SDL also defines the sub-systems or other components that can be combined onto a single host 104. Each host 104 is assigned a single function based on its desired use. Although the architecture can support a large number of sub-system 108 combinations, the SDL generally defines only those combinations that represent supported configurations.

The operations and use of an embodiment of the present invention is set forth in the following example scenario:

The customer relationship management reporting system needs to incorporate a processing element (CMAdapter) that will collect reporting data from a Communication Manager system. The Communication Manager system is a resource for the CRM reporting system.

First, the CRM reporting system organization must architect, design, and implement the new software components plus the SDL files for managing and administering them.

Steps:
The CRM reporting system product architects determine which host function(s) should support the data collection functionality. As part of this, they also determine which logical subsystem should contain the data collection functionality, and they also determine which process container should include the CMAdapter process element.

The CRM reporting system development organization plans, designs, and develops the CMAdapter software. As part of this, the development organization defines the information required for administering the CMAdapter software and its connection to the Communication Manager resource, as well as how the administration information should be collected from the user.

The development organization creates or modifies one or more host function SDL file(s) to define the host function types that should support the data collection functionality. The host function SDL files conform to the host function SDL schema (flavor.xsd). See FIGS. 20 A-B. For example, the data collection functionality could be included on a host that supports all of the reporting system functionality (see AllFunctions.xml in FIG. 15), or it could be included on a host that just supports the data collection functionality (see DataCollection.xml in FIG. 21). The host function SDL file(s) provide references to the logical subsystem that should contain the data collection functionality as well as to the process container that should include the processing element.

The development organization creates or modifies a subsystem SDL file to define a logical subsystem that should include the data collection functionality. The subsystem SDL file conforms to the subsystem SDL schema (subsystem.xml). See FIG. 22 A-B. The subsystem SDL file includes a reference to the CMAdapter processing element (see FIG. 17).

The development organization creates or modifies a process container SDL file to define the process container that includes the CMAdapter processing element. The process container SDL file conforms to the process container SDL schema (processContainer.xsd). See FIGS. 23 A-C. The process container SDL file includes a reference to the CMAdapter processing element (see FIGS. 16 A-B). It also includes information required for creating and installing the process container on the host. Note that the process container SDL file includes several property container and property definitions. The property container and property definitions specify the administration and configuration data that is required for the operation of the process container, and they include information such as the type of each property (string, Boolean, integer, etc.), a default value for the property, any constraints on the value such as a minimum or maximum value, etc. The property container and property definitions must conform to the property container schema (propertyContainer.xsd). See FIGS. 24 A-D. Note also that the process container schema, along with all the other schemas, includes a reference to the propertyContainer.xsd schema. This implies that any SDL file, regardless of type (host function, subsystem, processing element, etc.) can define property containers and properties to specify the administration and configuration data required for their operation. Similarly, any SDL file can define UI MetaData (see the UIMetaData schema in FIGS. 25 A-B) and property UI Metadata (see the property UI MetaData schema in FIGS. 26 A-C) to specify if and how the properties should be presented on the user interface for administration. The UI MetaData information defines the web pages that should be generated for administering each entity; for example, it defines how many pages are needed, the title for each page, etc. The property UI Meta Data specifies how each individual property should be administered. For example, it specifies on which web page number the property should be administered, how the property value should be entered, etc. Note that the UI Meta Data and property UI Meta Data information is only needed if the property values require user input. If all of an entity's properties have default values, and if the default values can always be used as is, the UI Meta Data and property UI Meta Data information is optional.

The development organization creates a processing element SDL file for the CMAdapter processing element. The SDL file conforms to the processingElement.xsd schema (see FIGS. 27 A-C), and the SDL file includes a reference to the Communication Manager resource type from which the CMAdapter will collect data (see FIGS. 18 A-E). It also includes property container and property definitions that specify information for creating and installing the processing element within its parent process container on the host. Note that since these properties do not require user input, they do not include UIMetaData or property UI MetaData information. Instead, these properties will be created using the default values specified.

The development organization creates a resource SDL file for the Communication manager resource. The SDL file conforms to the resource.xsd schema (see FIGS. 28 A-C). The SDL file also includes a lot of property container and property definitions that specify information required for communicating with the Communication Manager resource (see FIGS. 19 A-QQ). Note that some of the property definitions include property UI MetaData information for specifying how the properties should be presented on the user interface for administration. Note also that some of the property UI MetaData definitions specify that the property should be presented to the user for administration within the Add Host "wizard" pages (wizardProperty=true). Properties that include property UI MetaData information but which are NOT specified as wizard properties will only be presented to the user for administration when the entity defined by the SDL file is edited, and then they will only be presented to the user if the property should be "exposed" (exposed=true).

Once the development of the CMAdapter processing element and all of the SDL files is complete, the development organization creates and implements procedures or processes for loading the CMAdapter software on the host system and for loading all the SDL files in the database. After this process is complete, the new component is ready to be administered.

Steps:

The user selects the "add new host" function from the home page of their administration user interface.

The management service retrieves the list of all host function SDL files from the database and uses this list to generate a list of supported host functions. The list is presented to the user via the user interface. See FIG. 6. Note that the list of supported host functions includes both the All Functions and the Data Collection host functions.

The user selects the function of the host to be added and selects Next.

The management service prompts the user to enter some basic identifying information for the host. See FIG. 8.

Once the user enters the basic host information and selects Next, the management service retrieves all of the SDL files for the subsystems and process containers referenced by the SDL file for the selected host function. The management service also retrieves all the SDL files for the processing elements referenced by the subsystem and process container SDL files, as well as all the SDL files for the resources referenced by the processing element SDL files.

The management service iterates through all of the subsystem SDL files retrieved above and creates a subsystem object to correspond to each file. If a subsystem SDL file defines any property containers or properties, the management service also creates property container and property objects corresponding to each one. The management service sets the default value of each property as specified in the SDL file. In addition, if the subsystem SDL file defines UI MetaData information, the management service uses that information to generate the web page(s) for administering the subsystem. The contents of the web pages are generated based on the property UI MetaData information (if any) defined for the properties specified in the subsystem SDL file. For example, if a property definition includes property UI MetaData, and if that information indicates that the inputType for the property is "text", the management service will generate a text box for entering the property value. If the property UI MetaData indicates that the inputType for the property is "dropdown", the management service will generate a dropdown menu that the user can use to select the appropriate property value. The supported property values are defined using the selectOptions elements in the property definition. Note that the subsystem SDL files define WHAT should be administered for each subsystem and HOW it should be administered; the subsystem, property container, and property objects on the other hand store the actual administration data and values.

The management service iterates through all the process container SDL files retrieved above and creates a process container object to correspond to each file. As with the subsystem SDL files, the management service creates property container and property objects to correspond to those defined in the SDL files, and also uses the information in the SDL files to generate the web pages for administering each process container. Similarly, the management service also iterates through the processing element and resource SDL files retrieved above to create the appropriate objects and web pages for administering the processing elements and resources.

Next, the management service presents each generated web page to the user in sequence. Note that the host function, subsystem, process container, and processing element SDL files shown in FIGS. 15, 16, 17, 18, and 21 did NOT include any UI Meta Data information; therefore, there are no web pages generated for administering those entities. On the other hand, the Communication Manager resource SDL file shown in 19A-19QQ include UI Meta Data information, so there IS a web page generated for administering this resource. See FIG. 9. Note that some of the properties have default values as specified in the Communication manager resource SDL file. Note also that values for the different properties are administered in different ways depending on how the property UI Meta Data was defined in the SDL file The user enters or selects values for all the properties displayed on the web page, and then selects Next.

The management service validates the entries for the property values. Assuming the entries are valid, the management service uses the entries to set the values in the appropriate property objects, then presents the next web page in the sequence.

Once all of the web pages have been presented to the user and property values have been administered for all of the properties, the management service presents a final confirmation page to the user. See FIG. 10.

Assuming the user confirms the entries, the management service then stores the host information in the database. It also stores the information in each subsystem, process container, processing element, resource, property container, and property object in the database.

After the information has been stored in the database, the management service uses the information defined in the process container SDL files to create and install the process containers on the host. It also uses the information in the processing element SDL files to create and install the processing elements within their parent process containers on the host.

The management service starts all the process containers and processing elements on the host. As each processing element starts, it retrieves its administration and configuration information from the database. The administration and configuration information is stored in the properties that were created by the management service using the property information defined in the processing element's SDL file plus the data entered by the user via the web pages.

At this point, the system is ready for operation, and the system can be monitored using the management service. See FIG. 11.

In some cases, the user may need or choose to modify some of the administration or configuration properties that were originally created by the management service using the SDL files.

Steps:

The user logs in to the web pages for the management service (see FIG. 11 again) and selects the entity to be modified. The user may need to drill down through the appropriate subsystem or process container to get to the desired processing element or resource.

The user selects the desired entity and clicks the Edit button.

The management service retrieves the SDL file for the desired entity from the database. It also retrieves the current properties for the entity from the database.

Figure 29A:
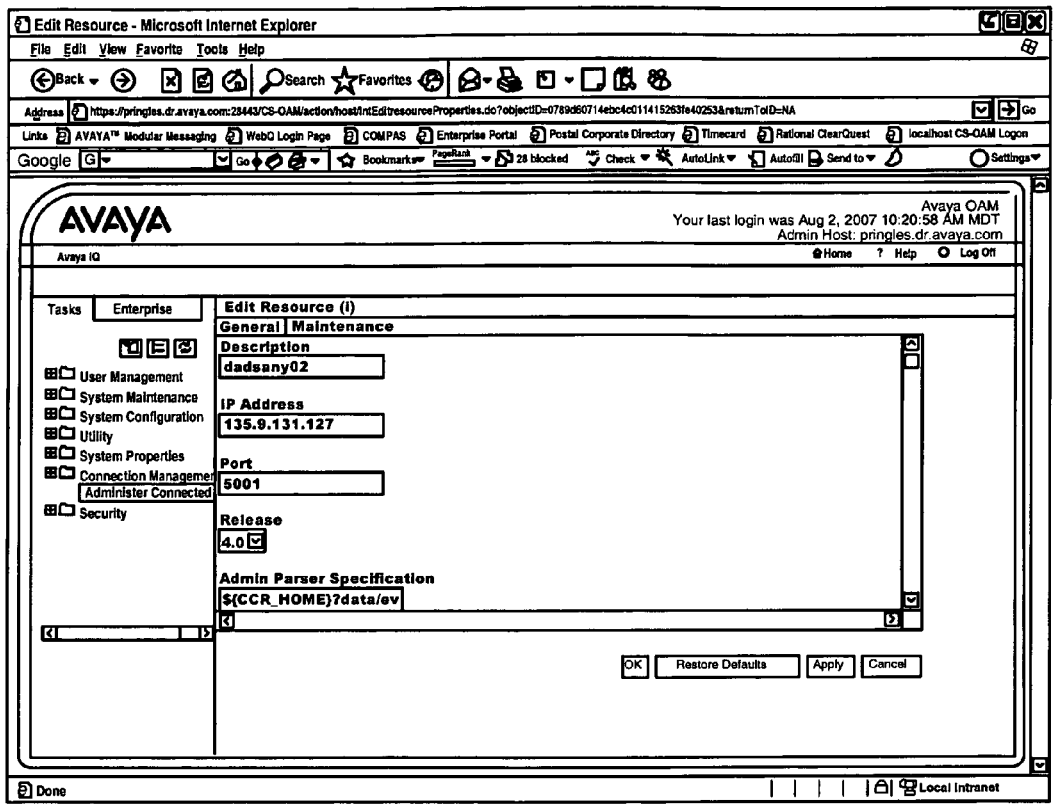
FIGS. 29 A-C are screen shots of a user interface presented to a user in connection with editing a communication manager resource in accordance with embodiments of the present invention.
Figure 29B:
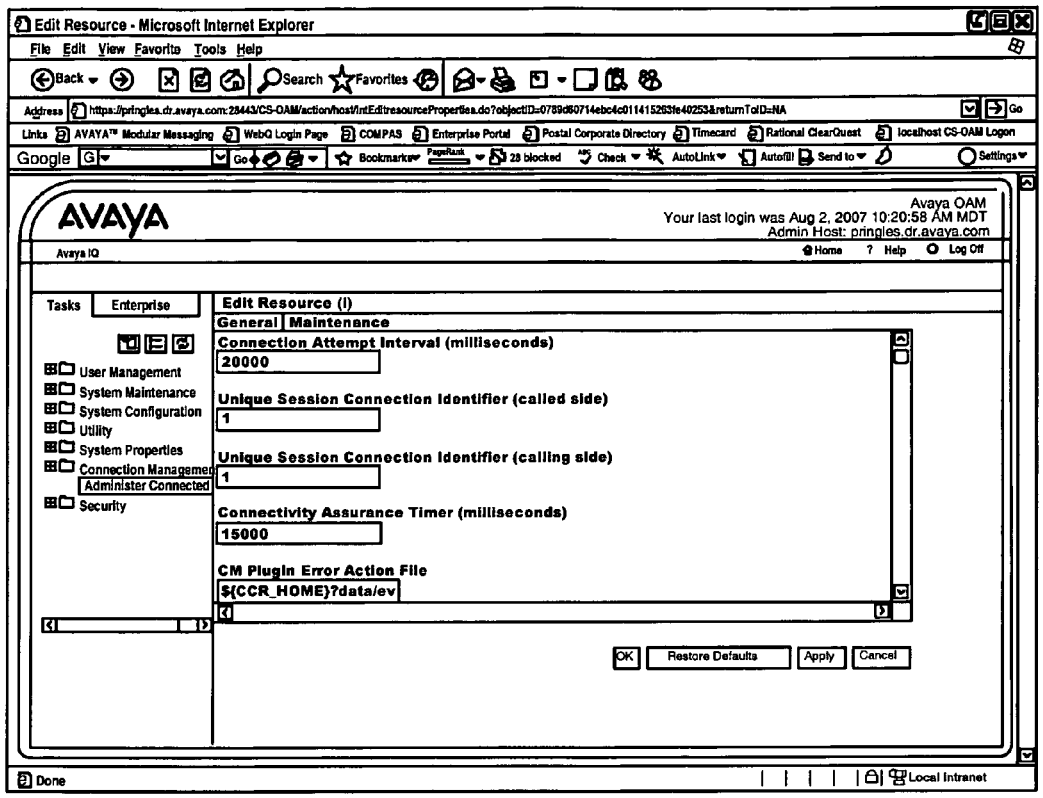
Figure 29C:
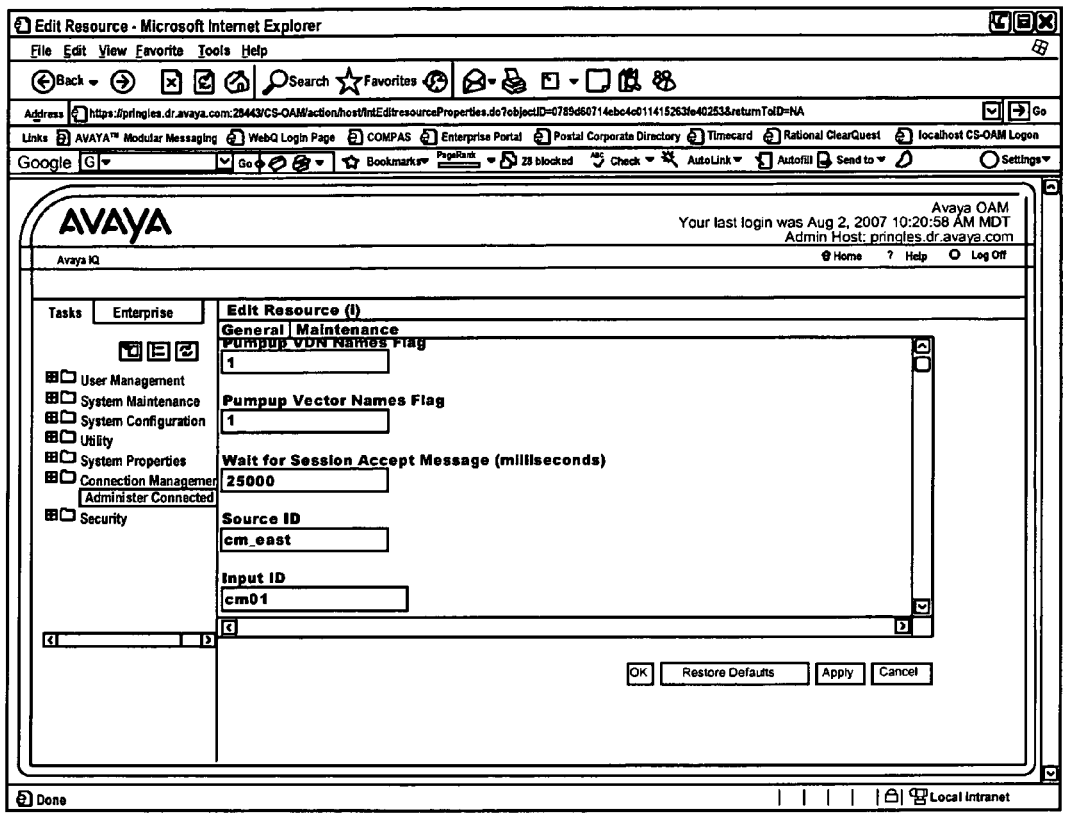

The management service uses the information in the SDL file to generate the web page for editing the entity. Remember that the SDL file specifies WHAT needs to be administered and HOW. The management services uses the properties retrieved from the database to populate the current values for each property. See FIGS. 29 A-C. Note that the Edit page includes a number of properties that were not presented on the initial administration pages. These properties were not defined as wizard properties and so they were created with their default values as specified in the SDL file. The Edit page includes all the properties that were defined as being "exposed" in the SDL file.

The user modifies the property values as desired, then clicks Apply or OK.

The management service stores the new property values in the database.

The foregoing discussion of the invention has been presented for purposes of illustration and description. Further, the description is not intended to limit the invention to the form disclosed herein. Consequently, variations and modifications commensurate with the above teachings within the skill or knowledge of the relevant art are within the scope of the present invention. The embodiments described hereinabove are further intended to explain the best mode presently known of practicing the invention and to enable others skilled in the art to utilize the invention in such or in other embodiments and with the various modifications required by the particular application or use of the invention. It is intended that the appended claims be construed to include alternative embodiments to the extent permitted by the prior art.

What is claimed is:

1. A method for generating system information, comprising:

defining an integration standard for a system, wherein said integration standard includes a set of schemas, wherein each schema includes items of required configuration data, wherein said system includes a number of software components, and wherein each software component is associated with a schema;

identifying for a first software component first required configuration data, wherein said first required configuration data includes a first set of items of data, wherein the first set of items of data included in the first required configuration data is obtained from a first schema associated with the first software component;

executing a management service application, wherein the method further includes the management service application:

validating that the first software component is running;

after validating that the first software component is running, generating and presenting to a user a user interface for collecting the first required configuration data, wherein the user interface is dynamically generated when the management service application is executed, wherein the user interface presents a first plurality of fields to the user that are operable to receive input from the user, and wherein the first plurality of fields included in the user interface for collecting the first required configuration data are determined by the first required configuration data and correspond to the first set of items of data for the first software component;

receiving input from the user in the first plurality of fields, wherein the first required configuration data is collected from the user through the user interface;

validating the first required configuration data collected from the user according to rules specified by the first schema;

after validating the first required configuration data, receiving input from the user confirming the first required configuration data received from the user, wherein the input from the user confirming is collected from the user through a user interface for confirming the first required configuration data;

after receiving input from the user confirming the first required configuration data, storing the first required configuration data received from the user through the user interface in a data model for the first software component;

applying the first required configuration data received from the user, whereby the first software component is configured and operably integrated into the system; and running the system and the configured first software component.

2. The method of claim 1, further comprising:

identifying for a second software component second required configuration data, wherein the second required configuration data includes a second set of items of data, wherein the second set of items of data included in the second required configuration data is obtained from a second schema associated with the second software component, and wherein the first software configuration data is different than the second software configuration data;

validating that the second software component is running;

after validating that the second software component is running, generating and presenting to the user a user interface for collecting the second required configuration data, wherein the user interface presents a second plurality of fields that are operable to receive input from the user, wherein the second plurality of fields included in the user interface for collecting the second required configuration data are determined by the second required configuration data and correspond to the second set of items of data for the second software component;

receiving input from the user in the second plurality of fields, wherein the second required configuration data is collected from the user through the user interface;

validating the second required configuration data collected from the user according to rules specified by the second schema;

after validating the second required configuration data, receiving input from the user confirming the second required configuration data received from the user, wherein the input from the user confirming is collected from the user through a user interface for confirming the second required configuration data;

after receiving input from the user confirming the second required configuration data, storing said second required configuration data received from the user through the user interface in a data model for the second software component;

applying the second required configuration data received from the user, wherein the second software component is configured and operably integrated into the system; and running the system and the configured second software component.

3. The method of claim 2, further comprising exchanging information between said first software component and said second software component of said system.

4. The method of claim 1, wherein said identifying for a first software component first required configuration data includes:

creating a first file according to the integration standard for the system, wherein the first file includes:
a first set of properties that must be administered in order to configure the first software component;
a first set of run-time parameters for the first software component.

5. The method of claim 4, further comprising:

parsing the first file by the management service application, wherein generating a user interface for collecting the first required configuration data comprises generating a user interface using information collected from parsing the first file.

6. The method of claim 4, wherein the first file comprises an XML file, wherein the user interface generated for collecting the first required configuration data comprises a web page having content determined at least partially by the first required configuration data, wherein the first plurality of fields included in the user interface for collecting the first required configuration data include one or more text boxes and one or more dropdown menus, said text boxes operable to receive text input of configuration data from the user, said dropdown menus operable to receive a selection of configuration data from the user.

7. The method of claim 6, wherein the web page having content determined at least partially by the first required configuration data comprises at least a portion of a system configuration tool.

8. The method of claim 7, further comprising:

modifying the first software component;
identifying for the modified first software component modified first required configuration data;
generating and presenting to the user a user interface for collecting the modified first required configuration data;
collecting the first modified required configuration data from the user through the user interface;
storing the first modified required configuration data in a data model for the modified first software component;
running the system and the modified first software component.

9. The method of claim 6, wherein generating and presenting to a user a user interface for collecting the first required configuration data includes the management service application parsing the XML file and using the parsed data to dynamically generate the content of the web page.

10. The method of claim 9, wherein collecting the first required configuration data includes receiving input from the user entered through the user interface, wherein for a text box the user enters configuration data in the text box, and wherein for a dropdown menu the user selects the configuration data from the dropdown menu.

11. The method of claim 10, further comprising:

while running the system, accessing by the management service application the first file to view properties of the first software component.

12. The method of claim 10, wherein the first software component is configured and operably integrated to the system without requiring that software included in the system be recompiled.

13. The method of claim 4, wherein elements of the first file include:
   a set of processing elements required from other components of the system for the configuration and operation of the first software component.

14. The method of claim 13, wherein the elements of the first file further include:
   an identification of software components comprising a first subsystem.

15. The method of claim 14, wherein the first software component runs in a first container, and wherein the elements of the first file further include:
   a set of process container elements that define how the container in which the first software component is deployed.

16. The method of claim 15, wherein the elements of the first file further include:
   a set of externally managed resources that interface with the first software component.

17. A system for dynamic administrative user-interface generation, comprising:
   a processor operable to execute software;
   data storage, containing a number of software components, the software components including at least:
      an operative software component;
      a first new software component;
         a first new system definition language file containing elements comprising first required configuration data for the first new software component;
      a management service application;
      a user interface application;
   a user display; and
   a user input;
   wherein the management service application validates that the first new software component is running, wherein the user interface application generates a user interface that is displayed to a user through the user display, wherein the displayed user interface presents a plurality of fields to the user that are operable to receive input from the user in the form of the first required configuration data for the first new software component, wherein the first required configuration data is provided to the system by the user through the user input and the user interface application, wherein the first required configuration data provided by the user is received by the management service application, wherein the management service application validates the first required configuration data provided by the user according to rules specified in the first new system definition language file, wherein the user interface application generates a confirmation user interface for confirming the first required configuration data, wherein the confirmation user interface is operable to receive input from the user confirming the first required configuration data, and wherein the first required configuration data provided by the user is used to configure the first new software component for execution by the processor in association with the operative software component, to create a modified operative software component.

18. The system of claim 17, further comprising:
   a second new software component stored in the data storage; and
   a second new system definition language file containing elements comprising second required configuration data for the second new software component, wherein the set of elements in the first new system definition language file are different than the set of elements in the second new system definition language file.

19. A system for managing computer software, comprising:
   means for providing a service comprising a plurality of components;
   means for defining characteristics of said plurality of components; and
   means for providing a user interface, wherein the means for providing a service validates that a selected software component is running, wherein said user interface displays characteristics of the selected software component to a user and receives user input specifying a parameter for at least one of the characteristics, wherein in response to the user input the means for providing a service validates the user input according to rules specified in the selected software component, wherein in response to successfully validating the user input, said user interface displays the user input and is operable to receive confirmation from the user of the user input, wherein, in response to receiving confirmation from the user of the user input, the means for providing a service persists at least some of the parameters for the characteristics of the selected component to a data model for the selected software component, wherein the parameters for the characteristics persisted to the data model comprise the validated user input, wherein the means for providing a service starts the selected software component, wherein the selected component is executed without requiring recompilation of system software.

20. The system of claim 17, wherein the first new software component is executed by the processor without requiring recompilation of system software.

* * * * *